US012342007B2

(12) United States Patent
Badawiyeh

(10) Patent No.: US 12,342,007 B2
(45) Date of Patent: Jun. 24, 2025

(54) APPARATUS AND METHODS FOR LATENCY REDUCTION IN DIGITAL CONTENT SWITCHING OPERATIONS

(71) Applicant: CHARTER COMMUNICATIONS OPERATING, LLC, St. Louis, MO (US)

(72) Inventor: Basil Badawiyeh, Parker, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 232 days.

(21) Appl. No.: 17/208,447

(22) Filed: Mar. 22, 2021

(65) Prior Publication Data

US 2021/0281893 A1 Sep. 9, 2021

Related U.S. Application Data

(62) Division of application No. 15/689,733, filed on Aug. 29, 2017, now Pat. No. 10,958,948.

(51) Int. Cl.
*H04N 21/234* (2011.01)
*H04N 21/2343* (2011.01)
(Continued)

(52) U.S. Cl.
CPC ............... *H04N 21/23424* (2013.01); *H04N 21/234309* (2013.01); *H04N 21/234345* (2013.01);
(Continued)

(58) Field of Classification Search
CPC .................................................... H04N 21/40
See application file for complete search history.

(56) References Cited

U.S. PATENT DOCUMENTS 4,195,351 A 3/1980 Barner et al.
5,341,318 A 8/1994 Balkanski et al.
(Continued)

FOREIGN PATENT DOCUMENTS

JP 2004054930 A 2/2004
JP 2005130087 A 5/2005
(Continued)

OTHER PUBLICATIONS

"IEEE Standard Protocol for Stream Management in Media Client Devices", IEEE Standard 2200-2012, United States, Aug. 9, 2012, pp. 1-196, XP068045676.
(Continued)

*Primary Examiner* — Mushfikh I Alam
(74) *Attorney, Agent, or Firm* — Patent Beach PC

(57) ABSTRACT

Apparatus and methods for reducing latency in content and content source switching in a digital content delivery network. In one embodiment, linear addressable secondary content is "switched into" primary content within a cloud-based model using one or more latency-reducing techniques so as to minimize the user's perception of delay in performing the switch. In one implementation, secondary content video encodings are selected based on the encoding scheme of the primary content, and open GOPs within the primary content at the content transition point are closed or avoided, each to reduce processing overhead of the recipient client device. In another implementation, otherwise cloud-inaccessible functionality of the client device is accessed to reduce or suspend processing on non-essential tasks to make more processing resources available at the client. In yet another implementation, intelligent RF PHY scheduling of the primary and secondary content are utilized to minimize RF re-tuning by the client.

24 Claims, 19 Drawing Sheets

(51) Int. Cl.
*H04N 21/2383* (2011.01)
*H04N 21/262* (2011.01)
*H04N 21/2662* (2011.01)
*H04N 21/44* (2011.01)
*H04N 21/6332* (2011.01)
*H04N 21/64* (2011.01)
*H04N 21/845* (2011.01)
*H04N 21/8543* (2011.01)

(52) U.S. Cl.
CPC ... *H04N 21/2383* (2013.01); *H04N 21/26208* (2013.01); *H04N 21/2662* (2013.01); *H04N 21/44016* (2013.01); *H04N 21/6332* (2013.01); *H04N 21/64* (2013.01); *H04N 21/8456* (2013.01); *H04N 21/8543* (2013.01)

(56) References Cited

U.S. PATENT DOCUMENTS

| | | |
|---|---|---|
| 5,610,841 A | 3/1997 | Tanaka et al. |
| 5,815,662 A | 9/1998 | Ong |
| 6,275,618 B1 | 8/2001 | Kodama |
| 6,330,609 B1 | 12/2001 | Garofalakis et al. |
| 6,339,785 B1 | 1/2002 | Feigenbaum |
| 6,463,508 B1 | 10/2002 | Wolf et al. |
| 6,487,721 B1 | 11/2002 | Safadi |
| 6,636,238 B1 | 10/2003 | Amir et al. |
| 6,642,939 B1 | 11/2003 | Vallone et al. |
| 6,651,103 B1 | 11/2003 | Markowitz et al. |
| 6,728,840 B1 | 4/2004 | Shatil et al. |
| 6,859,839 B1 | 2/2005 | Zahorjan et al. |
| 6,868,439 B2 | 3/2005 | Basu et al. |
| 6,965,724 B1 | 11/2005 | Boccon-Gibod et al. |
| 6,977,691 B1 | 12/2005 | Middleton et al. |
| 7,017,174 B1 | 3/2006 | Sheedy |
| 7,031,348 B1* | 4/2006 | Gazit ............... H04N 21/2343 375/365 |
| 7,058,721 B1 | 6/2006 | Ellison et al. |
| 7,103,325 B1* | 9/2006 | Jia ..................... H04B 7/0669 375/267 |
| 7,110,457 B1 | 9/2006 | Chen et al. |
| 7,191,461 B1 | 3/2007 | Arsenault et al. |
| 7,194,752 B1 | 3/2007 | Kenyon et al. |
| 7,209,973 B2 | 4/2007 | Tormasov et al. |
| 7,296,074 B2 | 11/2007 | Jagels |
| 7,370,120 B2 | 5/2008 | Kirsch et al. |
| 7,555,006 B2 | 6/2009 | Wolfe et al. |
| 7,602,820 B2 | 10/2009 | Helms et al. |
| 7,630,401 B2 | 12/2009 | Iwamura |
| 7,676,142 B1 | 3/2010 | Hung |
| 7,690,020 B2 | 3/2010 | Lebar |
| 7,725,557 B2 | 5/2010 | Klemets et al. |
| 7,733,919 B2 | 6/2010 | Liu et al. |
| 7,783,316 B1 | 8/2010 | Mitchell |
| 7,805,052 B2 | 9/2010 | Nakamura et al. |
| 7,844,729 B1 | 11/2010 | Friedman et al. |
| 7,908,626 B2 | 3/2011 | Williamson et al. |
| 7,930,382 B1 | 4/2011 | Tormasov et al. |
| 7,954,131 B2 | 5/2011 | Cholas et al. |
| 8,213,358 B1 | 7/2012 | Goyal et al. |
| 8,325,821 B1* | 12/2012 | Kizhepat ............. H04N 19/40 375/240.26 |
| 8,375,140 B2 | 2/2013 | Tippin et al. |
| 8,484,511 B2 | 7/2013 | Engel et al. |
| 8,520,850 B2 | 8/2013 | Helms et al. |
| 8,521,002 B2 | 8/2013 | Yahata et al. |
| 8,561,116 B2 | 10/2013 | Hasek |
| 8,613,089 B1 | 12/2013 | Holloway et al. |
| 8,621,540 B2 | 12/2013 | Apsangi et al. |
| 8,660,181 B2 | 2/2014 | Streater et al. |
| 8,667,548 B2 | 3/2014 | Chen et al. |
| 8,713,623 B2 | 4/2014 | Brooks |
| 8,799,943 B1 | 8/2014 | Sherwin et al. |
| 8,813,124 B2 | 8/2014 | Tidwell et al. |
| 8,813,127 B2 | 8/2014 | Liu et al. |
| 8,826,347 B1 | 9/2014 | Earle |
| 8,863,164 B1 | 10/2014 | Mick et al. |
| 8,917,977 B2 | 12/2014 | Hamada et al. |
| 8,924,580 B2 | 12/2014 | Begen et al. |
| 8,930,979 B2 | 1/2015 | Tidwell et al. |
| 8,990,869 B2 | 3/2015 | Hasek |
| 8,997,136 B2 | 3/2015 | Brooks et al. |
| 9,066,115 B1 | 6/2015 | Cherry et al. |
| 9,066,138 B1 | 6/2015 | Kraiman et al. |
| 9,083,513 B2 | 7/2015 | Helms et al. |
| 9,106,787 B1* | 8/2015 | Holmer ............... H04N 19/172 |
| 9,112,938 B2 | 8/2015 | Tippin et al. |
| 9,170,700 B2 | 10/2015 | Kaiser et al. |
| 9,215,423 B2 | 12/2015 | Kimble et al. |
| 9,247,317 B2 | 1/2016 | Shivadas et al. |
| 9,264,508 B2 | 2/2016 | Wolf et al. |
| 9,277,266 B2 | 3/2016 | Riedl et al. |
| 9,591,069 B2 | 3/2017 | Thornburgh et al. |
| 9,596,489 B2 | 3/2017 | Hasek |
| 9,699,236 B2 | 7/2017 | Gopalakrishnan et al. |
| 9,710,469 B2 | 7/2017 | Chen et al. |
| 9,910,742 B1 | 3/2018 | Faibish et al. |
| 10,007,673 B1 | 6/2018 | Faibish et al. |
| 10,078,639 B1 | 9/2018 | Faibish et al. |
| 10,116,629 B2 | 10/2018 | Crofton et al. |
| 10,135,748 B2* | 11/2018 | May, Jr. ............. H04N 21/2401 |
| 10,162,828 B2 | 12/2018 | Foster |
| 10,264,072 B2 | 4/2019 | Crofton et al. |
| 10,356,158 B2 | 7/2019 | Crofton et al. |
| 10,404,798 B2 | 9/2019 | Crofton et al. |
| 10,652,594 B2 | 5/2020 | Chen et al. |
| 10,739,944 B1* | 8/2020 | Pasalapudi ............ G06F 3/0482 |
| 10,893,468 B2 | 1/2021 | Da Silva et al. |
| 10,939,142 B2 | 3/2021 | Jayawardene et al. |
| 11,089,373 B2 | 8/2021 | Chittella et al. |
| 2001/0022813 A1* | 9/2001 | Tan ..................... H04N 5/21 348/E5.077 |
| 2001/0042249 A1 | 11/2001 | Knepper et al. |
| 2002/0015577 A1 | 2/2002 | Negishi et al. |
| 2002/0133722 A1 | 9/2002 | Levanon et al. |
| 2002/0135621 A1 | 9/2002 | Angiulo et al. |
| 2002/0154694 A1 | 10/2002 | Birch |
| 2002/0154885 A1 | 10/2002 | Covell et al. |
| 2002/0163928 A1 | 11/2002 | Rudnick et al. |
| 2002/0164149 A1 | 11/2002 | Wilkinson |
| 2002/0164151 A1 | 11/2002 | Jasinschi et al. |
| 2002/0169926 A1 | 11/2002 | Pinckney et al. |
| 2002/0172281 A1 | 11/2002 | Mantchala et al. |
| 2003/0002583 A1 | 1/2003 | Geerlings |
| 2003/0025832 A1 | 2/2003 | Swart et al. |
| 2003/0028505 A1 | 2/2003 | O'Rourke et al. |
| 2003/0031258 A1* | 2/2003 | Wang .................. H04N 19/127 375/240.26 |
| 2003/0037331 A1 | 2/2003 | Lee |
| 2003/0056217 A1 | 3/2003 | Brooks |
| 2003/0067554 A1 | 4/2003 | Klarfeld et al. |
| 2003/0067877 A1 | 4/2003 | Sivakumar et al. |
| 2003/0071971 A1 | 4/2003 | Jo |
| 2003/0093543 A1 | 5/2003 | Cheung et al. |
| 2003/0093790 A1 | 5/2003 | Logan et al. |
| 2003/0115612 A1 | 6/2003 | Mao et al. |
| 2003/0118243 A1 | 6/2003 | Sezer et al. |
| 2003/0126211 A1 | 7/2003 | Anttila et al. |
| 2003/0192060 A1 | 10/2003 | Levy |
| 2003/0208763 A1 | 11/2003 | McElhatten et al. |
| 2003/0208765 A1 | 11/2003 | Urdang et al. |
| 2003/0212997 A1 | 11/2003 | Hejna, Jr. |
| 2003/0235396 A1 | 12/2003 | Boston et al. |
| 2004/0010807 A1 | 1/2004 | Urdang et al. |
| 2004/0078828 A1 | 4/2004 | Parchman et al. |
| 2004/0081242 A1 | 4/2004 | Segev |
| 2004/0081333 A1 | 4/2004 | Grab et al. |
| 2004/0103429 A1 | 5/2004 | Carlucci et al. |
| 2004/0103437 A1 | 5/2004 | Allegrezza et al. |
| 2004/0151249 A1 | 8/2004 | Morel |
| 2004/0158858 A1 | 8/2004 | Paxton et al. |
| 2004/0187072 A1* | 9/2004 | Trott ..................... H03M 13/45 714/801 |

(56) References Cited

U.S. PATENT DOCUMENTS

| | | |
|---|---|---|
| 2004/0208247 A1 | 10/2004 | Barrau et al. |
| 2004/0244058 A1 | 12/2004 | Carlucci et al. |
| 2004/0252230 A1* | 12/2004 | Winder .......... H04N 21/440281 348/E7.071 |
| 2004/0255336 A1 | 12/2004 | Logan et al. |
| 2005/0010697 A1 | 1/2005 | Kinawi et al. |
| 2005/0034171 A1 | 2/2005 | Benya |
| 2005/0060742 A1 | 3/2005 | Riedl et al. |
| 2005/0108768 A1 | 5/2005 | Deshpande et al. |
| 2005/0114900 A1 | 5/2005 | Ladd et al. |
| 2005/0123381 A1 | 6/2005 | Weeden et al. |
| 2005/0125832 A1* | 6/2005 | Jost .................... H04N 21/2385 725/86 |
| 2005/0132264 A1 | 6/2005 | Joshi et al. |
| 2005/0138659 A1 | 6/2005 | Boccon-Gibod et al. |
| 2005/0152397 A1 | 7/2005 | Bai et al. |
| 2005/0183120 A1 | 8/2005 | Jain et al. |
| 2005/0198686 A1 | 9/2005 | Krause et al. |
| 2005/0210145 A1 | 9/2005 | Kim et al. |
| 2005/0227773 A1 | 10/2005 | Lu et al. |
| 2005/0232497 A1 | 10/2005 | Yogeshwar et al. |
| 2005/0240967 A1 | 10/2005 | Anderson et al. |
| 2005/0262529 A1 | 11/2005 | Neogi et al. |
| 2005/0276284 A1 | 12/2005 | Krause et al. |
| 2005/0289618 A1 | 12/2005 | Hardin |
| 2006/0025869 A1 | 2/2006 | Virdi et al. |
| 2006/0036750 A1 | 2/2006 | Ladd et al. |
| 2006/0078297 A1 | 4/2006 | Nishikawa et al. |
| 2006/0130107 A1 | 6/2006 | Gonder et al. |
| 2006/0130113 A1 | 6/2006 | Carlucci et al. |
| 2006/0161563 A1 | 7/2006 | Besbris et al. |
| 2006/0225118 A1 | 10/2006 | Rolls et al. |
| 2006/0280248 A1* | 12/2006 | Kim .................... H04N 19/513 375/E7.199 |
| 2007/0022459 A1 | 1/2007 | Gaebel, Jr. et al. |
| 2007/0024706 A1* | 2/2007 | Brannon, Jr. ...... H04N 21/6587 348/E7.071 |
| 2007/0031119 A1 | 2/2007 | Iwanaga |
| 2007/0033531 A1 | 2/2007 | Marsh |
| 2007/0047449 A1 | 3/2007 | Berger et al. |
| 2007/0058718 A1 | 3/2007 | Shen et al. |
| 2007/0058926 A1 | 3/2007 | Virdi et al. |
| 2007/0076728 A1 | 4/2007 | Rieger et al. |
| 2007/0094691 A1 | 4/2007 | Gazdzinski |
| 2007/0124416 A1 | 5/2007 | Casey et al. |
| 2007/0136742 A1 | 6/2007 | Sparrell |
| 2007/0147389 A1 | 6/2007 | Qing et al. |
| 2007/0153820 A1 | 7/2007 | Gould |
| 2007/0177677 A1 | 8/2007 | Thomsen |
| 2007/0188665 A1 | 8/2007 | Watson et al. |
| 2007/0204300 A1 | 8/2007 | Markley et al. |
| 2007/0204311 A1 | 8/2007 | Hasek et al. |
| 2007/0204314 A1 | 8/2007 | Hasek et al. |
| 2007/0217436 A1 | 9/2007 | Markley et al. |
| 2007/0237225 A1 | 10/2007 | Luo et al. |
| 2007/0250635 A1 | 10/2007 | Hamilton et al. |
| 2007/0253699 A1 | 11/2007 | Yen et al. |
| 2008/0015999 A1 | 1/2008 | Ali et al. |
| 2008/0016196 A1 | 1/2008 | MacMillan et al. |
| 2008/0077866 A1 | 3/2008 | Margulis |
| 2008/0104644 A1 | 5/2008 | Sato et al. |
| 2008/0162713 A1 | 7/2008 | Bowra et al. |
| 2008/0168066 A1* | 7/2008 | Ruiz-Velasco ......... H04N 21/84 |
| 2008/0168133 A1 | 7/2008 | Osborne |
| 2008/0181575 A1 | 7/2008 | Girard et al. |
| 2008/0201748 A1 | 8/2008 | Hasek et al. |
| 2008/0205644 A1 | 8/2008 | Lee et al. |
| 2008/0209464 A1 | 8/2008 | Wright-Riley |
| 2008/0209499 A1* | 8/2008 | Ramesh ................ H04H 20/26 725/138 |
| 2008/0235351 A1 | 9/2008 | Banga et al. |
| 2008/0235732 A1 | 9/2008 | Han et al. |
| 2008/0235746 A1 | 9/2008 | Peters et al. |
| 2008/0253447 A1 | 10/2008 | Cumpson et al. |
| 2008/0273591 A1 | 11/2008 | Brooks et al. |
| 2008/0273858 A1 | 11/2008 | Wald et al. |
| 2008/0276173 A1 | 11/2008 | Li et al. |
| 2008/0313691 A1 | 12/2008 | Cholas et al. |
| 2008/0320097 A1 | 12/2008 | Sawicki et al. |
| 2009/0006643 A1 | 1/2009 | Lee |
| 2009/0028182 A1 | 1/2009 | Brooks et al. |
| 2009/0037960 A1 | 2/2009 | Melby |
| 2009/0052870 A1 | 2/2009 | Marsh et al. |
| 2009/0079840 A1 | 3/2009 | Gandhi et al. |
| 2009/0083279 A1 | 3/2009 | Hasek |
| 2009/0100459 A1* | 4/2009 | Riedl .................. H04N 21/2405 725/35 |
| 2009/0122863 A1 | 5/2009 | Gacke |
| 2009/0150557 A1 | 6/2009 | Wormley et al. |
| 2009/0165067 A1 | 6/2009 | Bruckman et al. |
| 2009/0183196 A1 | 7/2009 | Chen et al. |
| 2009/0190652 A1 | 7/2009 | Kim et al. |
| 2009/0210899 A1 | 8/2009 | Lawrence-Apfelbaum et al. |
| 2009/0217326 A1 | 8/2009 | Hasek |
| 2009/0265617 A1 | 10/2009 | Randall et al. |
| 2009/0274212 A1 | 11/2009 | Mizutani et al. |
| 2009/0282093 A1 | 11/2009 | Allard et al. |
| 2009/0328090 A1 | 12/2009 | Randolph et al. |
| 2010/0023579 A1 | 1/2010 | Chapweske et al. |
| 2010/0052925 A1 | 3/2010 | Hirabayashi et al. |
| 2010/0075606 A1 | 3/2010 | Hargreaves |
| 2010/0080221 A1 | 4/2010 | Beatini et al. |
| 2010/0125882 A1 | 5/2010 | Athias |
| 2010/0125883 A1* | 5/2010 | Mukherjee ......... H04N 21/6125 725/92 |
| 2010/0135382 A1 | 6/2010 | Kim et al. |
| 2010/0175088 A1 | 7/2010 | Loebig et al. |
| 2010/0199318 A1 | 8/2010 | Chang et al. |
| 2010/0235432 A1 | 9/2010 | Trojer |
| 2010/0251304 A1 | 9/2010 | Donoghue et al. |
| 2010/0251305 A1 | 9/2010 | Kimble et al. |
| 2010/0293587 A1 | 11/2010 | Haimi-Cohen et al. |
| 2010/0319044 A1 | 12/2010 | Agans et al. |
| 2011/0016482 A1 | 1/2011 | Tidwell et al. |
| 2011/0050860 A1 | 3/2011 | Watson |
| 2011/0067049 A1 | 3/2011 | Piepenbrink et al. |
| 2011/0078536 A1* | 3/2011 | Han ...................... H03M 13/09 345/545 |
| 2011/0080940 A1 | 4/2011 | Bocharov et al. |
| 2011/0083154 A1* | 4/2011 | Boersma .............. H04N 21/637 725/116 |
| 2011/0103374 A1 | 5/2011 | Lajoie et al. |
| 2011/0103468 A1* | 5/2011 | Polisetty .................. G10L 25/78 375/E7.076 |
| 2011/0106847 A1 | 5/2011 | Bocharov et al. |
| 2011/0110515 A1 | 5/2011 | Tidwell et al. |
| 2011/0138019 A1 | 6/2011 | Bae et al. |
| 2011/0162007 A1 | 6/2011 | Karaoguz et al. |
| 2011/0188439 A1 | 8/2011 | Mao et al. |
| 2011/0283311 A1 | 11/2011 | Luong |
| 2012/0002728 A1 | 1/2012 | Eleftheriadis et al. |
| 2012/0011225 A1 | 1/2012 | Keum et al. |
| 2012/0030314 A1 | 2/2012 | Kim et al. |
| 2012/0030723 A1 | 2/2012 | Baum et al. |
| 2012/0036537 A1 | 2/2012 | Klappert et al. |
| 2012/0047542 A1 | 2/2012 | Lewis et al. |
| 2012/0124636 A1 | 5/2012 | Schaffer |
| 2012/0159542 A1 | 6/2012 | Minwalla |
| 2012/0173751 A1 | 7/2012 | Braness et al. |
| 2012/0179834 A1 | 7/2012 | Van Der Schaar et al. |
| 2012/0185905 A1 | 7/2012 | Kelley et al. |
| 2012/0192218 A1 | 7/2012 | Schwesinger et al. |
| 2012/0210216 A1 | 8/2012 | Hurst |
| 2012/0284747 A1 | 11/2012 | Joao |
| 2013/0007191 A1* | 1/2013 | Klappert .......... H04N 21/25866 709/217 |
| 2013/0019273 A1 | 1/2013 | Ma et al. |
| 2013/0044996 A1 | 2/2013 | Bhogal et al. |
| 2013/0046849 A1 | 2/2013 | Wolf et al. |
| 2013/0060958 A1 | 3/2013 | Keum et al. |
| 2013/0061045 A1 | 3/2013 | Kiefer et al. |
| 2013/0067052 A1 | 3/2013 | Reynolds et al. |
| 2013/0091251 A1 | 4/2013 | Walker et al. |

(56) References Cited

U.S. PATENT DOCUMENTS

| | | |
|---|---|---|
| 2013/0104162 A1 | 4/2013 | Helms et al. |
| 2013/0111517 A1 | 5/2013 | Dillon et al. |
| 2013/0117418 A1 | 5/2013 | Mutton et al. |
| 2013/0163816 A1* | 6/2013 | Hunt, Jr. ............... G06V 10/764 382/103 |
| 2013/0166690 A1 | 6/2013 | Shatzkamer |
| 2013/0188926 A1 | 7/2013 | Rajagopalan |
| 2013/0246643 A1* | 9/2013 | Luby ..................... H04L 65/762 709/231 |
| 2013/0276022 A1 | 10/2013 | Tidwell |
| 2013/0282876 A1 | 10/2013 | Watanabe et al. |
| 2013/0308874 A1* | 11/2013 | Togashi ......... H04N 21/440227 382/264 |
| 2013/0318629 A1 | 11/2013 | Lajoie et al. |
| 2013/0322348 A1* | 12/2013 | Julian ................ H04N 21/4384 370/329 |
| 2013/0346766 A1 | 12/2013 | Tani |
| 2014/0013349 A1 | 1/2014 | Millar et al. |
| 2014/0019635 A1 | 1/2014 | Reznik et al. |
| 2014/0040026 A1 | 2/2014 | Swaminathan et al. |
| 2014/0108585 A1 | 4/2014 | Barton et al. |
| 2014/0109143 A1 | 4/2014 | Craner |
| 2014/0119195 A1 | 5/2014 | Tofighbakhsh et al. |
| 2014/0164760 A1 | 6/2014 | Hybertson et al. |
| 2014/0189743 A1 | 7/2014 | Kennedy et al. |
| 2014/0189749 A1 | 7/2014 | Gordon et al. |
| 2014/0230003 A1 | 8/2014 | Ma et al. |
| 2014/0237520 A1 | 8/2014 | Rothschild et al. |
| 2014/0237522 A1 | 8/2014 | Rothschild et al. |
| 2014/0245346 A1 | 8/2014 | Cheng et al. |
| 2014/0282789 A1 | 9/2014 | Zhang |
| 2014/0355624 A1 | 12/2014 | Li et al. |
| 2014/0380398 A1 | 12/2014 | Schaffer |
| 2015/0006752 A1 | 1/2015 | O'Hare et al. |
| 2015/0036733 A1* | 2/2015 | Smadi .................. H04N 19/172 375/240.01 |
| 2015/0067754 A1* | 3/2015 | Wiser ............... H04N 21/64738 725/120 |
| 2015/0074399 A1 | 3/2015 | Nugent et al. |
| 2015/0089557 A1 | 3/2015 | Busse et al. |
| 2015/0092837 A1 | 4/2015 | Chen et al. |
| 2015/0095460 A1 | 4/2015 | Berger et al. |
| 2015/0095511 A1 | 4/2015 | McGowan et al. |
| 2015/0127845 A1 | 5/2015 | Phillips et al. |
| 2015/0180924 A1 | 6/2015 | O'Callaghan |
| 2015/0188974 A1 | 7/2015 | Garcia-Mendoza Sanchez et al. |
| 2015/0256843 A1 | 9/2015 | Roskowski |
| 2015/0261600 A1 | 9/2015 | Iturralde et al. |
| 2015/0271234 A1 | 9/2015 | O'Malley et al. |
| 2015/0271541 A1 | 9/2015 | Gonder et al. |
| 2015/0281751 A1 | 10/2015 | Nemiroff et al. |
| 2015/0373385 A1 | 12/2015 | Straub et al. |
| 2016/0080028 A1* | 3/2016 | Madaiah ................ H04B 1/707 375/130 |
| 2016/0103830 A1 | 4/2016 | Cheong et al. |
| 2016/0164841 A1 | 6/2016 | Mikhailov et al. |
| 2016/0165173 A1 | 6/2016 | Lesh |
| 2016/0188344 A1 | 6/2016 | Tamir et al. |
| 2016/0191133 A1 | 6/2016 | Noh et al. |
| 2016/0269455 A1 | 9/2016 | Casey et al. |
| 2016/0307596 A1 | 10/2016 | Hardin et al. |
| 2016/0308958 A1* | 10/2016 | Navali .................... H04N 21/65 |
| 2016/0323617 A1 | 11/2016 | Marchand et al. |
| 2016/0323891 A1* | 11/2016 | Zhang .................. H04W 72/23 |
| 2016/0330764 A1 | 11/2016 | Kim et al. |
| 2017/0127298 A1 | 5/2017 | Ryu et al. |
| 2017/0171766 A1 | 6/2017 | Amizur |
| 2017/0244926 A1 | 8/2017 | Kotab |
| 2017/0277909 A1* | 9/2017 | Kraemer .................. G06F 21/10 |
| 2017/0302959 A1 | 10/2017 | Samchuk et al. |
| 2017/0366833 A1 | 12/2017 | Amidei et al. |
| 2018/0039779 A1 | 2/2018 | Li et al. |
| 2018/0097690 A1 | 4/2018 | Yocam et al. |
| 2018/0098292 A1 | 4/2018 | Gulati et al. |
| 2018/0131979 A1 | 5/2018 | Bayoumi et al. |
| 2018/0192094 A1 | 7/2018 | Barnett et al. |
| 2018/0213251 A1 | 7/2018 | Ikonin et al. |
| 2018/0313148 A1 | 11/2018 | Hummel et al. |
| 2018/0368122 A1 | 12/2018 | Kuchibhotla et al. |
| 2018/0373748 A1* | 12/2018 | Kuhnke ............... H04N 21/2665 |
| 2018/0376474 A1 | 12/2018 | Khoryaev et al. |
| 2019/0014337 A1 | 1/2019 | Skupin et al. |
| 2019/0014363 A1 | 1/2019 | Skupin et al. |
| 2019/0069038 A1* | 2/2019 | Phillips ............ H04N 21/64769 |
| 2019/0166306 A1 | 5/2019 | Zen et al. |
| 2019/0320494 A1 | 10/2019 | Jayawardene et al. |
| 2020/0034332 A1 | 1/2020 | Maynard et al. |
| 2020/0045110 A1 | 2/2020 | Varnica et al. |
| 2021/0250196 A1 | 8/2021 | Das et al. |

FOREIGN PATENT DOCUMENTS

| | | |
|---|---|---|
| JP | 2007060178 A | 3/2007 |
| JP | 2007324814 A | 12/2007 |
| JP | 2009519678 A | 5/2009 |
| JP | 2012527829 A | 11/2012 |
| JP | 2013524618 A | 6/2013 |
| WO | WO-2013058684 A1 | 4/2013 |
| WO | WO-2018106166 A1 | 6/2018 |

OTHER PUBLICATIONS

Bentaleb, A., et al., "A Survey on Bitrate Adaptation Schemes for Streaming Media Over HTTP," IEEE Communications Surveys & Tutorials, 2019, vol. 21(1), pp. 562-585.

Ting H., et al. "Trick Play Schemes for Advanced Television Recording on Digital VCR," IEEE, 1995, pp. 1159-1168.

Yuan, Y., et al., "A Mixed Scheme to Improve Subjective Quality in Low Bitrate Video," IEEE Wireless Communications and Networking Conference, 2004, pp. 1754-1759.

Zhangf G., et al., "Implementing Hierarchical Trick Play for HTTP Video Streaming", IEEE, 2010, pp. 465-468.

Zhu P., et al,. "Trick Play Function for VOD with SVC Source," IEEE, 2010, pp. 255-259.

CableLabs Asset Distribution Interface (ADI) Specification, Version 1 1, MD-SP-ADI1.103-040107, Jan. 7, 2004. pp. 1-26.

\* cited by examiner

APPARATUS AND METHODS FOR LATENCY REDUCTION IN DIGITAL CONTENT SWITCHING OPERATIONS

PRIORITY

This application is a divisional of and claims priority to co-owned U.S. patent application Ser. No. 15/689,733 filed on Aug. 29, 2017 entitled "APPARATUS AND METHODS FOR LATENCY REDUCTION IN DIGITAL CONTENT SWITCHING OPERATIONS," and issuing as U.S. Pat. No. 10,958,948 on Mar. 23, 2021, which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of delivery of digital media data (e.g., text, video, and/or audio) over data delivery networks, and specifically in one aspect to the enhancement of user experience during digital media data delivery, such as by reduction of the delay in switching between content sources.

2. Description of Related Technology

The distribution of digital content (e.g., media such as television programming and music, as well as programming guides such as electronic program guides (EPGs) and related user aids) has expanded over time to a variety of different environments and user platforms. Network operators to deliver its video products to customers using a variety of different devices, thereby enabling their users or subscribers to access content in a number of different contexts, both fixed (e.g., at their residence) and mobile (such as while traveling or away from home).

Moreover, content delivery may be specific to the network operator, such as where the content is ingested by the network operator or its proxy, and delivered to the network users or subscribers as a product or service of the network operator. For instance, a cable multiple systems operator (MSO) may ingest content from multiple different sources (e.g., national networks, content aggregators, etc.), process the ingested content, and deliver it to the MSO subscribers via e.g., a hybrid fiber coax (HFC) cable/fiber network, such as to the subscriber's set-top box or DOCSIS cable modem. Such ingested content is transcoded to the necessary format as required (e.g., MPEG-2 or MPEG-4/AVC), framed and placed in the appropriate media container format ("packaged"), and transmitted via e.g., statistical multiplex into a multi-program transport stream (MPTS) on 6 MHz radio frequency (RF) channels for receipt by the subscribers RF tuner, demultiplexed and decoded, and rendered on the user's rendering device (e.g., digital TV) according to the prescribed coding format. Similarly, VOD and so-called switched digital video (SDV) may utilize a single-program transport stream (SPTS) delivery modality.

Alternatively via so-called "over-the-top" or OTT delivery may be used, wherein content from a third party source who may be unaffiliated with the network operator provides content directly to the requesting user or subscriber via the network operator's infrastructure, e.g., via an IP-based transport; i.e., the content is packetized and routed for delivery to the requesting user based on the user's network or IP address, such as via a high-speed DOCSIS cable modem, according to the well-known Internet Protocol network-layer protocol. IP unicasts (point to point) or multicasts (point to multiple points) have traditionally been used as the mechanism by which the OTT content is distributed over the network, via the user accessing a prescribed URL and logging in with their credentials to gain access to the content. The IP content is then streamed via the unicast/multicast to the requesting user(s), and received and decoded by a media player application program ("app") on the user's PC, laptop, or other IP-enabled end-user device.

There are many types of what could be considered "OTT" content delivery. Network operator-focused ("broadcast") OTT models typically uses subscriber ISPs (e.g., the cable MSO) to deliver OTT services. For this approach, OTT delivery may involve a tight coupling of application control, embedded securely in smart TVs or set-top boxes, and a cohesive primary content origination strategy. This typically includes a streaming video-based workflow that connects content publishing sources with the MSO content management system. This, in turn, is synchronized with the applications in the end-user or subscriber devices; content is presented in the form of an application-based electronic program guide (EPG) or other user interface on the user device.

Hence, the broadcast OTT provider's services will appear integrated with traditional (e.g., linear) programming, whereas "simple streaming" third-party services such as YouTube and Netflix utilize separate applications. For example, a typical user might see YouTube, and Netflix apps as separate options on his/her "main" smart TV display menu, but would not see the integrated (broadcast OTT) content as a standalone menu application. In effect, the broadcast OTT provider's "app" is native to and tightly coupled with the other (e.g., broadcast) services provided via the IP-enabled user device.

Addressable Content

A comparatively recent introduction in content delivery is so-called "addressable" content, such as linear addressable advertising (LAA). In general, addressable content allows for the user-specific (e.g., address- or DSTB-specific) targeting of content, such as advertisements. Such targeted content can be dynamically inserted or spliced into the primary content (e.g., linear, VOD, etc.) that the particular user/client is consuming, or alternatively particular client devices (e.g., the "targeted" device) can be re-tuned to a different source of content, such as a different RF QAM or even a local source such as a premises DVR that has been pre-loaded with device/user-specific targeted content. Currently, a range of delivery paradigms may be utilized for targeted content insertion, including QAM, multicast, IP, adaptive bit rate (ABR), and DVR, as well as time-shifted video and OD platforms such as VOD.

Addressable content selection may be network based, client based, or combinations thereof. For example, the "ad decisioning" may occur within the client device (such as using a stack or "app" resident on the client to make decisions on which ad(s) should be inserted, and call an advertising content source to request the content). Alternatively, other models place such decision processes in the network, such as where the client device detects a cue in the in-band primary content signal regarding an impending insertion opportunity, and obtains the network-selected advertising content (e.g., selected by a campaign manager or automated process based on one or more selection criteria) for rendering via the client device.

In an IP-based context, the client rendering app (e.g., player or OTT content provider app) may access targeted advertising content via e.g., one or more URLs indicated as part of a manifest file sent to the client from the targeting entity (e.g., via a JIT packager process or the like). Hybrid systems may also be utilized, such as via use of QAM-based multicast content feeds in conjunction with an IP backhaul (e.g., via a DSTB's integrated DOCSIS modem) to make the advertising decisions within the network, and use IP to acquire the advertising assets from e.g., a network-based or third party advertising server.

The targeting (decisioning) logic used by the network and/or client side processes above can be based, for example, on demographics of the user/client device (e.g., subscriber data obtained from the user's account), historical tuning or other patterns, geographic location, stated user preferences, and the like.

As the targeting of the advertising or other such content increases in granularity, the modality used for delivery of the targeted content must be considered as well. For example, where a particular geographic area is targeted (low granularity) linear broadcast or multicast methods can be used, due to the commonality across a large number of recipients of the same content. Conversely, where a particular premises (e.g., household) or even individual within the premises is targeted, the content must either be delivered via a point-to-point system (such as a unicast session for VoD or nPVR content for example) and spliced in, or uniquely sourced from a network repository such as a URL, or even a user-specific source such as a local content repository (e.g., user's local DVR hard drive). Hence, while extant "linear ad splicer" or "time-shifted playlist generation" functions provide very high levels of performance relative to perceived latency (i.e., generally produce seamless transitions), they cannot be employed in all delivery models. In "multi-sourced" content elements (e.g., a guide from the cloud, advertising from an advertising agency, and VOD session from a headend), network-based and client-based switching (e.g., Layer 3 switching based on IP address) or even QAM retune must be utilized.

Cloud-Based Functions

In order to gain operational and economic efficiencies, technology stacks have over time generally migrated towards the "cloud" or network side of content delivery networks (e.g., into regionalized data centers), and away from the end user (client) consuming devices. Hence, the client device's content presentation capabilities are dictated increasingly by these cloud-based functions (including network-side caching architecture), along with the on-board storage and processing power of the client device and its associated software stack.

For example, cloud-based EPGs (electronic program guides) are increasingly configured to provide a streamlined user experience, reduced device processing and storage footprint, and a consistent and simple mechanism for software upgrades across multiple different types of HW/SW platforms (e.g., different OEM devices). For instance, HTML 5-based cloud apps are increasingly replacing native apps (i.e., those incorporated into the design of the device at time of manufacture) for implementing such functions. Implementations such as the cloud-based "Spectrum Guide" offered by the Assignee hereof is more labor intensive for the client, due largely to the need for client processes or functions to interface with network-side entities or processes.

Specifically, in the foregoing example of cloud-delivered EPGs, all objects (from content poster art to the elements of the day/time grid, and most visual video content) is stitched and delivered as a single stream to the client device (e.g., DSTB), as opposed to being indigenously generated by the DSTB. Specifically, the program guide elements (e.g., graphics) are stitched together as a transport stream, while video content that is utilized within a window or other display element of this program guide on the user device comes from a different source, and any advertisements come from yet a third location, akin to the operation of a web browser. This approach can present several challenges in performance, specifically with respect to latency associated with video transitions from one program channel to another, from one type of content to another (such as VOD to DVR), as well as video content to advertising content (e.g., linear addressable content, described above) transitions. Even in the most basic channel tuning functions, such transitions can take several seconds, due to inter alia, the need to repopulate/generate EPG display elements based on the cloud data and service.

Further, with the cloud-based model described above, services may not have native access to device-specific attributes or capabilities such as hardware acceleration, component or device sleep modes, power management functions, etc.; this lack of access can result in less-than-optimal performance for such cloud-based services. In effect, the "one size fits all" model of cloud-based apps trades certain aspects of client device performance for ubiquity and consistency across heterogeneous platforms.

Moreover, in the case of a DSTB within a QAM-based RF network such as an HFC cable network, the RF tuner of the DSTB has to tune to and acquire signal from a new QAM where the alternate or "switched to" content is placed (as contrasted with, for example a network-side switching operation or content splice, which is effectively instantaneous from a client perspective).

As a brief aside, subscribers or users characteristically make programming selection decisions in less than 1 second (based on anecdotal evidence of the Assignee hereof). Conversely, a typical user has difficulty perceiving delays less than several milliseconds. Hence, the aforementioned multi-second latency or delay is highly detrimental to user experience, including by failing to keep users engaged with particular content, and with the service provider brand in general.

Other sources of delay in content switching transactions may exist as well. For instance, where the (primary) video content is delivered encoded in one format (e.g., H.264) and the switched-to content (e.g., addressable advertisement) is encoded in a different format (e.g., MPEG-2), delays in processing the MPEG-2 content may arise from, inter alia, processing to support the rendering of MPEG-2 content (e.g., identification and utilization of an MPEG-2 compatible decoder or player on the client device). Conversely, the motion compensation and other features associated with H.264 and other advanced codecs (discussed in greater detail below) can require significant processing overhead, thereby adding to the computational burden on the DSTB (or other client device). Likewise, open-GOP (group of pictures)

processing versus closed-GOP processing can consume additional time and resources, as described in greater detail subsequently herein.

Accordingly, improved apparatus and methods are needed to address one or more of the foregoing issues relating to poor user experience, particularly in the cloud-based delivery paradigms which may utilize multiple distinct sources for content delivery, and require transitions between the sources (such as linear video to addressable advertising and back). Ideally, such improved apparatus and methods would be compatible with extant technology environments (including cloud-based models), requiring only minimal changes to software or firmware in the client-side and network-side devices.

SUMMARY

The present disclosure addresses the foregoing needs by providing, inter alia, apparatus and methods for enhancing user experience through reduced switching delays during content changes.

In one aspect of the disclosure, a method of reducing switching latency associated with a transition from a first content data element to a second content data element is disclosed. In one embodiment, the first content data element comprising a plurality of open groups of pictures (GOPs) and a plurality of closed GOPs, and the method includes causing a segmentation process to segment the first content data element only at one or more points, each of the one or more points corresponding to the end of a closed GOP.

In another embodiment, the method includes: processing the first content data element to identify at least one insertion or transition point where the second content data element will begin; determining that the at least one insertion or transition point is associated with an open group of pictures (GOP); and processing the first content data element to either: (i) close the open GOP before the insertion or transition point is reached; or (ii) truncate a portion of the first content data element such that the insertion or transition point occurs at an end of a closed GOP that proceeds the open GOP.

In one variant, the processing the first content data element to either: (i) close the open GOP before the insertion or transition point is reached; or (ii) truncate a portion of the first content data element such that the insertion or transition point occurs at an end of a closed GOP that proceeds the open GOP, includes processing the first content data element to delete or remove any one or more frames that refer to a frame in a previous or next GOP in the first content data element. For example, the processing of the first content data element may further include: (a) determining whether said open GOP begin with an I-frame; and (b) based at least on determining that said open GOP does not begin with an I-frame, cause said open GOP to begin with an I-frame by removing one or more non-I-frame frames within the open GOP at the beginning thereof.

In another variant, the processing the first content data element to either: (i) close the open GOP before the insertion or transition point is reached; or (ii) truncate a portion of the first content data element such that the insertion or transition point occurs at an end of a closed GOP that proceeds the open GOP, includes processing the first content data element to: (a) identify a first closed GOP that precedes and is closest in proximity to the open GOP within the first content data element; and (b) delete all frames and GOPs within the first data element that occur after the identified first closed GOP that precedes the open GOP yet which precede the insertion or transition point. In one implementation, the method further includes inserting at least one black I-frame between the identified first closed GOP that precedes the open GOP and the insertion or transition point.

In another implementation the method further includes inserting at least one I-frame between the identified first closed GOP that precedes the open GOP and the insertion or transition point, the at least one I-frame comprising at least one I-frame from a subsequent portion of the first content data element after the insertion or transition point, the at least one I-frame comprising a selected preview frame.

In another embodiment, the method includes: causing delivery of the first content data to a client device; processing the first content data to identify at least one transition data element indicating a transition to the second content data; prior to the transition by the client device, causing the client device to configure one or more functions to increase the availability of processing assets to support the transition; receiving data indicative of the transition; and based at least one the received data, causing the client device to return the configured one or more functions to their prior configuration.

In one variant, the processing the first content data, causing the client device to configure, and the receiving data are performed at least in part by a software process operative to run on the client device. In another variant, the processing the first content data, causing the client device to configure, and the receiving data are performed at least in part by a software process operative to run on a network server with which the client device is in data communication via a managed network operator network.

In yet another variant, the method further includes selecting the configured one or more functions from a plurality of functions available for configuration, the plurality of functions ranked according to a processing overhead or latency reduction produced by said configuration, the selecting based at least in part on the ranking.

In still another variant, the method further includes selecting the configured one or more functions from a plurality of functions available for configuration, the selecting based at least in part on determining which of the plurality of functions available for configuration are currently being used by the client device.

In a further variant, the transition comprises transcoding at least a portion of the second content data into an encoding format able to be rendered by the client device; e.g., transcoding from an MPEG-2 encoding format to an H.264 format.

In another variant, the configuration of one or more functions comprises suspending at least a portion of motion estimation processing utilized by an H.264 decoding process used to render the first content data element.

In another aspect of the disclosure, a method of switching from first content data to second content data is disclosed. In one embodiment, the method includes: causing delivery of the first content data to a client device; processing the first content data to identify at least one transition data element indicating an impending transition to the second content data; causing, prior to the transition to the second content data by the client device and based at least on the identified at least one transition data element, configuring of one or more network functions to increase the availability of processing assets at the client device to support the transition; receiving data indicative of the transition from the client; and based at least one the received data, causing reconfiguring of the configured one or more network functions to their prior configuration.

In one variant, the configuring of one or more functions includes reducing the streaming bit rate of data associated with the first content data. For example, the reducing the streaming bit rate of data associated with the first content data includes causing a streaming server apparatus of a content delivery network that is delivering the first content data to reduce an adaptive bitrate (ABR) used for streaming the first content data to the client device.

In another variant, the configuring of one or more functions includes increasing at least one of a transmit power or spatial diversity of a wireless base station so as to reduce an error rate of wireless transmission of data associated with the first content data.

In a further variant, the configuring of one or more functions includes reducing a display resolution associated with at least a portion of the first content data. For example, in one implementation, reducing the display resolution includes selectively reducing a display resolution of only data associated with one or more peripheral portions of respective ones of a plurality of frames of the first content data, while maintaining a display resolution associated with non-peripheral portions of the plurality of frames unchanged.

In another embodiment of the method of switching, the method includes: causing delivery of the first content data to a client device, the first content data comprising at least one data element indicative of switching to the second content data; and prior to the client device encountering the at least one data element: determining a network proximity of the client device to a plurality of content sources for the second content data; selecting, based at least on the determined network proximity, one of the plurality of content sources for delivery of the second content to the client device; causing a manifest file to be generated, the manifest file comprising data indicative of the selected one of the plurality of content sources; and causing transmission of the generated manifest file to the client device.

In one variant, the determining a network proximity comprises determining or estimating a temporal delay associated with the client device obtaining the second content data from each of the plurality of content sources.

In another variant, the determining a network proximity comprises determining a number of network node hops between the client device and each of the plurality of content sources.

In a further variant, the method further includes: determining a respective encoding type or level of the second content data for each of the plurality of content sources. The selecting, based at least on the determined network proximity, comprises for example selecting based at least on: (i) the determined network proximity, and (ii) the determined respective encoding type or level.

In another embodiment, the method includes: processing the first content element to identify a data element where the second content element will begin; identifying at least one first radio frequency (RF) physical channel upon which the first content element is currently being delivered; and scheduling the second content element for delivery on at least one of: (i) the at least one first RF physical channel; and (ii) at least one second RF physical channel, the at least one second RF physical channel being within a prescribed relationship to the at least one first physical channel.

In one variant, the scheduling reduces said switching latency by one or more client devices switching from said first content element to said second content element. In one implementation, the at least one first RF physical channel and the at least one second physical channel each comprises one or more QAM-modulated carriers having a bandwidth of 6 MHz.

In another implementation, the at least one first RF physical channel comprises a plurality of RF carriers, the first content element currently being delivered on a first one of the plurality of RF carriers; and the scheduling of the second content element on at least one of: (i) the at least one first RF physical channel; and (ii) at least one second RF physical channel, comprises scheduling the second content element on a second one of the plurality of RF carriers in an immediately adjacent frequency band to the first one of the plurality of RF carriers.

In yet another implementation, the at least one first RF physical channel comprises a plurality of RF carriers, the first content element currently being delivered on at least a portion of the plurality of RF carriers using time and frequency diversity; and the scheduling of the second content element on at least one of: (i) the at least one first RF physical channel; and (ii) at least one second RF physical channel, comprises scheduling the second content element on at least a portion of the plurality of RF carriers using at least one of (a) time diversity with the first content element, and/or (b) frequency diversity with the first content element. For example, the delivery on at least a portion of the plurality of RF carriers using time and frequency diversity may include use of orthogonal frequency division multiplexing (OFDM), and the plurality of RF carriers are each QAM-modulated.

In another aspect of the disclosure, a packager apparatus is disclosed. In one embodiment, the packager apparatus is configured for use in a content delivery network (e.g., as a just-in-time or JIT packager) and includes: a first interface configured to communicate with a network; a processor apparatus; and a storage apparatus in data communication with the first interface and the processor apparatus and comprising at least one computer program, the at least one computer program comprising a plurality of instructions.

In one variant, the plurality of instructions are configured to, when executed by the processor apparatus, cause the packager apparatus to: receive video data comprising a plurality of GOPs (groups of pictures), the plurality of GOPs comprising an open GOP proximate a content insertion point; process the received video data to either: (i) close the open GOP; or (ii) delete a portion of the plurality of GOPs not including last closed GOP closest to the open GOP, and insert one or more I-frames after the last closed GOP; generate a plurality of chunks of the processed received video data; and generate a manifest file including data relating to the plurality of chunks.

In one implementation, the data relating to the plurality of chunks comprises metadata; and the plurality of instructions are further configured to, when executed by the processor apparatus, cause the packager apparatus to generate a plurality of metadata, the metadata for transmission to a rendering client device as part of the manifest file, the metadata configured to cause the rendering client device to access one or more functions to reduce processing overhead as the insertion point within the video data is reached.

In another implementation, the data relating to the plurality of chunks comprises at least one network address where second video data to be inserted at the insertion point; and the plurality of instructions are further configured to, when executed by the processor apparatus, cause the packager apparatus to select the at least one network address so as to minimize latency of the client device accessing and rendering the second video data.

In a further implementation, the data relating to the plurality of chunks comprises at least one network address where second video data to be inserted at the insertion point; and the plurality of instructions are further configured to, when executed by the processor apparatus, cause the packager apparatus to cause caching of at least a portion of the second video data at the at network address, the at least one network address associated with a storage location which reduces latency of the client device accessing and rendering the second video data over at least one other possible storage location available for storing the second video data.

In a further aspect, a non-transitory computer readable apparatus is disclosed. In one embodiment, the apparatus includes a storage medium having one or more computer programs disposed thereon. The one or more programs are configured to, when executed on a processing device of a network device, manage secondary content insertions for served client devices so as to mitigate content switch latency, such as via e.g., intelligent selection of secondary content sources that are "proximate" the client, and/or pre-processing of the primary content being delivered to the client so as to eliminate or minimize high-overhead content processing operations.

In another aspect, a network architecture is disclosed. In one embodiment, the architecture includes a client process (e.g., app or middleware operative to run on a client device, and content transition manager (CTM) entity configured to communicate with the client process to coordinate content transitions or switches so as to minimize latency perceived by the user.

In yet another aspect, a latency-reduced client device is disclosed. In one embodiment, the client device comprises a digital set-top box used in conjunction with a managed content distribution network and configured to communicate with one or more network processes to mitigate switching latency through one or more active and/or passive measures. In another embodiment, the client device comprises a wireless-enabled mobile device capable of rendering video and audio content thereon according to a prescribed encoding and protection format (e.g., MPEG-2 or MPEG-4/AVC, and DRM).

These and other aspects shall become apparent when considered in light of the disclosure provided herein.

BRIEF DESCRIPTION OF THE DRAWINGS

FIG. 5-1 is a logical flow diagram representing one embodiment of a method for reducing switching latency associated with a packetized content transition such as between primary and secondary content.

FIG. 5-1a is a logical flow diagram representing one implementation of the secondary content source optimization process of the method of FIG. 5-1.

FIG. 5-1b is a logical flow diagram representing another implementation of the secondary content source optimization process of the method of FIG. 5-1.

FIG. 5-2 is a logical flow diagram representing another embodiment of a method for reducing switching latency associated with a packetized content transition.

FIG. 5-3 is a logical flow diagram representing a further embodiment of a method for reducing switching latency associated with a packetized content transition.

FIG. 5-3a is a logical flow diagram representing one implementation of the open GOP processing algorithms of the method of FIG. 5-3.

FIG. 5-3b is a graphical illustration of exemplary open- and closed-GOP frame structures of the type that can be utilized by the methodologies of FIGS. 5-3 and 5-3a.

FIG. 5-4 is a logical flow diagram representing yet another embodiment of a method for reducing switching latency associated with a QAM re-tune event within an exemplary HFC cable plant according to the present disclosure.

FIG. 5-5 is a logical flow diagram representing yet an additional embodiment of a method for reducing switching latency associated with a packetized content transition, utilizing native client functionality accessible via the CLM process.

Figure 1:
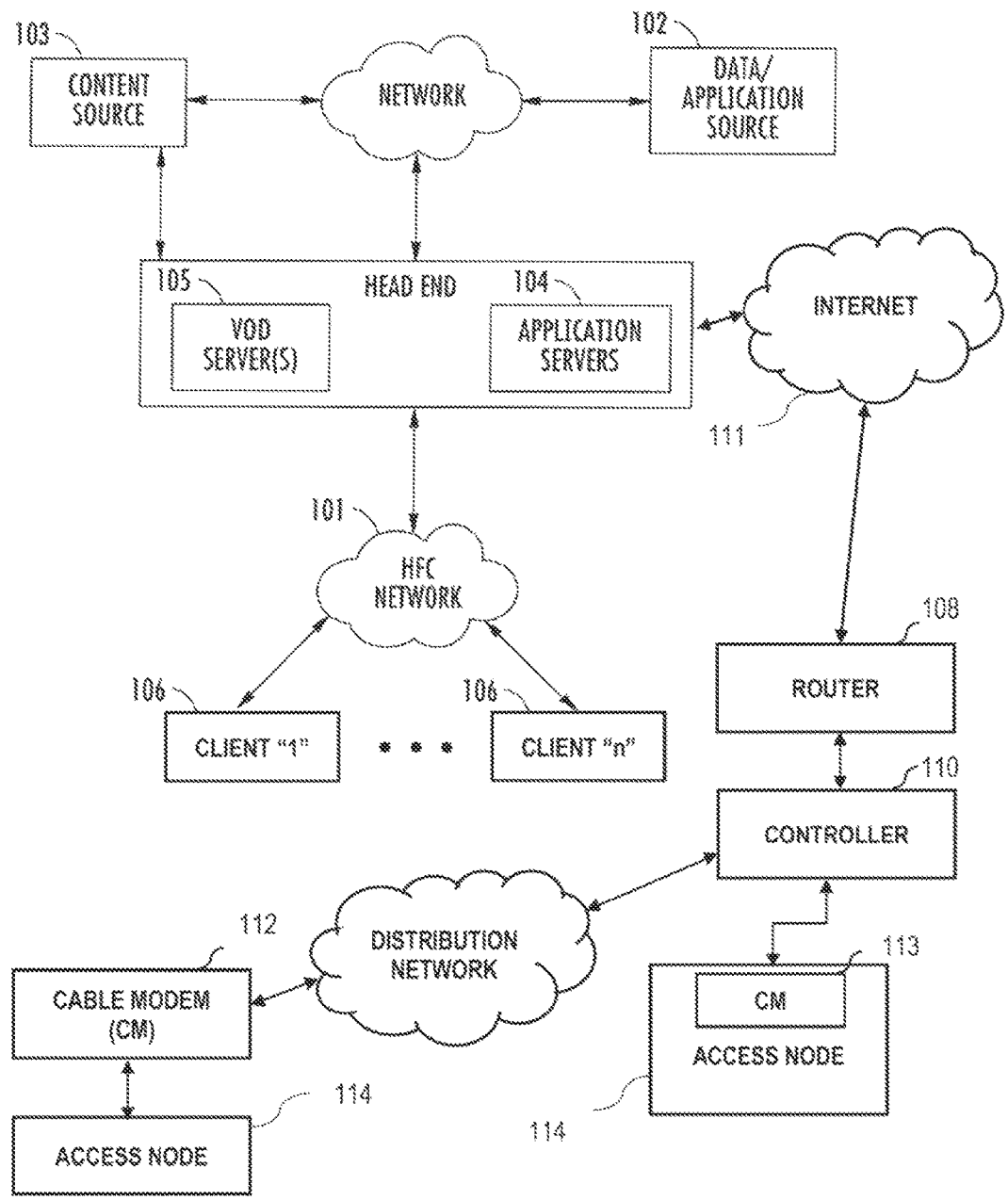
FIG. 1 is a functional block diagram illustrating an exemplary hybrid fiber network configuration useful with various aspects of the present disclosure.

All figures © Copyright 2017 Charter Communications, Inc. All rights reserved.

DETAILED DESCRIPTION

Reference is now made to the drawings wherein like numerals refer to like parts throughout.

As used herein, the term "application" refers generally and without limitation to a unit of executable software that implements a certain functionality or theme. The themes of applications vary broadly across any number of disciplines and functions (such as on-demand content management, e-commerce transactions, brokerage transactions, home entertainment, calculator, etc.), and one application may have more than one theme. The unit of executable software generally runs in a predetermined environment; for example, the unit could include a downloadable Java Xlet™ that runs within the JavaTV™ environment.

As used herein, the term "client device" includes, but is not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, "phablets", smartphones, Smart TVs, USB-based devices, and vehicle infotainment or navigation systems.

As used herein, the term "codec" refers to a video, audio, or other data coding and/or decoding algorithm, process or apparatus including, without limitation, those of the MPEG (e.g., MPEG-1, MPEG-2, MPEG-4/H.264, etc.), Real (RealVideo, etc.), AC-3 (audio), DIVX, XVID/ViDX, Windows Media Video (e.g., WMV 7, 8, 9, 10, or 11), ATI Video codec, or VC-1 (SMPTE standard 421M) families.

As used herein, the term "computer program" or "software" is meant to include any sequence of human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

The term "Customer Premises Equipment (CPE)" refers without limitation to any type of electronic equipment located within a customer's or subscriber's premises and connected to or in communication with a network.

As used herein, the term "digital processor" is meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, and application-specific integrated circuits (ASICs). Such digital processors may be contained on a single unitary IC die, or distributed across multiple components.

As used herein, the term "display" means any type of device adapted to display information, including without limitation CRTs, LCDs, TFTs, plasma displays, LEDs (e.g., OLEDs), incandescent and fluorescent devices, or combinations/integrations thereof. Display devices may also include less dynamic devices such as, for example, printers, e-ink devices, and the like.

As used herein, the term "DOCSIS" refers to any of the existing or planned variants of the Data Over Cable Services Interface Specification, including for example DOCSIS versions 1.0, 1.1, 2.0, 3.0, and 3.1.

As used herein, the term "headend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, and the Internet.

As used herein, the terms "Internet" and "internet" are used interchangeably to refer to inter-networks including, without limitation, the Internet.

As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "MSO" or "multiple systems operator" refer to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANS, WANS, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the term "network interface" refers to any signal or data interface with a component or network including, without limitation, those of the FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11, Wi-Fi Direct, etc.), LTE/LTE-A, WiMAX (802.16), Zigbee®, Z-wave, PAN (e.g., 802.15), power line carrier (PLC), or IrDA families.

As used herein, the term "QAM" refers to modulation schemes used for sending signals over cable networks. Such modulation scheme might use any constellation level (e.g. QPSK, 16-QAM, 64-QAM, 256-QAM, etc.) depending on details of a cable network. A QAM may also refer to a physical channel modulated according to the schemes.

As used herein, the term "server" refers to any computerized component, system or entity regardless of form which is adapted to provide data, files, applications, content, or other services to one or more other devices or entities on a computer network.

As used herein, the term "storage" refers to without limitation computer hard drives, DVR device, memory, RAID devices or arrays, optical media (e.g., CD-ROMs, Laserdiscs, Blu-Ray, etc.), or any other devices or media capable of storing content or other information, whether local, virtual, or cloud-based.

As used herein, the term "wireless" means any wireless signal, data, communication, or other interface including without limitation Wi-Fi, Bluetooth/BLE, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), CBRS (3.5 GHZ), 802.20, Zigbee®, Z-wave, narrowband/FDMA, OFDM, PCS/DCS, LTE/LTE-A/LTE-U/LTE-LAA, analog cellular, CDPD, satellite systems, millimeter wave or microwave systems, acoustic, and infrared (i.e., IrDA).

Overview

In one aspect, the apparatus and methods of the present disclosure minimize undesirable latency, such as those associated with content switches, tuning and "cloud" guide transitions across the entire user experience. In one embodiment, the apparatus and methods are configured to selectively utilize one or more latency-mitigating techniques (e.g., singly, or as an ensemble), including as directed by a management process (client latency manager, or CLM) operative to run on the client device and/or a network-side entity with which the client device communicates.

In one implementation, a packager entity is disclosed which is configured to, upon notification of an impending transition, process all content data so as to eliminate or truncate any open-GOP structures within the content stream. Concurrently, the transitions are "normalized" where possible for consistent user experience and delay masking, such as via one or more uniform (e.g., black) I-frames inserted across all transitions. In another implementation, a client device is disclosed that is configured to, upon notification or detection of an impending content transition, suspend one or more processing or other functions to as to free processing resources. For example, functionality such as logging, data collection, display of certain ancillary imagery, icons, on-screen tools, etc. may be temporarily suspended in trade for reduced content transition latency. Similarly, less intensive processing may be substituted for extant high-overhead processing, such as temporary reduction in display resolution for certain display elements, reduction in motion estimation as part of decode according to the prevailing codec (e.g., H.264).

In a further implementation, a network process is disclosed which is configured to evaluate codecs associated with each of the switched-from and switched-to content elements, and attempt to maximize commonality through choice of one of a plurality of differently encoded or transcoded versions of the same content element. Alternately, in another implementation, the quality of the switched-to (and/or switched from) content is temporarily reduced so as to reduce processing overhead on the client device.

In yet another implementation, a network-side session control process (e.g., SRM or Session Resource Manager) is disclosed that allocates sessions for primary and secondary content in a manner which mitigates or eliminates resulting DSTB retunes. For example, in one variant, the primary and secondary content sessions are allocated to the same QAM (or another QAM immediately adjacent within the frequency spectrum).

In a further implementation, predictive caching is utilized, so as to reduce latency associated with obtaining and delivering the addressed content. For example, certain high-use advertisements are predictively cached closer to or at the point of delivery within the network, and in encoding formats consistent with the primary content being viewed.

Detailed Description of Exemplary Embodiments

Exemplary embodiments of the apparatus and methods of the present disclosure are now described in detail. While these exemplary embodiments are described in the context of a managed network (e.g., hybrid fiber coax (HFC) cable) architecture having a multiple systems operator (MSO), digital networking capability, IP delivery capability, and a plurality of client devices, the general principles and advantages of the disclosure may be extended to other types of networks and architectures that are configured to deliver digital media data (e.g., text, video, and/or audio), whether managed or unmanaged. Such other networks or architectures may be broadband, narrowband, wired or wireless, or otherwise.

It will also be appreciated that while described generally in the context of a network providing service to a customer or consumer (e.g., residential) end user domain, the present disclosure may be readily adapted to other types of environments including, e.g., commercial/enterprise and government/military applications. Myriad other applications are possible.

It is further noted that while exemplary embodiments are described primarily in the context of a cable system with 6 MHz RF channels, the present disclosure is applicable to literally any network topology or paradigm, and any frequency/bandwidth or transport modality.

Additionally, while exemplary embodiments are described primarily in the context of media content delivery services to users via a managed content distribution network, various aspects of the present disclosure are applicable to other types of services that are delivered through a combination of cloud and locally administered storage and compute resources including without limitation iOS/Android mobile devices, browser-based multimedia platforms, consumer electronic devices such as Smart TVs, and gaming consoles.

Also, while certain aspects are described primarily in the context of the well-known Internet Protocol (described in, inter alia, RFC 791 and 2460), it will be appreciated that the present disclosure may utilize other types of protocols (and in fact bearer networks to include other internets and intranets) to implement the described functionality.

Other features and advantages of the present disclosure will immediately be recognized by persons of ordinary skill in the art with reference to the attached drawings and detailed description of exemplary embodiments as given below.

Service Provider Network—

FIG. 1 illustrates a typical service provider network configuration useful with the user experience optimization features described herein.

As opposed to an unmanaged network, the managed service-provider network of FIG. 1 advantageously allows, inter alia, control and management of a given user's access (such user which may be a network subscriber, or merely an incidental/opportunistic user of the service) via the client devices 106, cable modems 113, wireless access node(s) 114, or yet other apparatus.

In certain embodiments, the service provider network also advantageously permits the aggregation and/or analysis of subscriber- or account-specific data (including inter alia, particular mobile devices associated with such subscriber or accounts) as part of the provision of services to users under the exemplary delivery models described herein. As but one example, device specific IDs (e.g., MAC address or the like) can be cross-correlated to MSO subscriber data maintained at e.g., the network headend(s) so as to permit or at least facilitate, among other things, (i) user authentication; (ii) correlation of aspects of behavior to particular subscriber demographics, such as for delivery of targeted advertising; and (iii) determination of subscription level, and hence subscriber privileges and access to content/features. Moreover, device profiles for particular user devices can be maintained by the MSO.

The wireless access nodes 114 (e.g., WLAN, CBRS, or LTE small cell or eNodeB) can be coupled to the bearer managed network (FIG. 1) via, e.g., a cable modem termination system (CMTS) and associated local DOCSIS cable modem (CM), a wireless bearer medium (e.g., an 802.16 WiMAX system), a fiber-based system such as FiOS or similar, a third-party medium which the managed network operator has access to (which may include any of the foregoing), or yet other means.

The various components of the exemplary embodiment of the network 100 include (i) one or more data and application origination sources 102; (ii) one or more content sources 103, (iii) one or more application distribution servers 104; (iv) one or more VOD servers 105, (v) client devices and/or Customer Premises Equipment (CPE) 106, (vi) one or more routers 108, (vii) one or more wireless access point controllers 110 (may be placed more locally as shown or i the headend or core" portion of network), (viii) one or more cable modems 112, and/or (ix) one or more access nodes 114 (which may or may not include embedded cable modems 113 as shown). The application server(s) 104, VOD servers 105 and CPE/client device(s) 106 are connected via a bearer (e.g., HFC) network 101. A simple architecture comprising one of each of certain components 102, 103, 104, 105, 108, 110 is shown in FIG. 1 for simplicity, although it will be recognized that comparable architectures with multiple origination sources, distribution servers, VOD servers, controllers, and/or client devices (as well as different network topologies) may be utilized consistent with the present disclosure. For example, the headend architecture of FIG. 1*a* (described in greater detail below), or others, may be used.

Figure 1A:
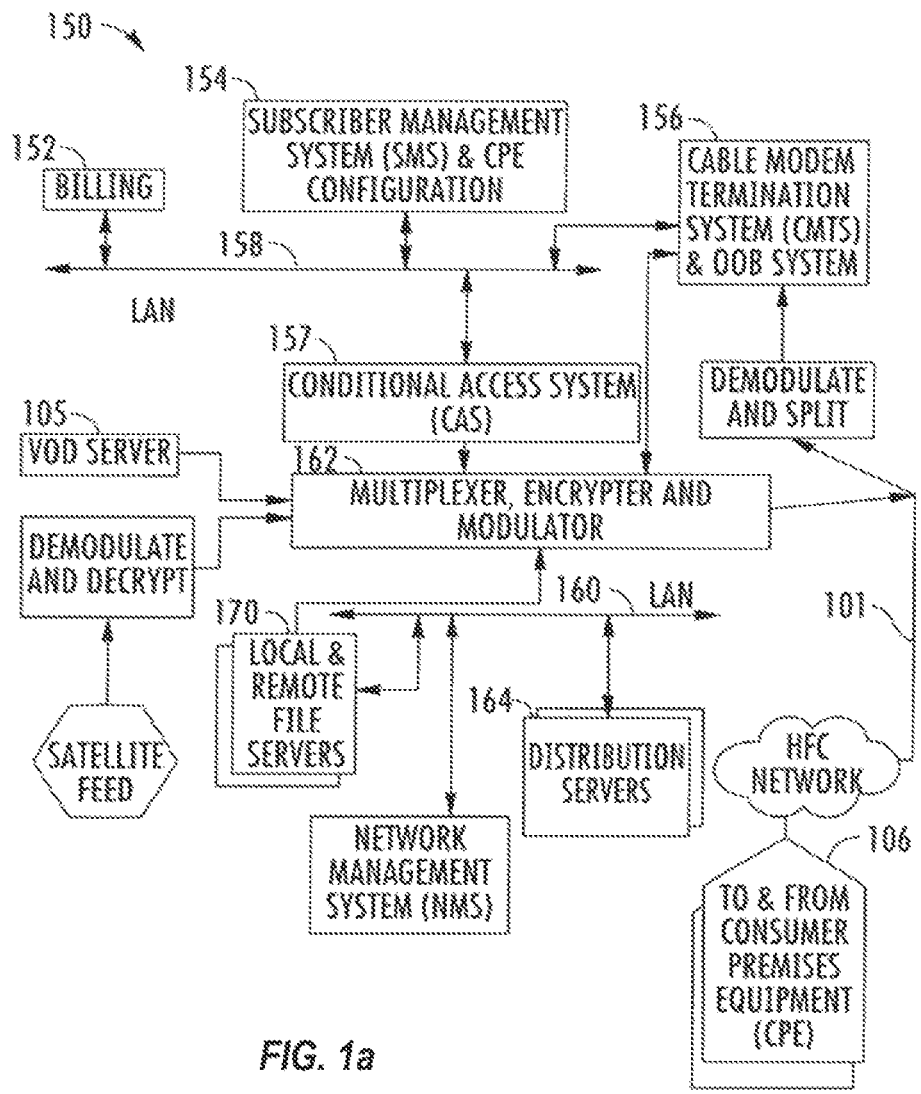
FIG. 1a is a functional block diagram illustrating one exemplary network headend configuration useful with various aspects of the present disclosure.

FIG. 1*a* shows one exemplary embodiment of a headend architecture. As shown in FIG. 1*a*, the headend architecture 150 comprises typical headend components and services including billing module 152, subscriber management system (SMS) and client/CPE configuration management module 154, cable modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the disclosure. It will also be appreciated that the headend configuration depicted in FIG. 1*a* is high-level, conceptual architecture, and that each MSO may have multiple headends deployed using custom architectures.

The exemplary architecture 150 of FIG. 1*a* further includes a conditional access system (CAS) 157 and a multiplexer-encrypter-modulator (MEM) 162 coupled to the HFC network 101 adapted to process or condition content for transmission over the network. The distribution servers 164 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). As previously described, information is carried across multiple channels. Thus, the headend must be adapted to acquire the information for the carried channels from various sources. Typically, the channels being delivered from the headend 150 to the client devices/CPE 106 ("downstream") are multiplexed together in the headend, as previously described and sent to neighborhood hubs (as shown in the exemplary scheme of FIG. 1*b*) via a variety of interposed network components, including coaxial cable and fiber backhauls 121, 122.

Figure 1B:
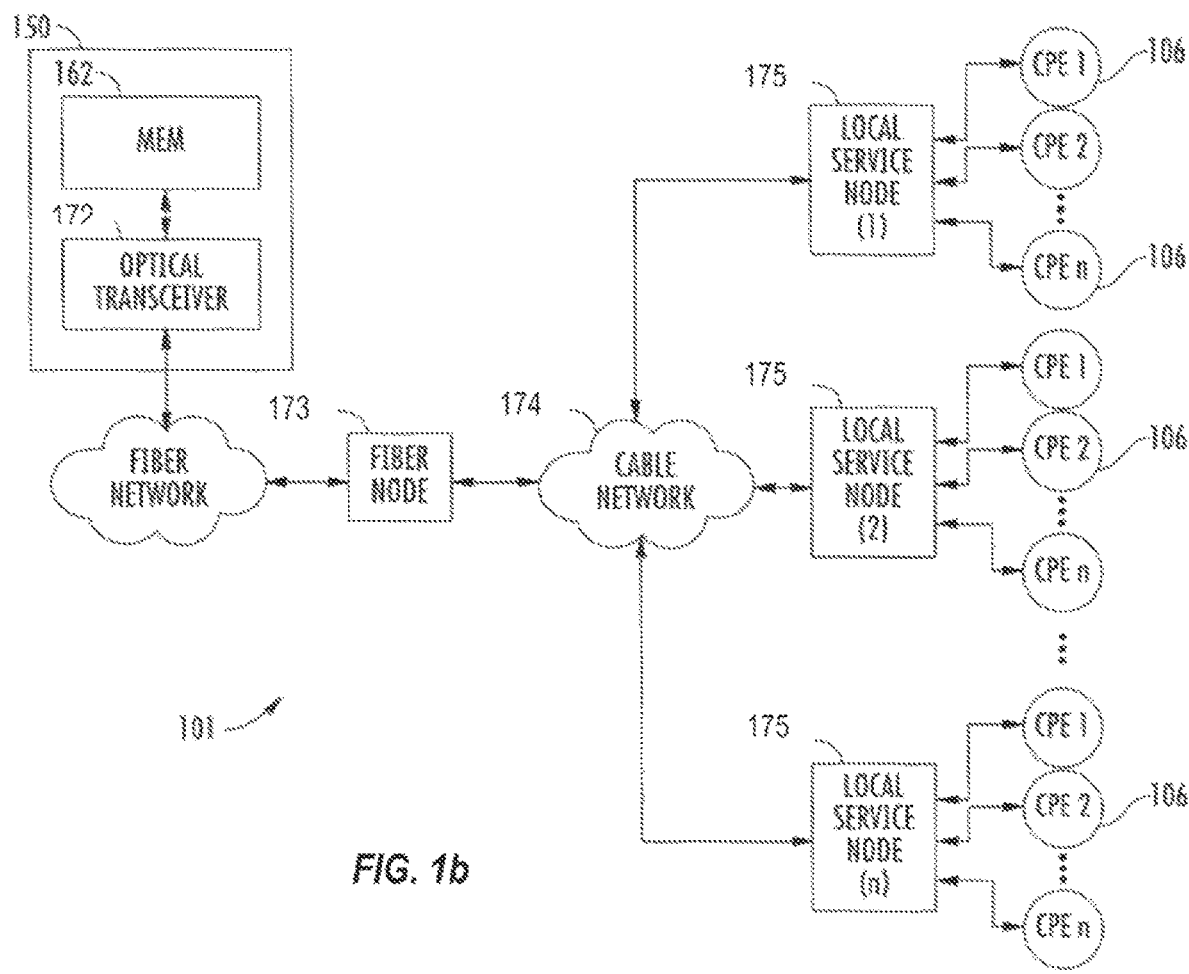
FIG. 1b is a functional block diagram illustrating one exemplary local service node configuration useful with various aspects of the present disclosure.

As shown in FIG. 1*b*, the network 101 of FIGS. 1 and 1*a* comprises a fiber/coax arrangement wherein the output of the MEM 162 of FIG. 1*a* is transferred to the optical domain (such as via an optical transceiver 172 at the headend or further downstream). The optical domain signals are then distributed to a fiber node 173, which further distributes the signals over a cable distribution network 174 to a plurality of local servicing nodes 175. This provides an effective 1: N expansion of the network at the local service end. It will be appreciated that the CPE 106 shown in FIG. 1*b* may in fact comprise CMs or CMTS, or other devices such as the embedded cable modem access node 113, or wireless access nodes 114.

Figure 1C:
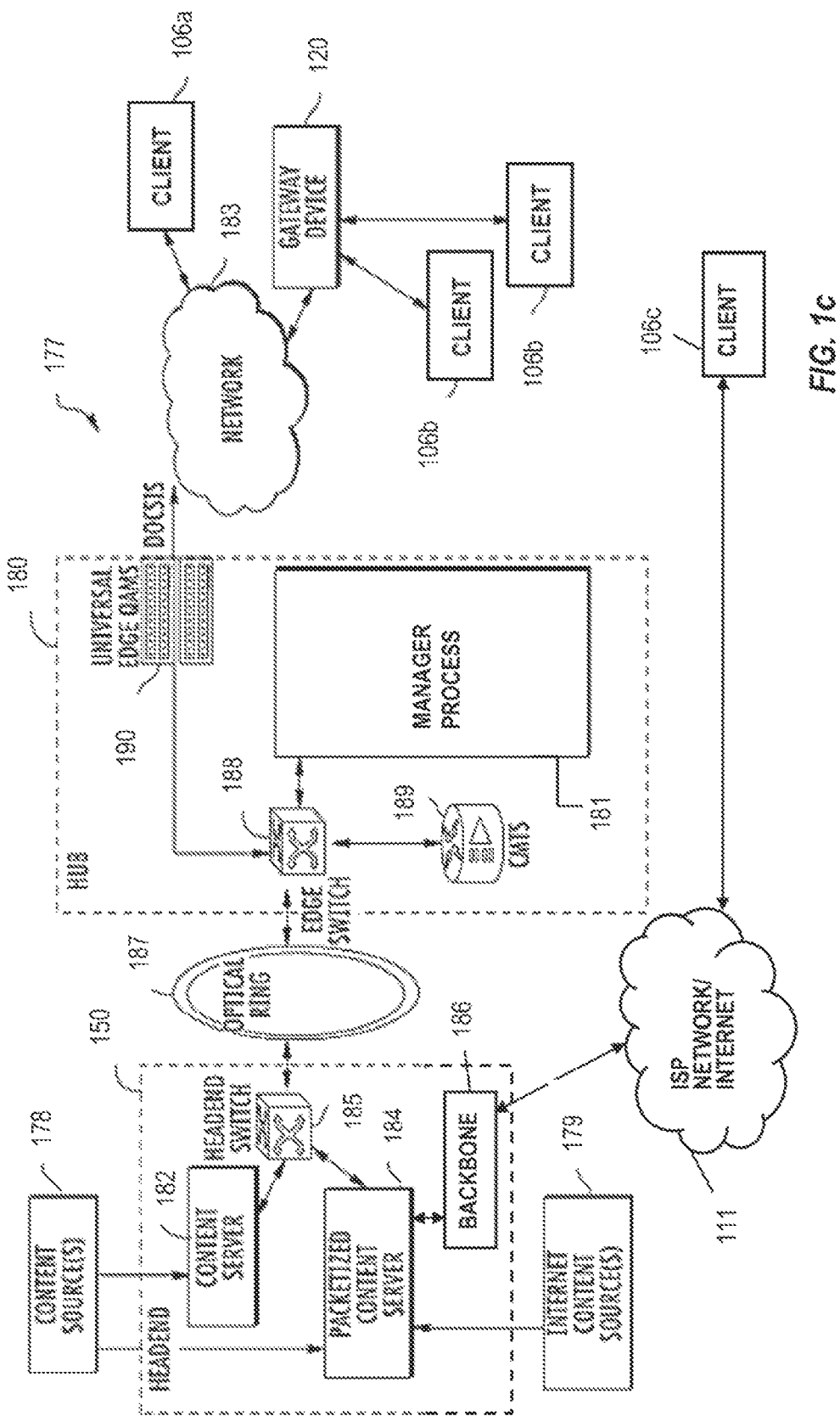
FIG. 1c is a functional block diagram illustrating one exemplary packetized content delivery network architecture useful with various aspects of the present disclosure.

FIG. 1*c* illustrates another exemplary network architecture for the delivery of packetized content that may be utilized consistent with the present disclosure. In addition to on-demand and broadcast content (e.g., video programming), the system of FIG. 1*c* may deliver Internet data services using the Internet protocol (IP), although other protocols and transport mechanisms of the type well known in the digital communication art may be substituted. The network architecture 177 of FIG. 1*c* generally comprises a managed content distribution network having one or more local headends 150 in communication with at least one hub 180 via an optical ring 187. The distribution hub 180 is able to provide content to various user devices, client devices 106, and gateway devices 120, via a network 183.

Various content sources 178 are used to provide content to a content server 182. For example, content may be received from a local, regional, or network content library as discussed in co-owned U.S. Pat. No. 8,997,136 entitled "APPARATUS AND METHODS FOR PACKETIZED CONTENT DELIVERY OVER A BANDWIDTH-EFFICIENT NETWORK", which is incorporated herein by reference in its entirety. Alternatively, content may be received from linear analog or digital feeds, as well as third party content sources. Internet content sources 179 (such as e.g., a web server) provide internet content to a packetized content server 184. Other IP content may also be received at the packetized content server 184, such as voice over IP (VOIP) and/or IPTV content. Content may also be received from subscriber and non-subscriber devices (e.g., a PC or smartphone-originated user made video). In one embodiment, the functionality of both the content server 182 and packetized content server 184 may be integrated into a single server entity.

A central media server located in the headend 150 may be used as an installed backup to the hub media servers as (i) the primary source for lower demand services, and (ii) as the source of the real time, centrally encoded programs with PVR (personal video recorder) capabilities. By distributing the servers to the hub stations 180 as shown in FIG. 1*c*, the size of the fiber transport network associated with delivering VOD services from the central headend media server is advantageously reduced. Hence, each user has access to several server ports located on at least two servers. Multiple paths and channels are available for content and data distribution to each user, assuring high system reliability and enhanced asset availability. Substantial cost benefits are derived from the reduced need for a large content distribution network, and the reduced storage capacity requirements for hub servers (by virtue of the hub servers having to store and distribute less content).

It will also be recognized that a heterogeneous or mixed server approach may be utilized consistent with the disclosure. For example, one server configuration or architecture may be used for servicing cable, satellite, HFCu, etc., subscriber CPE-based session requests (e.g., those initiated from a users DSTB), while a different configuration or architecture may be used for servicing mobile client requests. Similarly, the content servers 182, 184 may either be single-purpose/dedicated (e.g., where a given server is dedicated only to servicing certain types of requests), or alternatively multi-purpose (e.g., where a given server is capable of servicing requests from different sources).

The network 177 of FIG. 1*c* may further include a legacy multiplexer/encrypter/modulator (MEM; see FIG. 1*a*) coupled to the network 183 adapted to "condition" content for transmission over the network. In the present context, the content server 182 and packetized content server 184 may be coupled to the aforementioned LAN, thereby providing access to the MEM and network 183 via one or more file servers (not shown). The content server 182 and packetized content server 184 are coupled via the LAN to a headend switching device 185 such as an 802.3z Gigabit Ethernet (or incipient "10G") device. Video and audio content is multiplexed at the headend 150 and transmitted to the edge switch device 188 (which may also comprise an 802.3z Gigabit Ethernet device).

In one exemplary delivery paradigm MPEG-based video content may be delivered, with the video transported to user PCs (or IP-based client devices) over the relevant transport (e.g., DOCSIS channels) comprising MPEG (or other video codec such as H.264 or AVC) over IP over MPEG. That is, the higher layer MPEG or other encoded content may be encapsulated using an IP protocol, which then utilizes an MPEG packetization of the type well known in the art for delivery over the RF channels or other transport, such as via a multiplexed transport stream (MPTS). In this fashion, a parallel delivery mode to the normal broadcast delivery exists; e.g., in the cable paradigm, delivery of video content both over traditional downstream QAMs to the tuner of the user's STB or other receiver device for viewing on the television, and also as packetized IP data over the DOCSIS QAMs to the user's PC or other IP-enabled device via the user's cable modem. Delivery in such packetized modes may be unicast, multicast, or broadcast. Delivery of the IP-encapsulated data may also occur over the non-DOCSIS QAMs, as described in greater detail elsewhere herein.

Individual client devices 106 of the implementation of FIG. 1c may be configured to monitor the particular assigned RF channel (such as via a port or socket ID/address, or other such mechanism) for IP packets intended for the subscriber premises/address that they serve.

In the switched digital variant, the IP packets associated with Internet services are received by the edge switch 188 (which is controlled by a management process 181 based on, e.g., operational or other considerations, such as advertising campaigns), and forwarded to the cable modem termination system (CMTS) 189. The CMTS examines the packets, and forwards packets intended for the local network to the edge switch. Other packets are in one variant discarded or routed to another component. As an aside, a cable modem is used to interface with a network counterpart (e.g., CMTS) so as to permit two-way broadband data service between the network and users within a given service group, such service which may be symmetric or asymmetric as desired (e.g., downstream bandwidth/capabilities/configurations may or may not be different than those of the upstream).

The edge switch forwards the packets receive from the CMTS to the QAM modulator, which transmits the packets on one or more physical (QAM-modulated RF) channels to the client devices. The IP packets are typically transmitted on RF channels that are different than the RF channels used for the broadcast video and audio programming, although this is not a requirement. As noted above, the client devices are each configured to monitor the particular assigned RF channel (such as via a port or socket ID/address, or other such mechanism) for IP packets intended for the subscriber premises/address that they serve.

In one embodiment, both IP data content and IP-packetized audio/video content is delivered to a user via one or more universal edge QAM devices 190. According to this embodiment, all of the content is delivered on DOCSIS channels, which are received by a premises gateway 120 and distributed to one or more client devices 106 in communication therewith. Alternatively, the client devices 106 may be configured to receive IP content directly without need of the gateway or other intermediary. As a complementary or back-up mechanism, audio/video content may also be provided in downstream (in-band) channels as discussed above; i.e., via traditional "video" in-band QAMs. In this fashion, a co-enabled digital set-top box (DSTB) or other client devices could readily tune to the new (in-band) RF video QAM. This may even be accomplished via appropriate logic within the client devices (e.g., autonomously, or based on signaling received from the headend or other upstream entity, or even at direction of a user in the premises; e.g., by selecting an appropriate DSTB or other client device function).

In another variant, IP simulcast content and existing on-demand, voice, and broadcast content are all provided to the headend switch device 185 of FIG. 1c. The headend switch 185 then provides the content to the optical ring 187 for provision to one or more distribution hubs 180. IP simulcast content is in one exemplary implementation retrieved from a plurality of content sources at an IPTV server.

The IP-packet content in the architecture of FIG. 1c is transmitted to subscriber devices via the universal edge QAM 190 and the edge network 183. The IP video ("simulcast") content is presented to client devices capable of receiving content over the DOCSIS QAMs. For example, the aforementioned gateway device 120 (as well as an advanced client device 106a such as an IP-enabled DSTB) may receive the IP simulcast. Legacy CPE may receive content via the gateway device 120, or via an audio/video "back-up" MPEG transport stream as previously described.

In the illustrated embodiment, the gateway device 120 serves as a gateway to the IP content for other client devices 106b. The gateway device 120 may communicate with one or more connected client devices 106b, as well as utilize Wi-Fi or other wireless capabilities (where so equipped) to communicate wirelessly to other devices.

In parallel with (or in place of) the foregoing delivery mechanisms, the MSO backbone 186 and other network components can be used to deliver packetized content to the user's mobile end-user device (EUD) 106c via non-MSO networks. For example, the previously described "OTT" content (whether tightly coupled or otherwise) can be ingested, stored within the MSO's network infrastructure, and delivered to the user's mobile end-user device via an interposed ISP (Internet Service Provider) network and public Internet 111 (e.g., at a local coffee shop, via a Wi-Fi AP connected to the coffee shop's ISP via a modem, with the user's IP-enabled end-user device 106c utilizing an Internet browser or MSO/third-party app to stream content according to an HTTP-based approach).

It is still further appreciated that the delivery of content may include delivery from an "off-net" distribution hub (not shown) to another network (not shown), not associated with the MSO. In this embodiment, a requesting device (such as client device 106 or gateway 120) may request content from a local headend 150 which is transferred over both MSO-maintained ("on-net") and "off-net" networks advantageously.

Figure 1D:
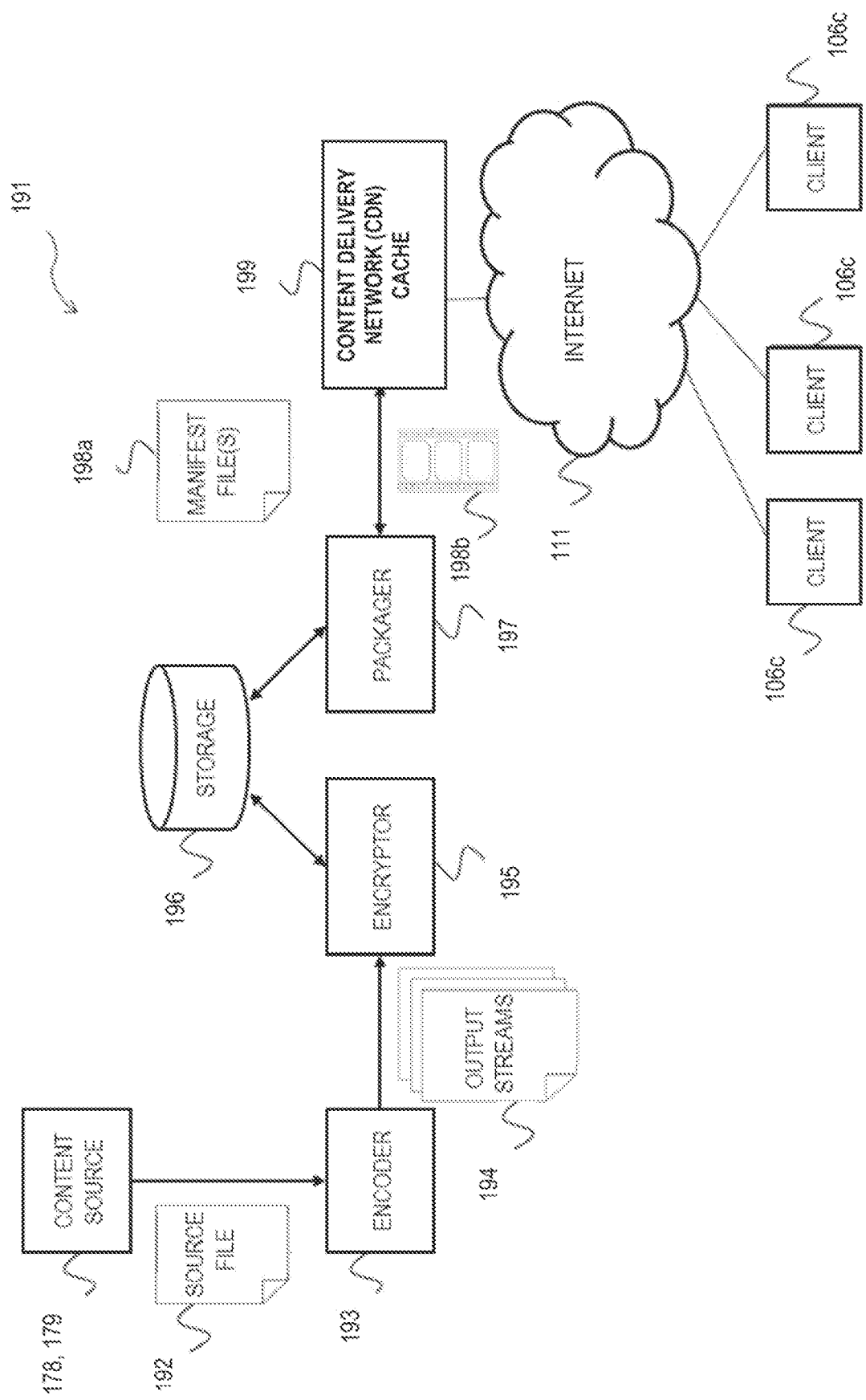
FIG. 1d is a functional block diagram of an exemplary packet content processing system useful in conjunction with the network architectures of FIGS. 1-1c.

FIG. 1d discloses an exemplary configuration of an architecture 191 for providing video or other media content to client devices 106 via a content delivery network (CDN). The content provision entities (e.g., packager(s) 197) are in communication with client devices 106 via the distribution network 111 and the CDN cache 199. In one embodiment of the present disclosure, the distribution network 111 comprises an internet, such as e.g., the Internet. While described in the context of an Internet Protocol network, it will be recognized that the principles of the disclosure may be extended to other transport modalities and network paradigms.

The requesting client device 106c may include home gateway devices 120 (see FIG. 1c) and/or media-enabled client devices. Such media-enabled client devices may include, without limitation, tablets, phablets, smart phones, smart televisions (TVs), desktop and laptop personal computers (PC), and portable media players. In another embodiment, the media client device may comprise a file server; file servers are common in both commercial and residential use. For example, a subscriber may have a PC which can play media files, but which also serves his/her other consumer electronics (e.g., smart phone and tablet).

In one embodiment of the present disclosure, an encoder process 193 encodes a source file 192 from a content source 178, 179 into at least one encoding format (e.g., transcodes a source file from one format to at least one other format). In another variant, the source file 192 is encoded into a plurality of encodings that correspond to a respective plurality of one or more device types, codecs, resolutions, file formats, audio encodings, bit rates, etc. The variety of encodings may be utilized by the CDN cache 199 (and the packager 197) via adaptive bitrate (ABR) streaming.

As a brief aside, video compression is used in many current and emerging products, such as digital television set-top boxes (DSTBs), digital satellite systems (DSSs), high definition television (HDTV) decoders, mobile devices such as tablets, smartphones, and personal media devices (PMDs), digital versatile disk (DVD) players, video conferencing, Internet video and multimedia content, and other digital video applications. Without video compression, digital video content can be extremely large, making it difficult or even impossible for the digital video content to be efficiently stored, transmitted, or viewed. Such compression typically comes at the price of loss of information present in the original (non-compressed) version, and hence are "lossy."

There are numerous video coding methods that compress digital video content. Consequently, video coding standards have been developed to standardize the various video coding methods so that the compressed digital video content is rendered in formats that a majority of video decoders can recognize. For example, the Motion Picture Experts Group (MPEG) and International Telecommunication Union (ITU-T) have developed video coding standards that are in wide use. Examples of these standards include the MPEG-1, MPEG-2, MPEG-4, ITU-T H.261, and ITU-T H.263 standards. The MPEG-4 Advanced Video Coding (AVC) standard (also known as MPEG-4, Part 10) is a newer standard jointly developed by the International Organization for Standardization (ISO) and ITU-T. The MPEG-4 AVC standard is published as ITU-T H.264 and ISO/IEC 14496-10. For purposes of clarity, MPEG-4 AVC is referred to herein as H.264.

Most modern video coding standards, such as H.264, are based in part on a temporal prediction with motion compensation (MC) algorithm. Temporal prediction with motion compensation is used to remove temporal redundancy between successive frames in a digital video broadcast. The temporal prediction with motion compensation algorithm includes a motion estimation (ME) algorithm that typically utilizes one or more reference pictures to encode a particular picture. A reference picture is a picture that has already been encoded. By comparing the particular picture that is to be encoded with one of the reference pictures, the temporal prediction with motion compensation algorithm can take advantage of the temporal redundancy that exists between the reference picture and the particular picture that is to be encoded and encode the picture with a higher amount of compression than if the picture were encoded without using the temporal prediction with motion compensation algorithm.

Motion estimation in an encoder is typically a computationally intensive process, and hence where speed and reduced processing overhead are desired, reduction or even removal of motion compensation processing can greatly expedite e.g., display or rendering of video data.

Adaptive bitrate (ABR) streaming is a technique to distribute program content over a large distributed network. Multiple bitrates of a particular piece of content are available to stream to a viewer, and the selection of the bit rate is based on current network conditions. This means that when there is greater bandwidth availability, a larger bitrate version of the content may be selected. If available bandwidth narrows, a lower bitrate (i.e., smaller) version of the content may be selected to provide a seamless user experience. Non-limiting examples of ABR streaming include, without limitation, MPEG-Dynamic Adaptive Streaming over HTTP (DASH), Adobe® Dynamic Streaming for flash, Apple® HTTP Adaptive Streaming, Microsoft® Smooth Streaming, QuavStreams® Adaptive Streaming over HTTP, and upLynk®.

Returning again to FIG. 1d, a source file 192 from a content source is input to the encoder 193. Various content sources 178, 179 may provide source files 204 to the encoder 202. For example, content may be received from a local, regional, or network content library as discussed in co-owned U.S. Pat. No. 8,997,136 previously incorporated herein. Alternatively, content may be received from linear analog or digital feeds, as well as third party content sources. Internet content sources (such as e.g., a web server) may also provide Internet content to the encoder 193. In yet another embodiment, content may be received from subscriber and/or non-subscriber devices (e.g., a PC or smartphone-originated user made video).

The source file 192 may be encoded in a variety of formats (both audio and video), bit rates, resolutions, which are each playable on a variety of devices. Accordingly, one or more output streams 194 are produced by the encoder 193. For example, a content delivery network may enable a wide variety of user devices to play a certain piece of content. Accordingly, a network operator selects to have the encoder 193 encode the content into multiple formats for use on the variety of players. In a further embodiment, a network operator selects to utilize adaptive bitrate streaming such that multiple bit rate streams are utilized by selecting an optimized stream from the output streams 194, e.g., the stream that best utilizes the viewer's device and current bandwidth constraints to provide an optimal playback experience. The optimization occurs via a process or application running at the encoder 193.

As a brief aside, video decoding generally comprises three frame types, Intra frames (I-frames), Predictive frames (P-frames), and Bi-directional frames (B-frames). H.264 allows other types of coding such as Switching I (SI) and Switching P (SP) in the Extended Profile (EP). I-frames are generally more important to a video codec than P-frames, and P-frames are generally more important to a video codec than B-frames. B-frames are dependent on previous I-frames and P-frames. A GOP (group of pictures) can contain each of I-frames (i.e., one I-frame per GOP in MPEG2), P-frames, and B-frames. The I-frames contain the full image, and do not require any additional information to reconstruct it.

Two types of GOPS exist: open and closed. Open GOPs are most efficient because they allow an extra B-frame in the GOP pattern, and start with a B-frame that is able to look at the last P-frame from the preceding GOP (as well as the first I-frame of its own GOP). In contrast, closed GOPs cannot contain any frame that refers to a frame in the previous or next GOP, and begin with an I-frame. B-frames are interpolated from one or more preceding or successive reference frames (either I-frames or P-frames).

Open GOPs generally provide better compression than do closed GOPs of the same structure and size, due in part to the fact that a closed GOP contains one more P-frame than does an open GOP of the same length. Since P-frames generally require more bits than do B-frames, the open GOP achieves better compression. However, there are limitations to using open GOPs, depending on the application. For example, certain formats require closed GOPs at certain boundaries (e.g., chapter markers). An output stream 194 such as in FIG. 1d comprises a series of open and/or closed GOPs; most often, open and closed GOPs are intermixed unless "closed GOP" only is specified at the encoder.

A typical video encoder algorithm can specify GOP size (frames per GOP). Longer GOPs generally provide better compression. The less average motion that exists from one frame to the next generally correlates to longer P-frame spacing, since the predictions won't change unduly. Longer P-frame spacing also generally correlates to greater compression.

Other parameters that may be used by the encoder 193 to encode the source file 192 include for example: (i) whether the output streams should be encoded into separate video and audio only tracks, or video tracks with audio included, (ii) an appropriate key frame period, (iii) a frame rate, (iv) segmentation duration, (v) video resolutions, (vi) video bitrate, (vii) audio bit rate (where necessary), (viii) audio sample rate, (ix) a number of audio channels, (x) aspect ratio, (xi) video codec, (xii) specific device profiles, (xiii) audio volume, (xiv) file type and extension, and (xv) standard specific encoding profiles. Standard specific encoding profiles include e.g., H.264, which includes different standard encoding profiles for baseline, main, and high encoding. Additionally, the encoder 193 may utilize information used for cutting out other resolutions/aspect ratios from a higher resolution/different aspect ratio file. For example, the encoder 193 may center-punch a standard definition (SD) image or video from a high definition (HD) source. Similarly, an HD image or video may be center punched from a 4K, 8K, 16K source.

In one variant, the encoder 193 up-converts source files 192 to produce higher bit rate and higher resolution output streams 194. This could allow smaller bit rate source files 192 to be provided to the encoder, or allow a source file that is natively lower resolution to be encoded into a wide array of output streams 194 for use on a wider variety of user devices 106 with a greater number of resolutions, such as to support the primary/secondary content matching algorithms described subsequently herein (see discussion of FIG. 5-1b). The source file 192 may comprise an uncompressed source file (when received at the encoder 193) and/or a source file 192 that has various degrees of compression.

While output streams 194 are shown as separate files (for example MPEG 4 transport stream (.ts) files), in a further embodiment of the present disclosure, all of the streams (i.e., streams 194) are presented in a single "super" file. Having a single comprehensive file comprising multiple streams, inter alia, lowers the number of files the CDN cache 199 must manage.

The encoder 193 may encode output streams 194 with audio tracks (e.g., AC3 audio). Different encoding formats and bit rates may be selected based on the requirements of the stream, end user equipment, and the protocols and formats used by the CDN cache 199.

The encoded output streams 194 are also optionally encrypted by an encryptor 195 via an encryption algorithm (e.g., AES, DES, public key encryption, etc.). The encoded and encrypted output streams are stored in a storage device 196. In one embodiment, the functionality of both the encoder 193 and the encryptor 195 may be integrated into a single apparatus.

The stored output streams are utilized by a packager 197 to provide a manifest (or index/playlist) file 198a and video segments 198b to a requesting client device 106c. Specifically, the manifest file 198 is a data structure comprising a listing of addresses for each of the video segments 198b of a stream of data, and includes information about the video segments such as bitrates, closed captioning, audio, etc. Different ABR models may use different manifest files. For example, with HTTP Smooth Streaming (HSS), each of the components (closed captioning, audio, etc.) are in separate files with addresses for each in the manifest file 198a. With HTTP Live Streaming (HLS), audio is embedded in the segments 198b and thus are not separately listed in the manifest file.

In another embodiment, the manifest file 198a includes metadata, and a listing of media segment entries. Common examples of metadata include e.g., version information, protocol, file formats, supported codecs, resolution, encryption, temporal information (transmission time, time of presentation, time stamps, etc.), geographic information (restricted locations, locations for presentation, etc.), content type indicia, synchronization information, control data, etc. Stated differently, the metadata describes the media segments 198b and can be used as a reference file when assessing or otherwise making use of the media segments 198b. In one implementation (described in greater detail subsequently herein), the metadata may include data and be structured so as to aid the cognizant latency management entity, whether client-side or network-side), with facilitating various mechanisms of switching latency reduction.

The list of media segment entries in the manifest file 198a comprises a list of network addresses (which may be remote or local) where the corresponding segments 198b of media content may be accessed and/or downloaded. For instance, each of the media segment entries may be listed by a Uniform Resource Locator (URL). In some embodiments, the entries may be in computing resource "path" format. Computing paths may be either absolute (i.e., the path provides the fully elaborated and unique location of the segment 198b in a file structure) or relative (i.e., the path provides a relative location of the segment in a file structure). Additionally, in some embodiments, the entries may be in symbolic format, such that at least a portion of the entry must be further interpreted (i.e., is not human-readable). Common examples of this may include e.g., HyperText Markup Language (HTML) tags, proprietary tags, Java, Javascript, etc. Moreover, some implementations may substitute or intermingle any of the foregoing techniques to flexibly accommodate various operational models. As described in greater detail subsequently herein), the URLs or other network addresses may be selectively chosen so as to minimize latency due to e.g., "path hops" or other sources of delay in accessing and rendering the referenced portion of the content.

In another embodiment, the ostensibly "unified" service provider (e.g., Charter) may be a conglomeration of multiple logical entities. Multiple logical entities may be useful to further distribute services over various network resources or enable additional features provided by partnered corporations or providers. Multiple logical entities, for example, may provide local content for a particular service group or geographic area; having content providing entities closer to end users offers lower latency and may add network redundancy. Common examples of network resources include e.g., broadcast, multicast, video-on-demand, advertisement services, local services, etc. In one specific example, one exemplary stream manifest file may include entries from: www.charter.com, vod.charter.com (video on demand services), www.nhk.jp ($3^{rd}$ party content), www.adserver.com ($3^{rd}$ party advertisement services), etc. See, e.g., co-owned U.S. patent application Ser. No. 15/204,610 filed Jul. 7, 2016 and entitled "APPARATUS AND METHODS FOR PRESENTATION OF KEY FRAMES IN ENCRYPTED CONTENT," incorporated herein by reference in its entirety.

In another example, the media segment listing may include a listing of URL links which is further punctuated with HTML tags or Javascript, which is configured to aid in advertisement insertion and/or execution of complementary programming. For instance, the video client may substitute tailored locally stored advertisements for commercial breaks, rather than e.g., the default broadcasted commercial.

In the exemplary embodiment, each media segment 198b is an encoded and encrypted subsection or segment of media content. The media segments 198b, when decrypted, decoded, and played in the appropriate order, render the original media content. In one implementation, each media segment represents a portion of video associated with a specific resolution, codec, and time stamp. The media segments 198b are assembled according to a time stamp sequence.

The manifest files 198a listing all components for playback of a piece of content may be generated by the packager 197 based on the registration of a user. In an alternative embodiment, the manifest file 198a (or a plurality of manifest files) is pre-generated for use with one particular ABR format. The manifest files 198a are generated based on the specific device and requirements of an end user device. For example, the Microsoft® Xbox® 360 and Xbox® One video game systems require different manifest files to operate. Furthermore, different streaming standards may require different manifest files 198a to operate. For example, the MPEG-Dynamic Adaptive Streaming over Hyper Text Transfer Protocol (DASH) protocol may be implemented differently with respect to Hyper Text Transfer Protocol (HTTP) live streaming and Windows® Media Streaming. Thus, each may require different manifest files.

Media segments 198b are generated by the packager 197. The segments 198b may be of predetermined length. In addition, metadata describing the segments may be generated at the packager 197, or, alternatively at the encoder 193. As discussed herein, the media segments 198b form the basis for the generation of a manifest file 198a. It is appreciated, however, that the foregoing functionality may be accomplished at various other network entities (such as at the encoder 193 or CDN cache 199), the foregoing being merely exemplary.

In further embodiments, the encoder 193 may also break the encoded output streams 194 into segments 198b for use by the CDN cache 199 to serve to client devices 106c. Furthermore, the encoder 193 in such embodiments generates the manifest files 198a that reference the locations of the segments 198b.

In an exemplary embodiment, a media client of the type discussed in co-owned co-pending U.S. application Ser. No. 14/220,021 filed on Mar. 19, 2014 and entitled "APPARATUS AND METHODS FOR RECORDING A MEDIA STREAM", which is incorporated herein by reference in its entirety, may be utilized on the receiving client device 106c. The media client replays stored "segmented" media content based on a manifest file 198a. In one exemplary embodiment, stored video content streams segments 198b are decompressed for playback based on information stored within an associated data structure (e.g., stream manifest file 198a).

Latency Management Architecture—

Figure 2:
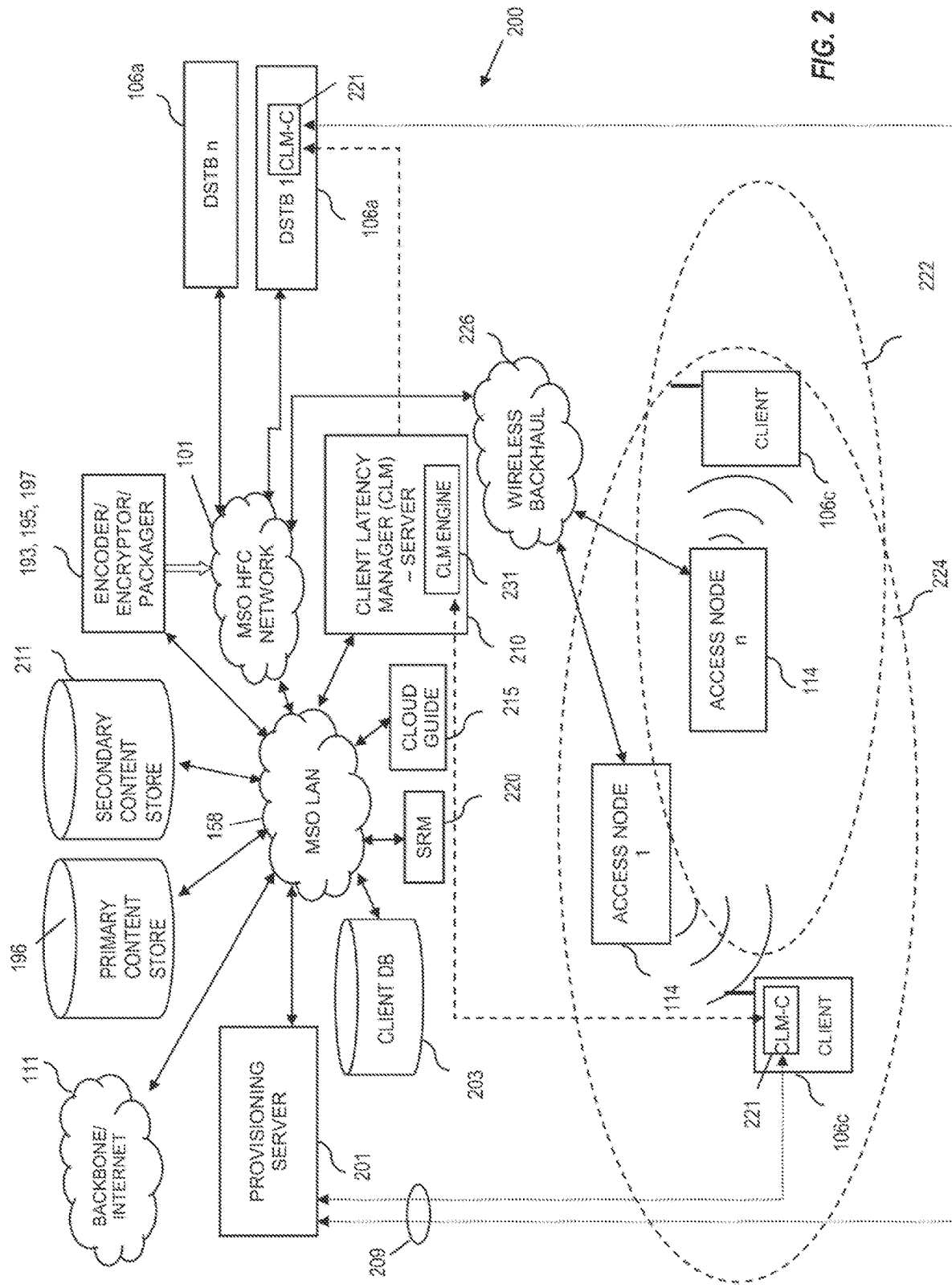
FIG. 2 is a functional block diagram of an exemplary architecture for client latency management, in the content of a managed content delivery network.

Referring now to FIG. 2, an exemplary architecture for client latency management (and hence optimization of the user's experience), is shown and described in the context of a managed content delivery network such as that of FIGS. 1-1d. As shown, the architecture 200 generally utilizes the network operator's (e.g., MSO's) extant infrastructure including the MSO LAN 158, HFC network 101, and MSO backbone and internetworking function 111, as well as additional components and functions as now described.

Specifically, in the illustrated embodiment, the architecture 200 further includes a client latency manager (CLM) process 210, session resource manager (SRM) 220, client database 203, provisioning server 201, content stores (i.e., primary content store 196, such as for video content such as movies or other linear or non-linear programming, and secondary content store 211 for e.g., advertisements or promotions or other content). It will be appreciated that while shown as two (2) data repositories 196, 211, these stores may be combined, or alternatively comprise multiple distinct storage entities, including those operated or maintained by non-MSO third parties, as described elsewhere herein, the illustrated configuration being merely exemplary. Moreover, the storage entities 196, 211 may be physically and/or topologically distributed within the MSO network or otherwise, such as where a plurality of local stores are utilized to service different geographic regions served by the MSO.

The CLM server entity 210 is, as described in greater detail below, configured to interface with various other network and/or client functions (depending on delivery modality) via its CLM engine 231 to reduce content switching latency.

The provisioning server 201 is utilized to provision client devices 106a, 106c with application layer software or middleware 221 which implements the latency reduction techniques described in greater detail herein. In one variant, the client process 221 can operate substantially autonomously of the CLM server process 210, whereas in other embodiments, the client process 221 is "slave" to the server process 210.

The provisioning server 201 also communicates with the client database 203 via the MSO LAN 158, such as to (i) obtain client device configuration information, MAC address, or other information useful in characterizing the individual clients; (ii) correlate individual client devices with particular network (e.g., IP) or other addresses; and (iii) obtain demographic data relating to user(s) of the clients, via e.g., subscription data, historical tuning activity, or other mechanisms.

The provisioning server 201 also maintains, for each client device provisioned, data relating the CLM client 221 such as installation status, version, etc. In one variant, the provisioning server 201 and client database 203 are used by the CLM server process 210 to characterize and utilize the individual capabilities of a rendering client (including native functions which may not be accessible to network-side entities, as described in greater detail below).

Also shown in the architecture 200 of FIG. 2 is a "cloud" guide function 215. As previously described, cloud-based EPGs (electronic program guides) are increasingly configured to provide a streamlined user experience, reduced device processing and storage footprint, and a consistent and simple mechanism for software upgrades across multiple different types of HW/SW platforms (e.g., different OEM devices), via e.g., HTML 5-based cloud apps. In the illustrated architecture 200, the cloud guide function 215 generates and transmits the cloud EPG data to the DSTB clients 106a such that each client can render and access the cloud EPG services. As discussed in greater detail below, the CLM server 210 (and CLM client 221) mitigate the transition/rendering latency associated with the cloud EPG function 215 through mechanisms including for example access of native DSTB acceleration functionality and network-side compensatory mechanisms.

Also included in the architecture of FIG. 2 is one or more encoder/encryptor/packager functions 193, 195, 197 such as those previously described with respect to FIG. 1d. As discussed in greater detail subsequently herein with respect to FIG. 2a, the encoder and packager may be configured to include a CLM client process that coordinates with the CLM server entity 210 to adjust the encoding and packaging of packetized media content in order to mitigate switching latency or other undesirable artifacts.

Returning again to FIG. 2, also shown are wireless services, such as for servicing MSO subscriber wireless requests when the subscriber is outside their premises and utilizing their wireless device 106c for rendering content (e.g., while at the local coffee shop). In one variant, one or more wireless access nodes 214 (e.g., WLAN, CBRS, LTE small cell/eNodeB for LTE-U or LTE-LAA) are services by MSO cable modems 113 (see FIG. 1) and the MSO wireless backhaul infrastructure 226 to route the client service requests to the appropriate service entity within the MSO infrastructure. For example, an MSO subscriber might use their client device 106c to invoke an MSO-based app (e.g., "cloud EPG" app configured to run on the client native O/S such as Android) to interface with an OD (on-demand) video server within the MSO headend, such that the client can receive and render the requested video content stream. For instance, as previously described, the client EPG app might invoke an HLS-based streaming session serviced by the encoder/encryptor/packager entities 193, 195, 197, such as via transmitted manifest with URLs for the various segments or "chunks" of the video content. Note that this video delivery can similarly be supported with non-MSO backhaul/wireless infrastructure, such as where the client utilizes the backhaul of another service provider and the public Internetwork 111 to access the MSO video server/packager as opposed to using e.g., MSO in-band or DOCSIS QAMs.

Figure 2A:
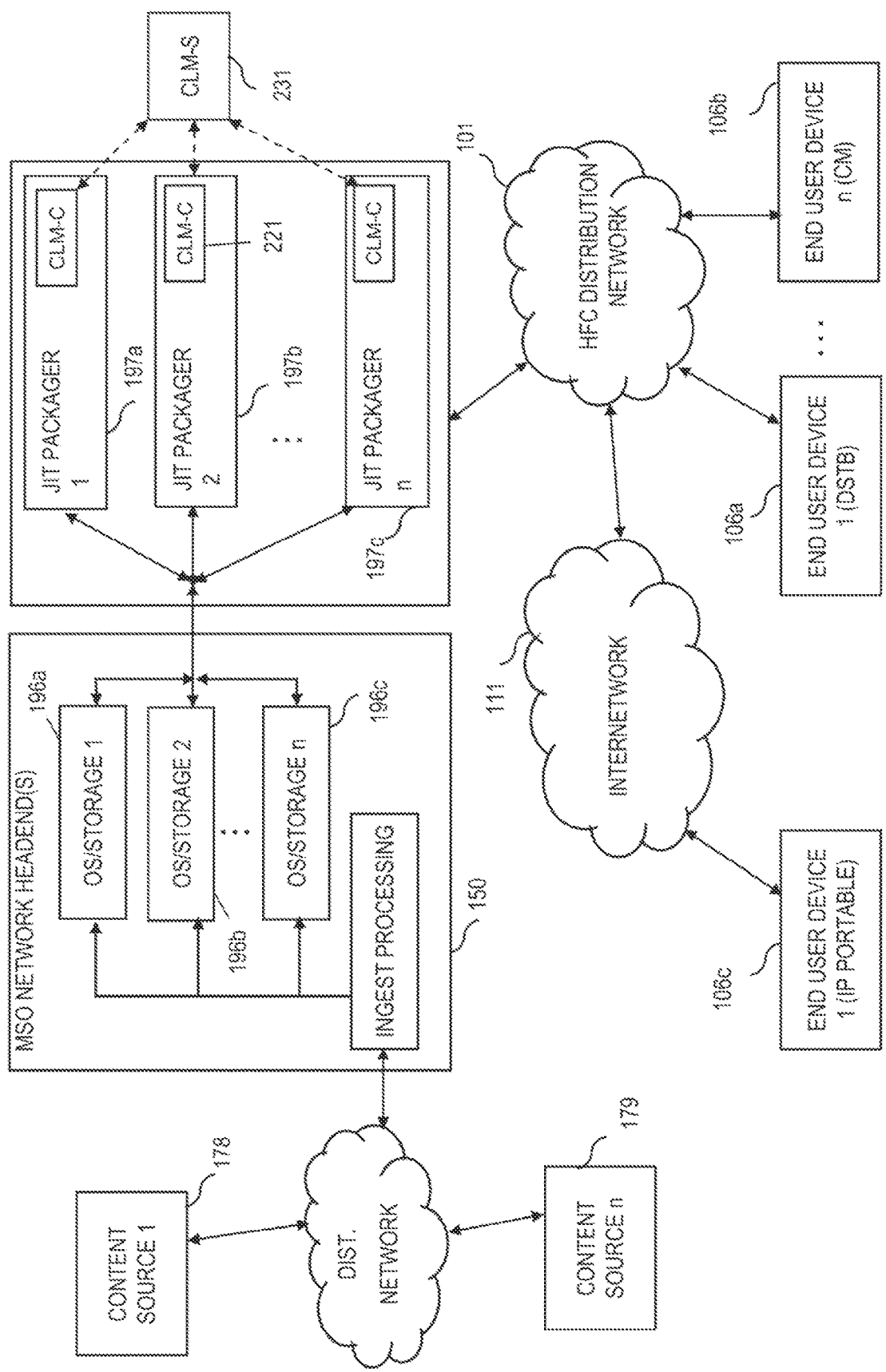
FIG. 2a is a functional block diagram illustrating one exemplary embodiment of a just-in-time (JIT) packager arrangement useful with the architecture of FIG. 2.

FIG. 2a is a functional block diagram illustrating one exemplary embodiment of a just-in-time (JIT) packager arrangement useful with the architecture of FIG. 2. Particularly, in architectures such as that of FIG. 2, any number of "clients" may be requesting a given "live" or other content element that is stored on the network operator's infrastructure (or other infrastructure accessible thereto). As used in the present context, the term "client(s)" may include processes or devices which consume or request (e.g. live) content within the managed network infrastructure for delivery to end-user devices. For example, so-called "just-in-time (JIT)" packager processes 197a, 197b, 197c access stored content (e.g., live content that has previously been ingested from one or more external sources 178, 179) and package the content along with any other associated content such as advertising content, for delivery to the requesting end-user device 106a, 106b, 106c. In particular, these devices create segmented video files that are delivered over HTTP to requesting end-user devices, the latter which then "stitch" the segments together to form a contiguous video stream, based on a manifest. Such JIT packagers may exist in significant numbers (since, as discussed infra, more subscribers requires more JIT packagers), and reside near the edge of the infrastructure (as opposed to the headend(s) 150) so as to more directly serve designated (and different) subsets of requesting users within a prescribed geographic area.

Moreover, digitally rendered live content stored within the MSO network and requested by the aforementioned JIT packagers 197a, 197b, 197c may be both: (i) stored at multiple, possibly geographically and/or (network) topologically disparate locations 196a, 196b, 196c, such as behind origin servers (OS); and/or (ii) split among two or more storage locations (e.g., parts of a given content asset such as an NFL football game may exist in two or more storage locations).

Additionally, such content may be stored on the network within heterogeneous types of storage architectures and/or encoding formats. For example, when delivering HTTP streams, two options are commonly used for content asset storage: (i) the assets are stored in an HTTP-ready format, so that "clients" can make HTTP requests for video segments directly (e.g., from an HTTP server); or (ii) the content assets can be stored in a canonical (or mezzanine) format which is subsequently converted to HTTP-rendered segments in a JIT fashion (i.e., upon request from a client). The HTTP format storage (i) is generally more storage intensive, while the canonical/mezzanine option (ii) is more computationally (silicon) intensive.

Exemplary CLM Apparatus—

The exemplary embodiments of the CLM 210 described herein may be implemented using general purpose software and/or hardware resources. For example, the software may comprise a Linux operating system (OS) based server application such as an exemplary Apache-based environment.

Figure 3:
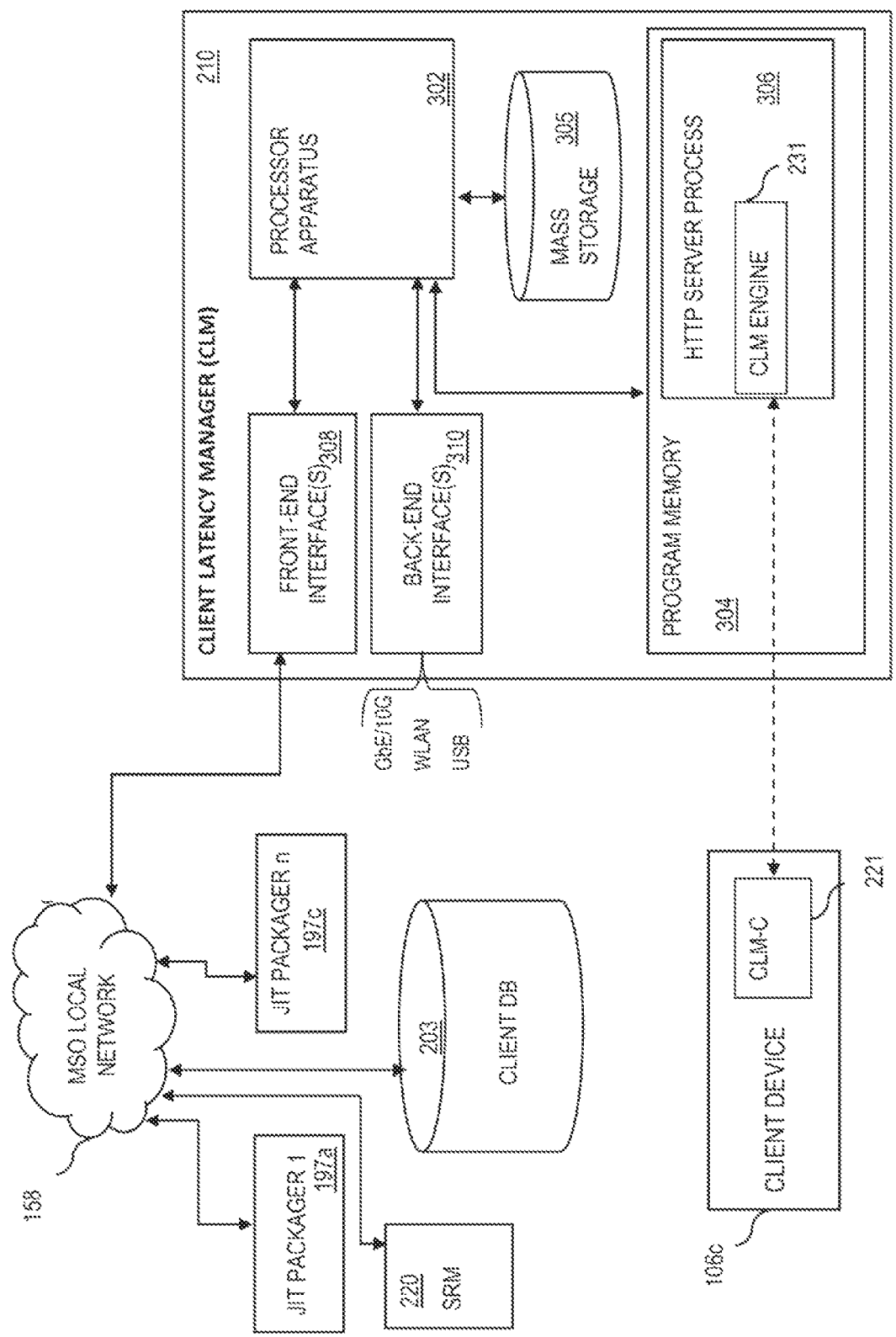
FIG. 3 is a logical flow diagram representing one embodiment of the client latency management (CLM) server apparatus according to the present disclosure.

Hardware resources can include for example general-purpose computing hardware. FIG. 3 depicts an exemplary embodiment of a CLM node apparatus 210 of a packetized network useful for latency management as described herein. The CLM 210 includes processing logic 302 (e.g., a processor) configured to execute one or more software modules 306 stored in program memory 304, a mass storage device 305 to support data storage, and one or more front-end interfaces 308, as well as one or more back-end interfaces 310. The front-end interfaces 308 include one or more network interfaces for communication (via a LAN 158 as shown) to JIT packagers 197a-197c in FIG. 2a, and/or other network "client" entities such as the SRM 220. The front-end interfaces 308 may utilize any prevailing protocol sufficient to enable timely communication with the various entities (such as GbE, 10G, etc.); notably, the CLM 210 of the illustrated embodiment communicates control data and messages with the corresponding "clients" or processes at the JIT packagers and SRM (as opposed to bandwidth-consumptive content data such as encoded video).

The back-end interfaces 310 may include high-speed data bus and/or wireless interfaces such as GbE, 10G, WLAN, USB, or others, for communication with external devices.

The memory 304 in one variant is characterized by lower access time, compared to the mass storage 305, the latter which comprises a nonvolatile medium (e.g., magnetic, optical, and/or charge based (e.g., flash), while the memory 304 may comprise a volatile medium (e.g., DDR2/DRAM, SRAM, and/or other).

In one or more implementations, the CLM node 210 is configured using commercial off-the-shelf computing platform (e.g., a Cisco UCS Blade with Intel processors, running VMWare ESXi 5.5, although it will be appreciated that other types of hardware/software environments may be used), which advantageously obviates the need for custom or specialized hardware. Hardware and/or software configurations of individual nodes (e.g., where multiple CLMs are used in the MSO network) may be set in accordance with requirements of a target application; e.g., for CLMs managing only certain types of clients such as DSTBs 106*a*, each CLM node may be configured identically for such purpose. However, in some implementations, the network may have a heterogeneous configuration, wherein the hardware configuration of individual CLM nodes is tailored in accordance with specific cost and/or performance requirements; for example, some may be purposely made more capable in terms of performance than others, such as where one CLM 210 services or manages a greater number of client devices/requests, or manages clients with different capabilities/configurations requiring less or more "active management" or intervention by the CLM 210.

As shown in FIG. 3, the CLM 210 includes an HTTP server process 306 and CLM engine 231, the latter which implements the logical functionality of the CLM 210, including communication with the corresponding CLM client processes 221 disposed on the client devices 106*c* which are so equipped. It will be appreciated that while certain embodiments of the CLM-S 231 and CLM-C 221 functions described herein utilize cooperative operation, the present disclosure contemplates the scenarios where: (i) the CLM-S 210 is configured to operate autonomously (i.e., without a corresponding CLM-C 221); and (ii) the CLM functionality is performed at least in part autonomously by the "clients" (CLM-C's). For instance, in one variant, sufficient CLM logic to selectively access native client functions on the client device 106*c* on which the CLM-C 221 is installed may be present within the CLM-C itself, such that interaction with the server (CLM-S) if any, is not required, such as where e.g., decode processing of the downloaded video content "chunks", or suspension of certain other cloud EPG functions—so as to mitigate latency—can be invoked and performed by the CLM-C 221 without affirmative communication with the CLM-S 231.

CLM-Enabled Client Device—

Figure 4:
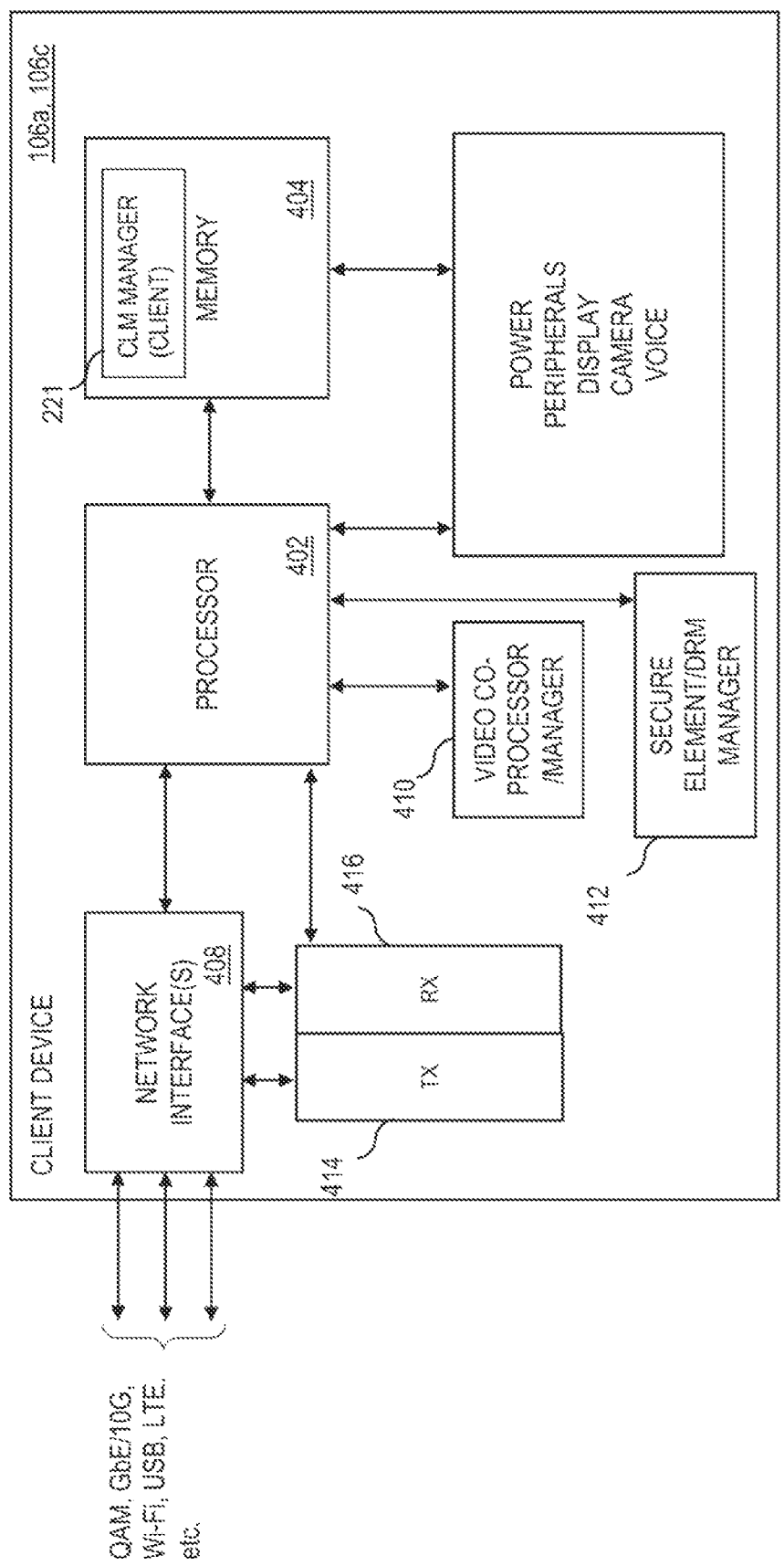
FIG. 4 is a functional block diagram of an exemplary embodiment of a CLM-enabled client device apparatus according to the present disclosure.

FIG. 4 is a functional block diagram of an exemplary embodiment of a CLM-enabled client device apparatus according to the present disclosure. As shown in FIG. 4, the client device 106*a*, 106*c* (e.g., the DSTBs or mobile wireless client devices shown in FIG. 2, respectively) includes, inter alia, a processor subsystem 402, a memory module 404, one or more radio frequency (RF) network interfaces 408, a transmit module 414, video co-processor and manager 410, a secure element (SE) and DRM manager 412, and a receive module 416.

In one exemplary embodiment, the processor subsystem 402 may include one or more of a digital signal processor, microprocessor, field-programmable gate array, or plurality of processing components mounted on one or more substrates (e.g., printed circuit board). The processor subsystem 402 may also comprise an internal cache memory. The processor subsystem is in communication with a memory subsystem 504, the latter including memory which may for example comprise SRAM, flash, and/or SDRAM components. The memory subsystem may implement one or more of DMA-type hardware, so as to facilitate data accesses as is well known in the art. The memory subsystem of the exemplary embodiment contains computer-executable instructions which are executable by the processor subsystem.

In this and various embodiments, the processor subsystem 402 is configured to execute at least one computer program stored in memory 404 (e.g., a non-transitory computer readable storage medium). A video co-processor 410 and SE/DRM Manager 412 are also in data communication with the processor subsystem 402, and collectively the foregoing components include a plurality of computer programs/firmware configured to perform the functions described supra, e.g., decryption, manifest unpacking, content decode, and native function access, as well as communication with relevant network entities such as the CLM-S 231 and could guide services 215. Various other functions useful for and typical in consumer electronics including baseband management (e.g., transmit and receive functions via the baseband processor and associated TX and RX modules 414, 416. For example, in one embodiment, the Tx and Rx modules are part of an RF front end and tuner (part of the interface 408) used to receive and demodulate the QAM-256 signals transmitted over the MSO HFC network 101. In another embodiment, the Tx and Rx modules and interface 408 comprise a WLAN (e.g., IEEE 802.11) interface for communication with a wireless node 114 (e.g., AP). In yet another embodiment, the Tx and Rx modules and interface 408 comprise an LTE (e.g., LTE-A/LAA/U) interface for communication with an eNodeB or femtocell.

The network interface 508 generally incorporates an assembly of filters, low noise amplifiers (LNAs), power amplifiers (PAs), and antenna assemblies that are configured to transmit a modulated waveform via an air or coax interface.

In one or more embodiments, the video co-processor/manager and SE/DRM manager each include an internal cache or memory configured to hold data associated with one or more functions (e.g., decoded video frames, decryption keys, etc.). In some embodiments, application program interfaces (APIs) such as those included in an MSO-provided mobile application such as the CLM-C 221, or those natively available on the client device 106*a*, 106*c* (e.g., as part of the decode/display application, or exclusively internal to the manager modules 410, 412) may also reside in the internal cache(s), or other memory 404.

Network addressing may provide each node of a network with an address that is unique to that network; the address can be used to communicate (directly via peer-to-peer communications, or indirectly via a series of "hops") with the corresponding device. In more complex networks, multiple layers of indirection may be used to assist in address exhaustion (e.g., one address is logically divided into another range of network addresses). Common examples of network routing protocols operative at Layer 3 include for example the Internet Protocol (IP).

Methods—

Figures 1, 5:
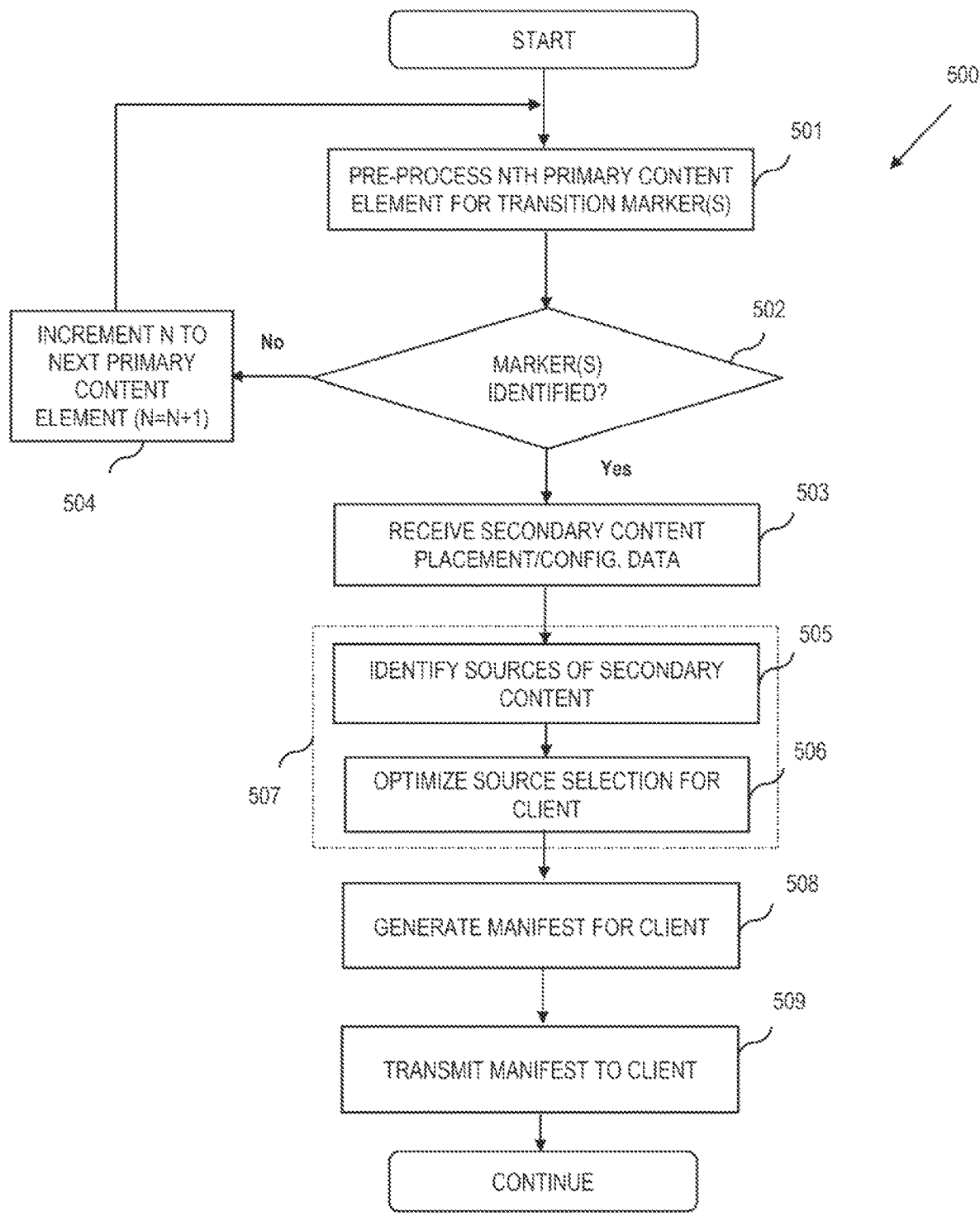
Figures 1A, 5:
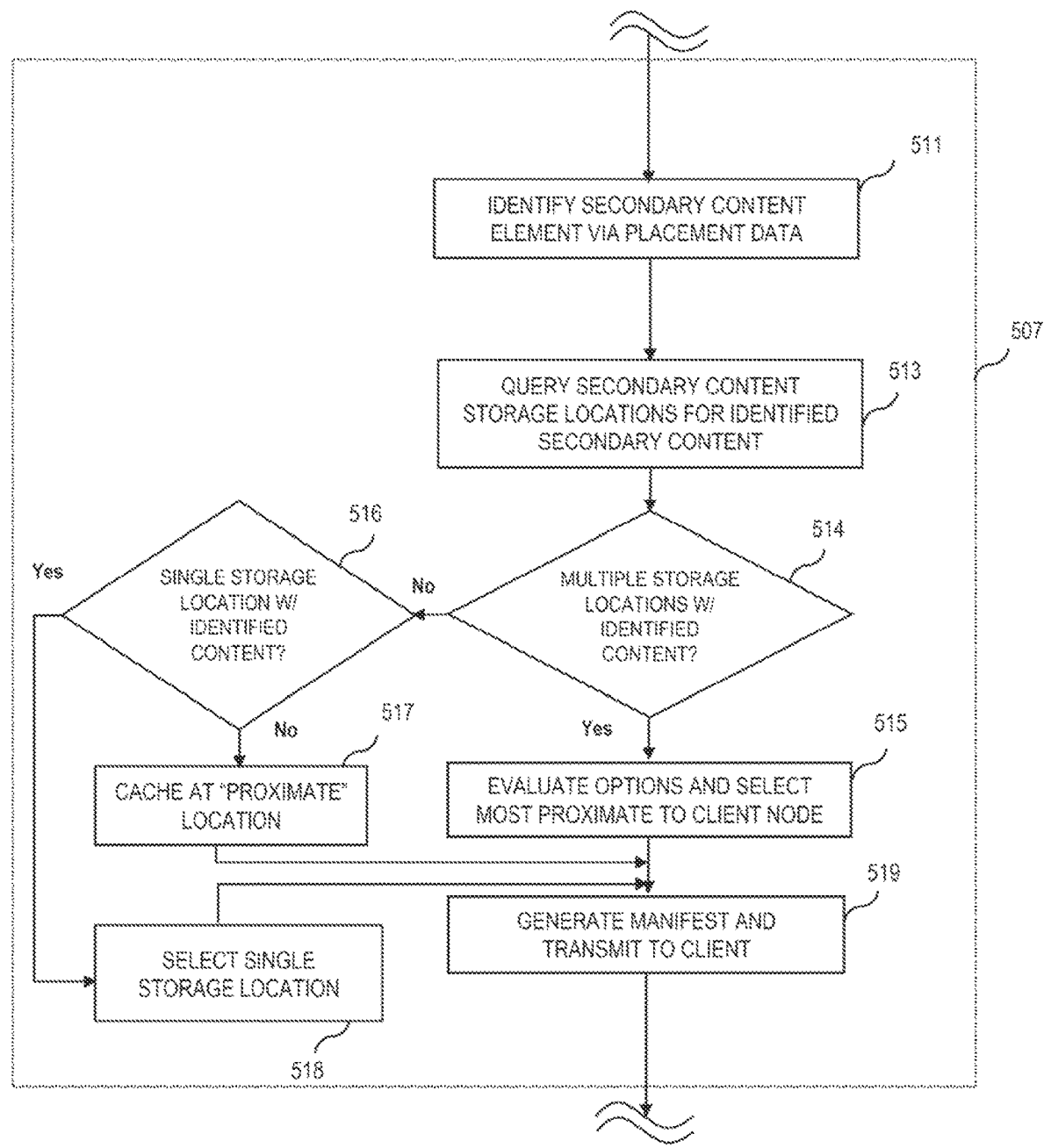
Figures 1B, 5:
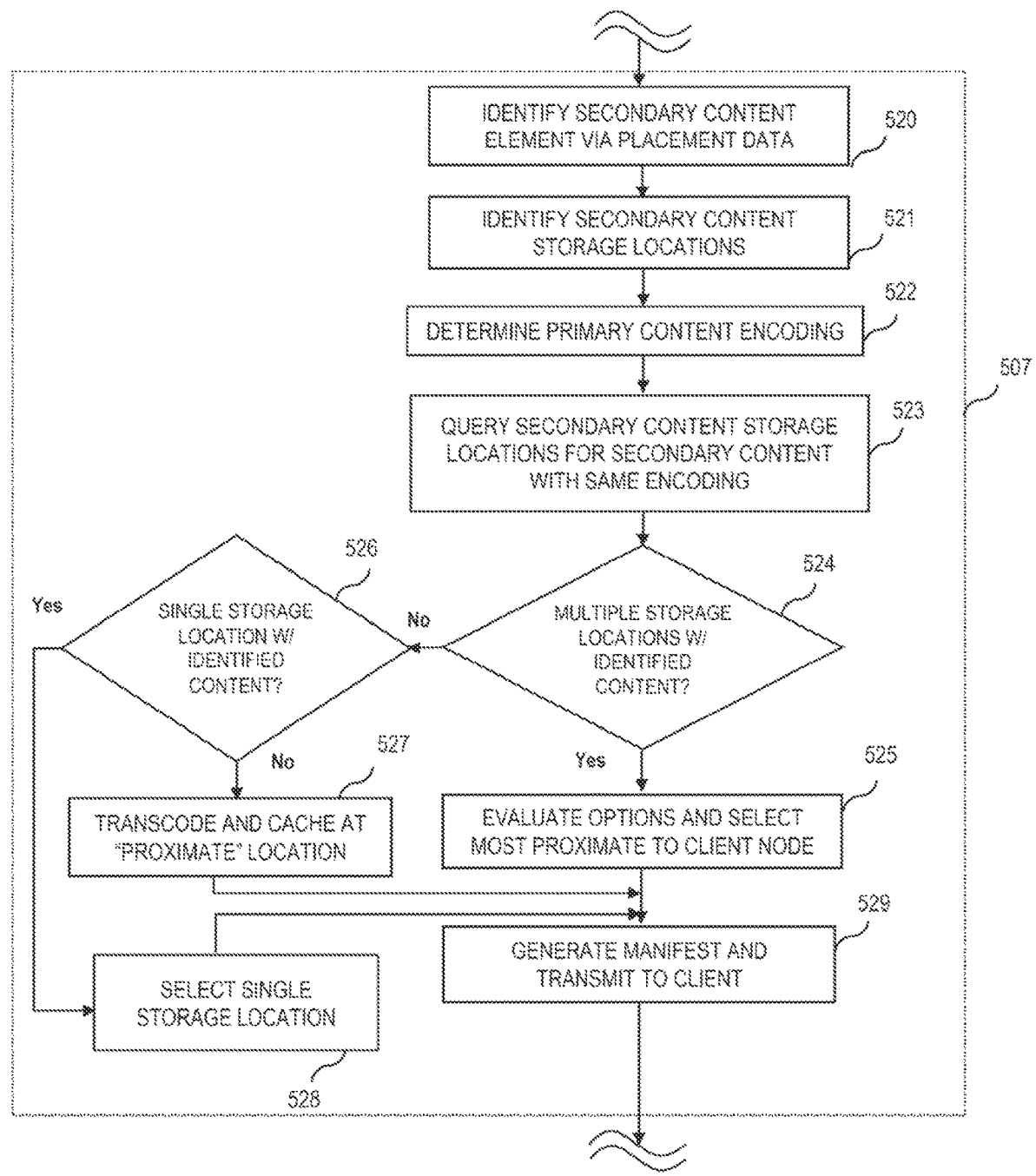
Figures 2, 5:
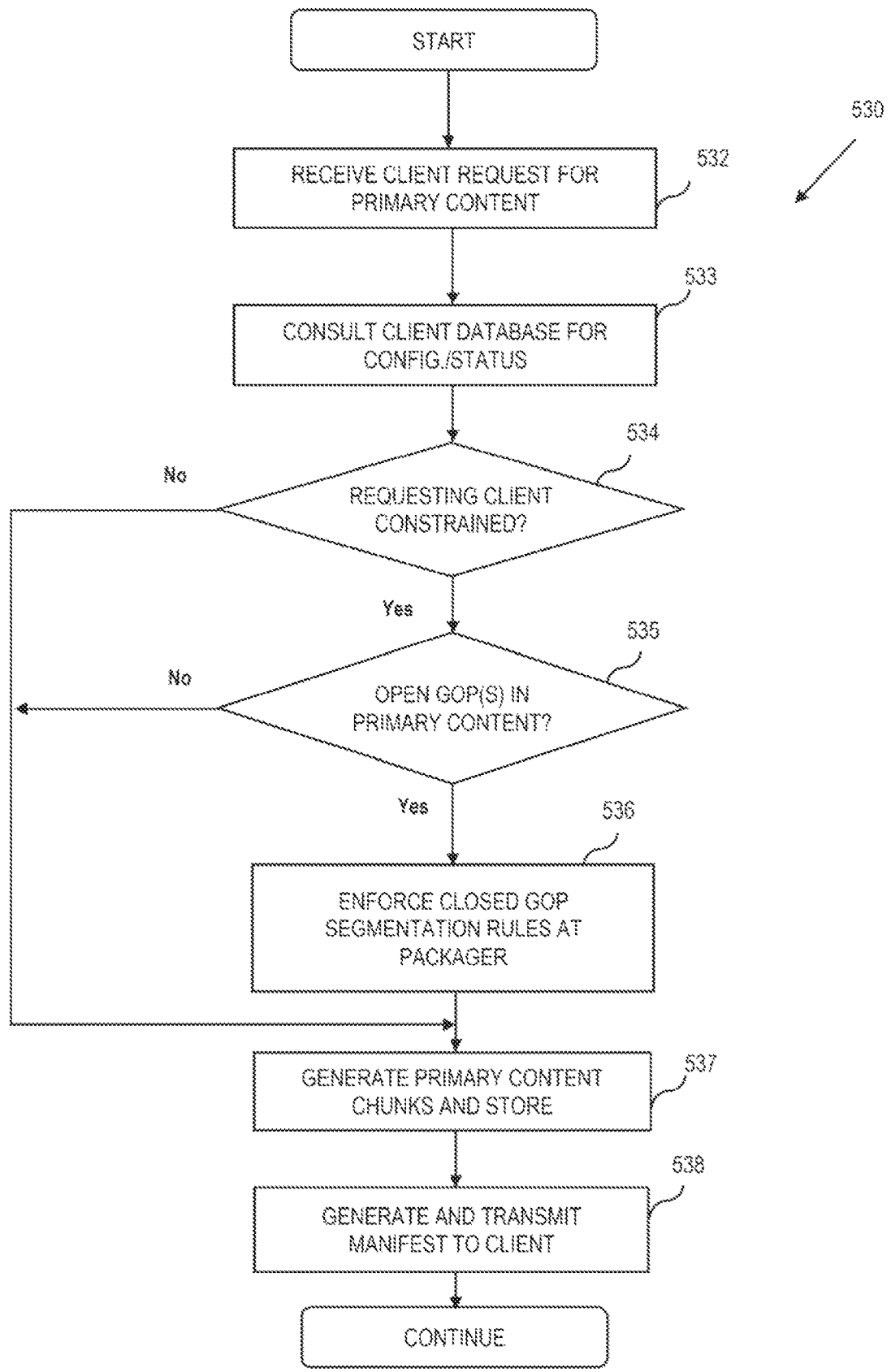
Figures 3, 5:
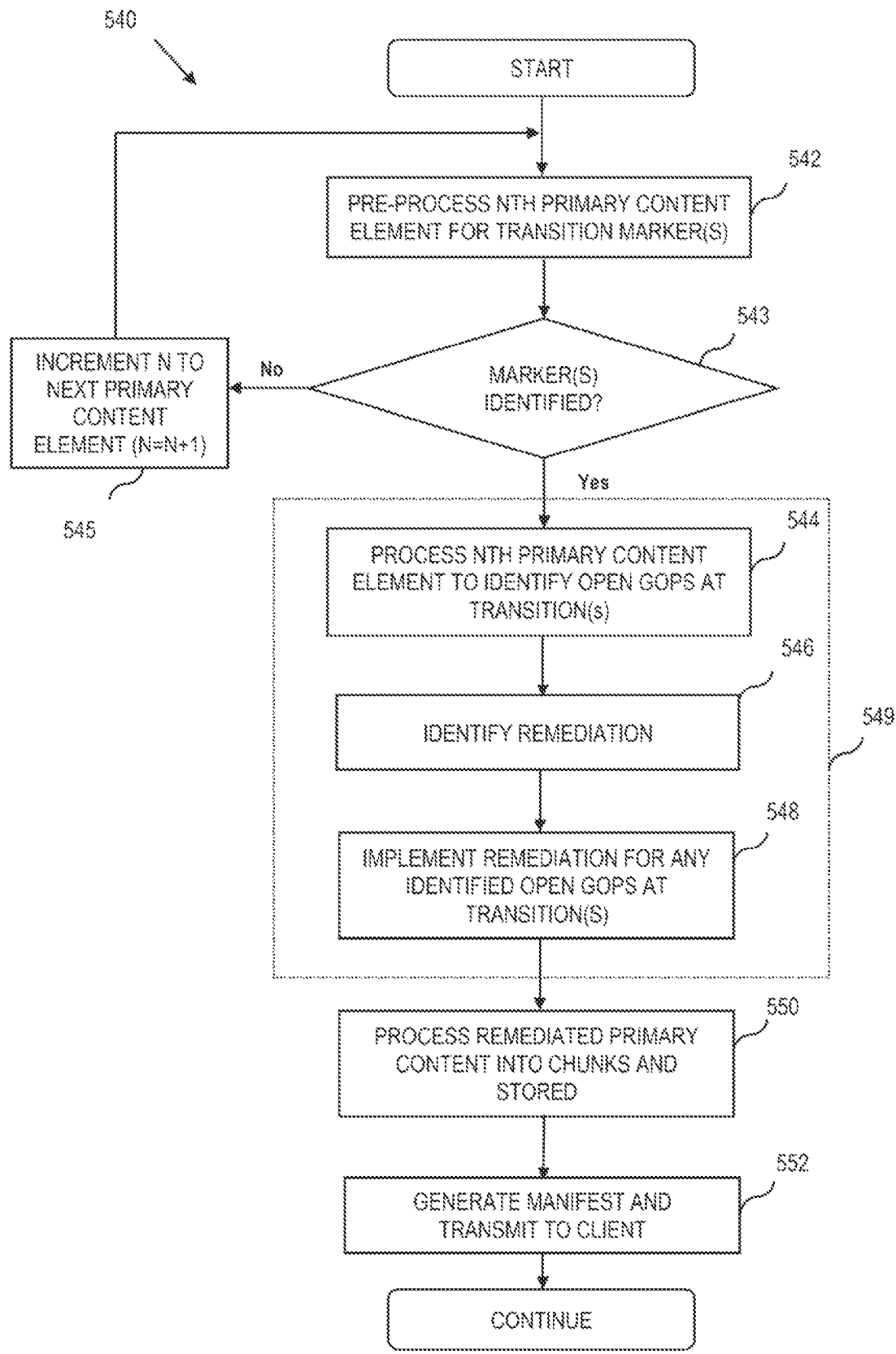

Referring now to FIGS. 5-1-5-5, various embodiments of the methods of mitigating client device transitional latency are shown and described.

FIG. 5-1 is a logical flow diagram representing one embodiment of a method for reducing switching latency associated with a packetized content transition such as between primary (e.g., MPEG-2 or H.264 encoded video) and secondary content such as advertising or promotional content. As shown, the method 500 includes processing one or more primary content elements (e.g., media segments or "chunks" 198*b*) per step 501 to identify transition data elements or markers. For example, in one implementation, the content includes one or more SCTE-35 cues embedded within the content stream.

As a brief aside, SCTE-35 (SCTE Standard SCTE 35 2016, "Digital Program Insertion Cueing Message for Cable," incorporated herein by reference in its entirety), specifies techniques for carrying notification of upcoming points and other timing information in the transport stream. Per SCTE-35, a splice information table is defined for notifying devices of splice events, such as a network break or return from a network break. For MPEG-2 transport streams, the splice information table, which pertains to a given program, is carried in one or more MPEG Sections carried in PID(s) referred to by that program's Program Map Table (PMT). In this way, splice event notification can pass through most transport stream remultiplexers without need for special processing.

For MPEG-DASH, the splice information table is carried in the DASH MPD (see [SCTE 214-1], incorporated herein by reference in its entirety) or in media segments (see [SCTE 214-2] and [SCTE 214-3], EACH incorporated herein by reference in its entirety).

To enable the splicing of compressed bit streams, SCTE-35 defines "splice points." Splice points in an MPEG-2 transport stream provide opportunities to switch elementary streams from one source to another. The grouping of "in-points" of individual PID streams into program in-points in order to enable the switching of entire programs (video with audio) is defined. Program "out-points" for exiting a program are also defined.

For HLS manifests, SCTE-35 provides for manipulation of an HLS M3U8 manifest to provide seamless advertising insertion. The manifest is modified to include targeted advertisements prior to delivery to the client's media player application, or the manifest is modified by the player before video playback. These mechanisms are intended to allow for seamless playback without buffering or other interruptions in the playback experience. HLS manifest manipulation may be performed on a server or on a client. Advertising cues and other signaling metadata are placed into the HLS M3U8 manifest file using HLS tags and attribute lists. The SCTE 35 HLS tag and attribute definitions are consistent with HLS tag and attribute definitions, respectively. The general method of operation utilizes tags marking the beginning and end of each signaled sequence of content segments or chunks. In this way it is possible to signal placement opportunities, local (distributor) avails and provider advertisements. Such use of tags marking the beginning and end of each signaled sequence of segments may also be used to control stream blackouts using manifest manipulation on the server, e.g., so that restricted content is not sent to the client.

Specifically, HLS cue tags under SCTE-35 are binary representations encoded in Base64, which are decoded by the manifest manipulator (e.g., client or server). The tag attributes specify various features of the tag, such as the temporal duration of the sequence signaled by the SCTE-35 HLS cue.

Referring back to FIG. 5-1, the exemplary embodiment of step 501 of the method 500 processes the (manipulated) content stream using one of the aforementioned schemes (e.g., for MPEG-2 TS, or HLS) to identify impending content transitions, such as from the media segments or chunks to a secondary content source.

Per step 502, if any such transition markers or cues are identified, the secondary content identifying data is extracted by the CLM-S 231 (or its proxy, such as the packager 197) per step 503. For example, a URL for a targeted advertisement may be included within the manifest (or the marker or cue itself, such as via metadata), or obtained prior to manifest generation from the packager 197 or an ADS (advertising decision server, not shown).

From this data, the CLM-S 231 is able to identify either specific data regarding the selected advertisement directly (e.g., from the ADS), or indirectly such as via the designated source (specific storage location 196) of the secondary content per step 505, and to optimize the source selection as needed per step 506. As described in greater detail below with respect to FIGS. 5-1a and 5-1b, these optimizations may include storage location selection (i.e., the network address of the secondary content element) so as to reduce network (e.g., Layer 3) switching latency, and/or matching of secondary content element encoding so as to minimize or obviate codec/encoding changes needed by the client media player or other decoding process, which can consume additional processing overhead and hence induce latency in rendering the secondary content (and the primary content after the secondary content has completed playout).

At step 508 of the method 500, the (now optimized) secondary content description is included into the manifest file, and the latter transmitted to the rendering client per step 509. FIG. 5-1a is a logical flow diagram representing one implementation of the secondary content source optimization process (steps 505 and 506) of the method of FIG. 5-1.

As shown in FIG. 5-1a, the optimization process 507 comprises identification of the secondary content element via the placement data. For example, in one variant, a content catalog identifier or other unique content ID for the secondary content element is determined per step 511, whether directly (e.g., via metadata embedded within the program stream cue or other data structure), or via a lookup function which correlates the unique content address to a known advertising asset.

Using the identified content, all storage locations for the same content element are identified per step 513. For example, an HTTP-based query or other such approach can be used to query origin servers (OS) as in FIG. 2a associated with the various secondary content storage locations 211, so as to return any instances of the specific secondary content therein. Such query also in one implementation returns descriptive data regarding the particular instance of the asset; e.g., file size, encoding format, etc., so as to enable the CLM-S 231 to evaluate one instance with respect to another as further described with respect to FIG. 5-1b below.

The storage locations returning "hits" for the content asset are then evaluated for network proximity to the requesting client per steps 514, 515, and 516 as applicable, such as via number of Layer 3 (e.g., IP address node) hops between the client and the storage location. For example, per step 514, if multiple locations for the identified asset are returned, the multiple locations are evaluated per step 515. If only a single location is returned per step 516, then that location is selected per step 518 (as it will be the most "proximate" as compared to other solutions to obtaining the content such as a request to a third-party storage location). If per step 516 the identified secondary content asset cannot be located, then the asset is located from a third party source, and cached at the most proximate location within the MSO network that is available prior to access and rendering by the client per step 517. Exemplary caching mechanisms and techniques useful with various aspects of the present disclosure are described in co-owned U.S. Pat. No. 9,264,508 issued Feb. 16, 2016 and entitled "Apparatus and methods for reduced switching delays in a content distribution network," incorporated herein by reference in its entirety (wherein reduced channel switching delays in a content distribution network are achieved by caching background content at reduced quality and/or resolution), and U.S. Pat. No. 8,990,869 issued Mar. 24, 2015 and entitled "Methods and apparatus for content caching in a video network," incorporated herein by reference in its entirety (wherein methods and apparatus for selectively caching (and de-caching) video content in network so as to reduce content transformation requirements and also cache storage requirements, are disclosed).

It will be recognized by those of ordinary skill given the present disclosure that the foregoing selection logic may be varied depending on the particular application. For example, all storage locations of the identified asset may be first determined, followed by a proximity analysis of that subset of storage locations.

At step 519, the manifest including the most current secondary content asset location is generated and sent to the client.

FIG. 5-1*b* is a logical flow diagram representing another implementation of the secondary content source optimization process of the method of FIG. 5-1. As shown in the method of FIG. 5-1*b*, the optimization process 507 includes first identifying the specific secondary content element per e.g., the placement data or other source per step 520.

Next, per step 521, the storage locations for the identified asset are determined, such as via the previously described query mechanism.

Per step 522, the encoding of the primary content element is determined, such as via data returned from the primary content store 196, or by the encoder/packager (FIGS. 2 and 2*a*). For instance, the primary content may be encoded using an MPEG-2 format.

Per step 523, the encoding format (and any other relevant data) relating to the specific instance of the secondary content asset is obtained (which may be combined with step 521, as previously described). For example, data indicative of H.264 encoding of the asset may be returned via a query to the storage location/OS 211. These results may be then matched against the identified primary content encoding (step 522), or alternatively the CLM-S 231 may query to locate specific instances of matching encoding (e.g., setting a given field in the query to return MPEG-2 only).

By attempting to identify matching encoding format between the primary and secondary content instances, the rendering client 106*c* is relieved of at least some of the processing overhead associated with a codec "switch," and hence latency is reduced. It will also be appreciated that some codecs require reduced bitrate versus others (i.e., MPEG-2 consumes roughly twice the bandwidth of H.264), and hence further economies for the client and network as a whole may be realized when selecting secondary content that does not require increased bitrate as compared to the primary content into which it is "inserted."

The storage locations returning "hits" for the content asset are then evaluated for network proximity to the requesting client per steps 524, 525, and 526 as applicable, such as via number of Layer 3 (e.g., IP address node) hops between the client and the storage location. For example, per step 524, if multiple locations for the identified asset are returned, the multiple locations are evaluated per step 525. If only a single location is returned per step 526, then that location is selected per step 528 (as it will be both (i) the most "proximate" as compared to other solutions to obtaining the content such as a request to a third-party storage location, and (ii) have a matching encoding per steps 520-523). If per step 526 the identified secondary content asset with matching encoding cannot be located at any of the queried storage sites, then the asset is located and cached at the most proximate location within the MSO network that is available prior to access and rendering by the client per step 527. If the asset can be obtained in the same (matching encoding), it is obtained and cached directly. If no matching encodings are available, the asset is transcoded from an available format and then cached. The manifest is then generated based on the updated data, and transmitted to the client per step 529.

FIG. 5-2 is a logical flow diagram representing another embodiment of a method for reducing switching latency associated with a packetized content transition. In this embodiment, the method 530 evaluates the presence of open GOPs (which can induce additional latency at the rendering client as previously described).

At step 532 of the method, the CLM-S 231 (or its proxy) receives data relating to a client-initiated request for a primary content element (e.g., television programming). At step 533, the CLM-S accesses the client database (DB) 203 to determine the configuration or status of the requesting client device. For example, a MAC address of the client device (or more generically a user or subscriber or account ID in cases where only one client device is registered) may be used to access configuration data stored in the DB 203. Configuration data useful to the CLM-S 231 in the present embodiment may include whether the requesting client is "cloud" enabled/configured; i.e., whether it utilizes a cloud-based model such as the HTML 5-based previously described herein. Since the client 106*c* using such cloud-based model must be registered with the cloud guide function 215 (FIG. 2), the network knows whether the client is configured to operate in this fashion.

Per step 534, the CLM-S evaluates the accessed or obtained client data, and determines whether the client is constrained. In this context, the term "constrained" refers to determining whether the client uses the cloud-based EPG model. As previously noted, such cloud-based models trade "one size fits all" homogeneity for certain performance aspects (including by virtue of the client having to wait for, "unpack", and render the various EPG elements obtained from the cloud entity), and hence there may be significant potential performance enhancements in terms of switching latency which can be obtained by suspending, modifying or obviating certain cloud EPG or other functions which contribute heavily to that latency. Accordingly, one embodiment of the method 530 utilizes logic within the CLM-S to evaluate the requesting client 106*c* for the ability to leverage such EPG or other functions, whether via the cloud EPG function 215 or other entities within the MSO network.

Steps 535 and 536 of the embodiment of FIG. 5-2 illustrates one such network-side change that can be implemented; i.e., open GOP detection and remediation. In step 535, the CLM-S 231 obtains data relating to the presence of open GOPs at switching pints within the content stream. This data may be obtained for example from the encoder 193 during encoding of the stream (when so configured), or from other processes, as described in greater detail subsequently herein.

In one approach, if the encoder or other source indicates the presence of an open GOP at a content transition boundary, such as the end of media segment or "chunk", then the CLM-S 231 can merely instruct the encoder and/or segmentation processing function (e.g., encoder 193 and/or packager 197) to enforce certain rules, such as closed-GOP segmenting at all segment boundaries. For instance, the packager might simply be configured to avoid placing segment boundaries at the end of an open GOP, thereby avoiding the case where a B-frame of the open GOP might reference a subsequent GOP after the transition, and hence require further processing to close it (e.g., by the decoder/player of the client 106c).

At step 537, the closed-GOP rules are utilized by the packager in processing the content stream into a plurality of chunks which are then stored in the primary content store 196, and per step 538 the manifest reflecting the storage locations of the chunks is generated and sent to the client.

Advantageously, by redistributing processing (such as to cause suspension or termination of certain cloud EPG functions, segment on closed GOP boundaries only, "close" open GOPS", etc.) to a network entity such as the JIT packager 197 or CLM-S proxy, or combination of such entities on network side, certain of the exemplary methods described herein reduce client processing (and hence transition latency), in effect by anticipatorily "pre-digesting" or avoiding certain functions needed to render the EPG and decode/render the primary/secondary content at the client 106c. Since the client will immediately know when the next I-frame will occur given a closed GOP (in that the I-frame placement within the closed GOP is specified), the "guesswork" (and any latency) associated with an open GOP—for which, the next I-frame may occur immediately, or much later comparatively, and the decoder has no way of knowing—is advantageously eliminated.

FIG. 5-3 is a logical flow diagram representing a further embodiment of a method for reducing switching latency associated with a packetized content transition. In the method 540 of FIG. 5-3, the primary content has already been encoded by the encoder 193, but not yet segmented. The processed content includes open GOPs, and segmentation at closed GOPs cannot be enforced (for whatever reason, such as an insertion point being specified within or adjacent to an open GOP), and hence the program stream must be "remediated" before segmentation so as to allow (subsequent) segmentation with transitions at closed GOPs only.

Per step 542 and 543, the Nth primary content element (e.g., a segment or group of segments between a transition) is processed to identify any transition markers (e.g., SCTE-35 cues or similar data). These may already be known (such as from the encoding process or other). For example, where the primary content comprises a series of chunks with no ads (or other transitions), only one content "element" would exits, and no markers (other than the end perhaps) would exist. Conversely, where multiple ad insertions exist within the chunks, which may or may not occur on segment boundaries, multiple "elements" (i.e., one or more primary content chunks or portions thereof) may exist between the ads. Hence, in one embodiment, the processing of steps 542 and 543 may be conducted marker-to-marker. Other schemes will be recognized by those of ordinary skill given the present disclosure.

If no markers are identified for the given Nth element, then per step 545 the counter is incremented and the next primary content element is processed. If one or more markers is/are identified, then per step 544, the Nth primary content element is processed to identify an open GOPs at the transition points designated by the markers. As previously discussed, open GOPs may place additional processing overhead on the rendering client, and hence avoiding them can positively impact perceived content switching latency.

Per step 546, one or more remediation techniques for closing the open GOPs are identified (e.g., by the CLM-S), including for example processing the open GOP to make it closed, deleting the open GOP and replacing it with one or more transitional I-frames, or other means as described in greater detail subsequently herein.

Per step 548, the selected remediation option is implemented for any of the identified open GOPs at transition(s), and the remediated content processed into segments or chunks per step 550 and stored. Per step 552, a manifest including the remediated chunk addresses is generated and transmitted to the client.

Figures 3A, 5:
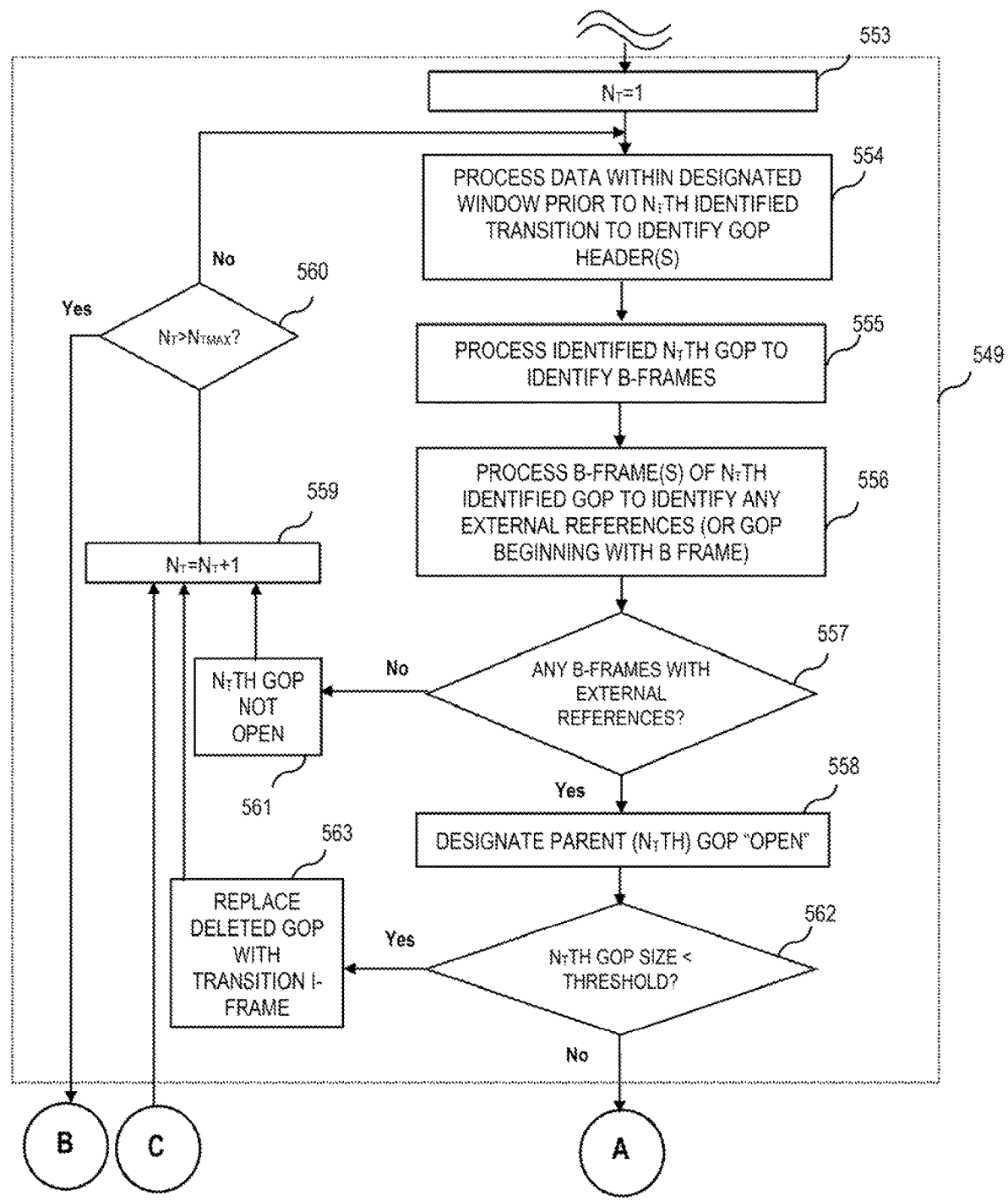
Figures 3A, 5:
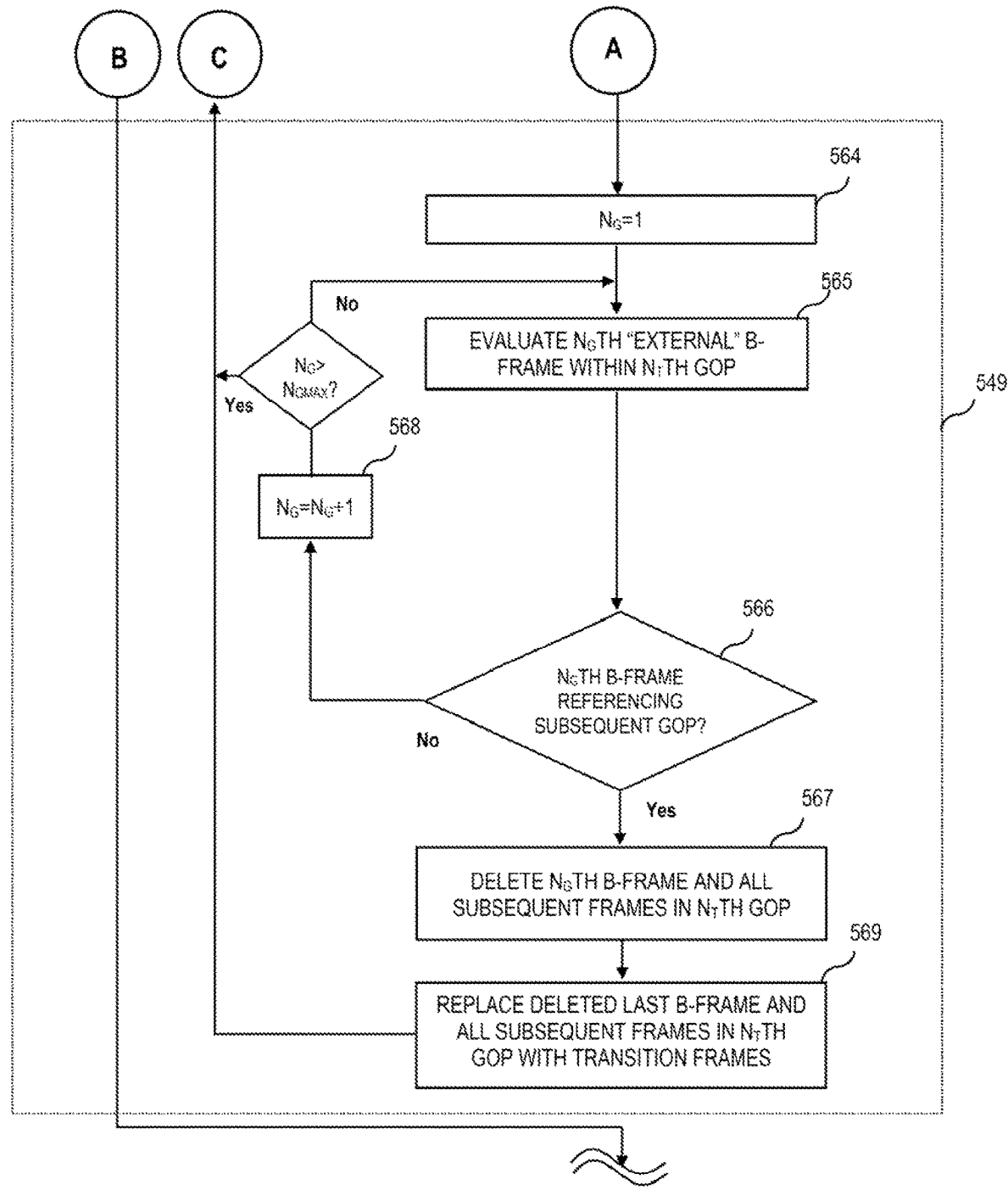

FIG. 5-3a is a logical flow diagram representing one implementation of the open GOP processing algorithms 549 of the method of FIG. 5-3. As shown, the method includes first setting the primary content segment counter (NT)=1 per step 553, and processing data within a prescribed temporal or other window of the identified transition point to identify GOP headers (step 554). GOPs include headers which can be used to identify the subsequent frames of each GOP based on GOP size.

Per step 555, the identified GOP(s) are processed to identify any B-frames present therein. As previously discussed, I and P frames are reference frames to which B-frames can refer, including I and P frames not within the same GOP (and hence "open").

Figures 3B, 5:
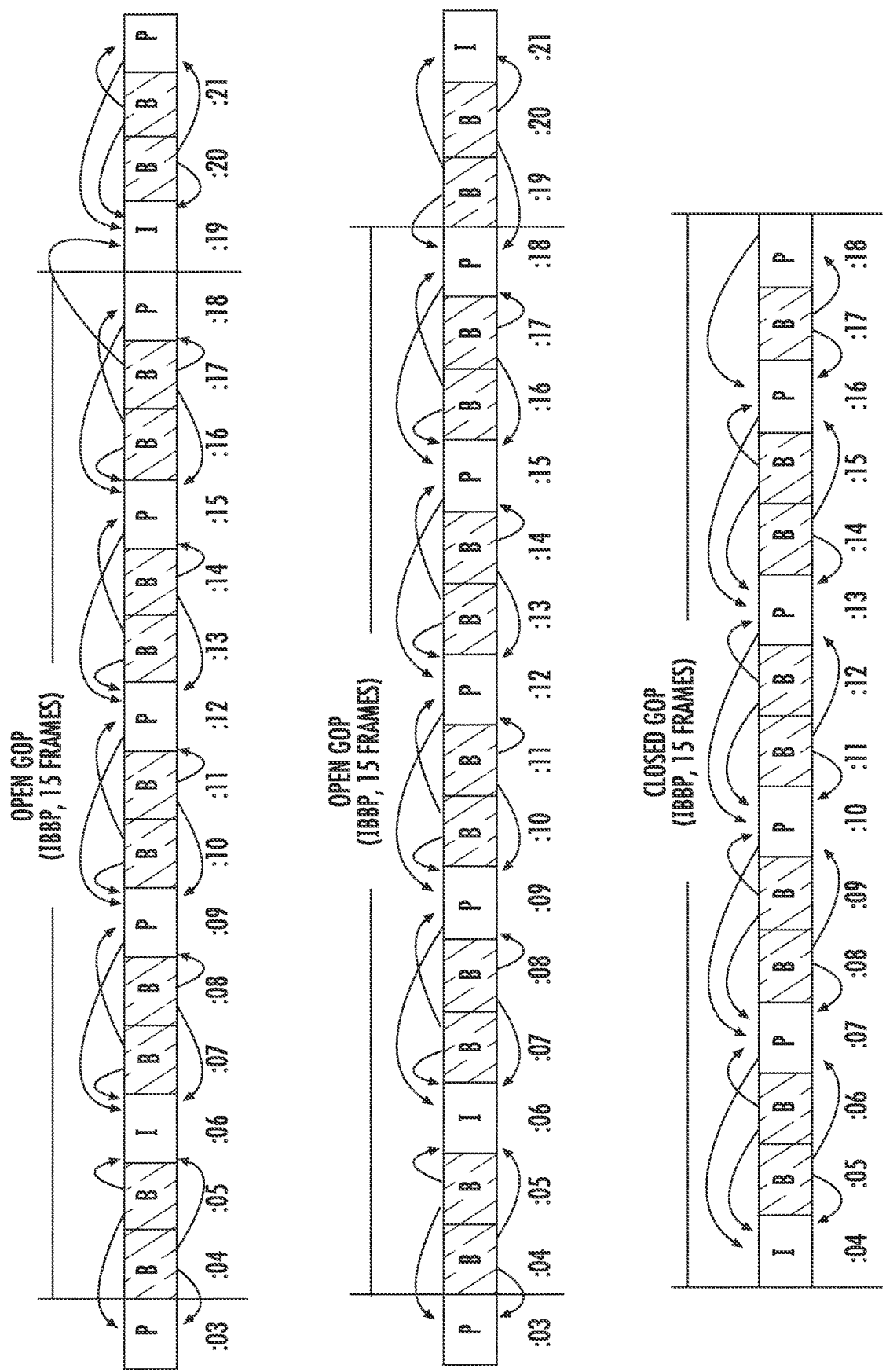
Figures 4, 5:
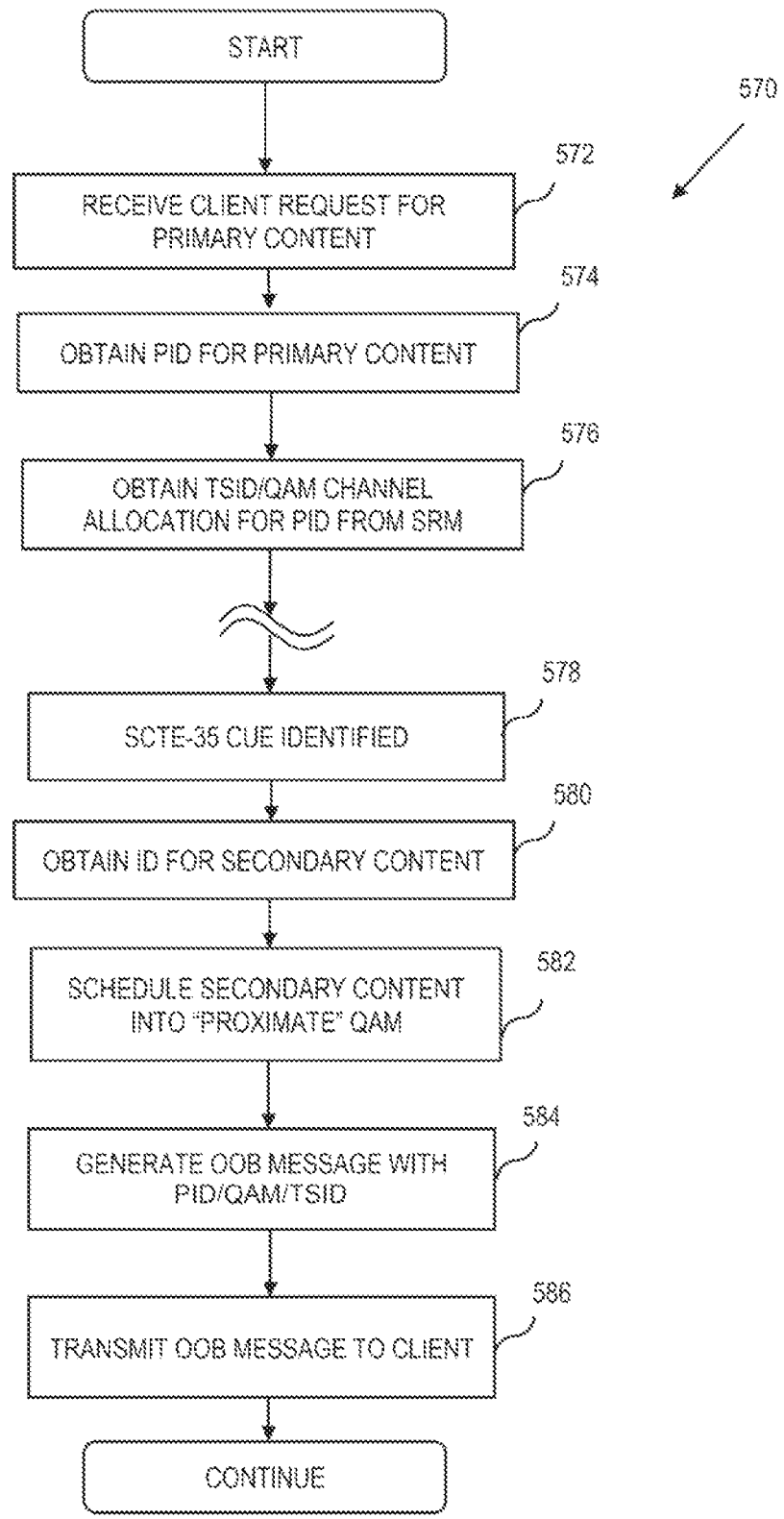
Figure 5:
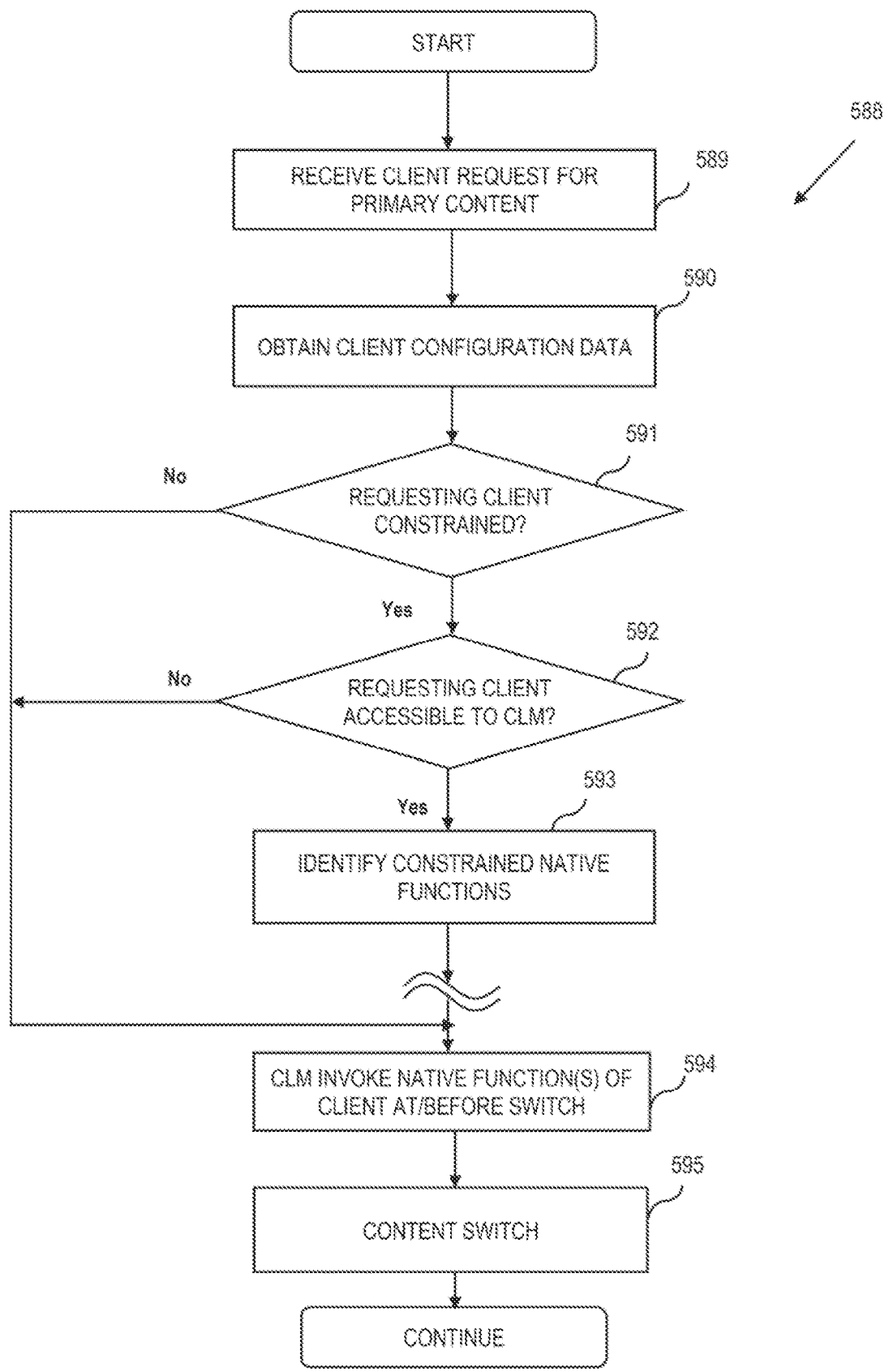

Once the B-frames are identified, they are processed to identify any external references per step 556. Notably, the presence of B-frames does not necessarily mean the GOP is open; rather, all such B-frames may have internal (intra-GOP) references. Alternatively, any GOPs beginning with B-frames may be used in identifying open GOPs, in that closed GOPs only begin with I-frames. See FIG. 5-3b for various open and closed GOP example structures.

Per step 557, if any external B-frame references are identified, the (parent) GOP for that B-frame is designated as "open." If not, the GOP is not open per step 561, and the NT counter incremented so as to process data for the next identified transition point with the primary content element.

Per step 562, the identified open GOP is then optionally evaluated (e.g., for size or other parameter which may warrant deletion or replacement of the open GOP with another data structure such as one or more transitional I-frames). For instance, if the open GOP size is very small (e.g., in a variable GOP-size encoding) or contains little useful data (e.g., little motion and hence a series of repetitive B-frames referencing a single reference I-frame), it may be less process intensive to simply delete the GOP in its entirety, and/or replace it with another data structure such as a series of identical I-frames.

At step 564, the GOP number index NG is set to 1 for the first one or more identified B-frames with external references within the $N_T$th GOP. Per steps 565 and 566, the B-frame is evaluated and if it references a subsequent GOP, that B-frame and all subsequent frames within the same GOP are deleted per step 567, thereby closing the GOP on the trailing edge. Notably, any B-frames referencing a prior GOP will already have been processed by the rendering client, and hence closing the GOP on the leading edge is of little value.

The deleted frames of step 567 are then replaced with transitional or other frames (e.g., constant black color rendered on the display when played back by the client media player app), so as to avoid undesired display artifacts. Alternatively, identical ones of existing frames can be inserted, in effect to simply "freeze" the display for a short period of time.

If at step 566 the $N_G$th B-frame does not reference a subsequent GOP, the counter is incremented per step 568, and the next B-frame with external reference evaluated (unless the number of identified B-frames with external references has been reached, in which case the process returns to step 559).

It will be appreciated that the CLM-S 231 and/or other processing entities of the network 200 of FIG. 2 may be configured to perform other types of GOP-based analysis, the foregoing being merely exemplary. For instance, the present disclosure contemplates in one variant the use of variable GOP size as a function of client capability. For instance, if a given requesting client 106c has a certain set of capabilities and utilizes cloud-based EPG functions, it may tend to experience unacceptable levels of latency in certain content switch scenarios. Accordingly, if GOP size is specified at encoding so as to minimize such latency—by reducing processing overhead needed by the client to decode and render the content on the transition boundaries—then the CLM-S can designate use of such encoded primary content in the manifest generated and sent to the client by the packager 197 (or its proxy). For example, the CLM-S 231 might specify that two or more versions of a particular encoding of a particular content element be maintained within the primary content store 196—one "overhead reduced" version that is optimized with closed GOP boundaries and GOP size selected for "thin" clients, and another which has not be so processed (e.g., for more capable or non-cloud client devices).

Moreover, where the primary content itself associated with a given GOP (or set of GOPs) consists of less average motion, different GOP sizes may be applied. As noted, the less average motion that exists from one frame to the next generally correlates to longer P-frame spacing, since the predictions won't change unduly. Longer P-frame spacing also generally correlates to greater compression. So, with low average motion with a given GOP, a longer size can be used to achieve a better compression ratio, thereby reducing processing load on the client.

FIG. 5-4 is a logical flow diagram representing yet another embodiment of a method for reducing switching latency associated with a client device. In this embodiment, the method 570 addresses latency associated with a QAM re-tune event within an exemplary HFC cable plant. At a high level, the exemplary embodiment utilizes pre-positioning of the "next" content the user needs to see on the same or immediately proximate carrier RF frequency as that used for delivery of the content currently being viewed.

As previously discussed, cable plants typically utilize 6 MHz-wide "QAMs" (RF channels with QAM-64 or QAM-256 modulated data) for delivery of in-band and DOCSIS (high speed data) services. These channels have a prescribed center frequency, and approximately 3 MHz of bandwidth each above and below the center frequency. The subscriber's DSTB or DOCSIS modem includes one or more RF tuners (typically one), which based on data provided to the DSTB, tunes to the appropriate channel to receive and demodulate the modulated data. Higher layer processes extract prescribed program streams from the demodulated data for rendering on the client device. As with any RF tuner, the RF signal on a given carrier frequency must be acquired before the data can be demodulated. The RF "front end" of the tuner, coupled with digital signal processing (DSP) in the DSTB, typically performs such functions. However, there is a limit on the speed with which such tuning (or re-tuning) can proceed. Generally speaking, for re-tunes, changing from a first carrier frequency to another that is immediately proximate or adjacent in the frequency spectrum involves less delay than re-tuning to a more "distant" frequency (say 50 MHz away from the original).

Re-tune events may occur for any number of reasons, including for example the client tuning to another program channel (the data stream for which is often carried on another carrier), switched digital video (SDV) tune events (e.g., when a user selects a program channel that is not currently "switched in", the SDV switch switches in the program stream and informs the DSTB, such as via an OOB message, of the carrier assignment).

Another cause of re-tunes is to transition the client device from a primary program stream to a secondary stream, such as at an advertisement break. The advertisement may be scheduled into a different QAM than the primary content (such as where the advertisement is linear addressable advertising (LAA) specific to the particular client), and at the SCTE-35 cue/transition point, is switched to the different QAM, then back again when the advertisement is completed. The methodology 570 of FIG. 5-4 addresses such issues by, inter alia, cooperating with QAM/session scheduling processes within the MSO network to assign such LAA to the same or similar QAMs within the QAM pool as used by the primary program channel, thereby eliminating or mitigating the scope of the re-tune event (and hence associated latency on the tuner acquiring the new QAM).

At step 572 of the method, the client-initiated request for primary content is received, such as via the client's cloud EPG and the guide controller 215 (FIG. 2). The program ID (PID) for the content is then obtained (such as via a lookup table or other mechanism) if not already provided/known per step 574, and the transport stream ID (TSID) and QAM channel allocation for the PID is obtained, such as from the SRM 220 (FIG. 2). The client tunes to and decodes/renders the primary content (e.g., via MPEG-2 TS delivered via the assigned QAM), and per step 578, an SCTE-35 or other cue indicating a switch/insertion of advertising is detected prior to the switch/insertion point. The PID for the secondary content (advertisement) is then obtained per step 580, and the secondary content stream associated with the ID is scheduled by the SRM 220 into the QAM pool, including via statistical multiplexing process per step 582. However, in contrast to a traditional "stat mux", the SRM/stat mux of the present embodiment generates QAM proximity measurement data indicative of the proximity (in MHz) of available QAMs within the stat mux pool onto which the secondary content program stream can be scheduled for delivery at the prescribed insertion point. Note that the secondary content may already be scheduled on a sufficiently proximate QAM for whatever reason, and the SRM merely need verify that the placement is within a prescribed threshold of "distance" from the primary content QAM. The RF carrier proximity is in one embodiment calculated by a mere difference in the center frequencies of the carriers, with the delta (difference) related algorithmically to the latency experienced by the client. For instance, anecdotal data may be obtained by the MSO for switching latency base on one or more given DSTB configuration (e.g., from a particular manufacturer) relating latency to QAM placement (relative and/or absolute), thereby enabling the SRM 220 to assess and even actively select QAMs within the pool onto which particular secondary content streams targeted at individual client should be scheduled.

In another implementation, the MSO's extant advertising decision system (ADS) is utilized in order to identify advertisements slated for a particular user/device/premises, such as for example based on one or more pre-set profiles associated with that user/device/premises. Addressable advertising spot triggers within the primary content are known ahead of time (typically 24 hours or more in advance), and hence with both of the foregoing data (i.e., data correlating particular users, devices or premises to particular advertising content, and data indicating insertion opportunities for those advertisements), the SRM can be instructed to deliver the correlated advertising at the insertion points for a particular user/device/premises, by virtue of knowing what program channel (and hence what QAM the user is currently tuned to. For instance, in the exemplary SDV context, users are given QAM tune data corresponding to the QAM carrying the program to which they wish to tune; hence, with no subsequent tuning events, the SDV system knows which QAM the user is currently tuned to, and hence can coordinate with the advertising insertion infrastructure to begin multicasting the "targeted" (correlated) advertisement on the current QAM that the users are watching.

Note that in contrast to ad insertion (via e.g., an ad splicer) into the primary stream, which requires no QAM re-tune, LAA provision is necessarily user/client-specific (in at least some regards), and hence the QAM re-tune is necessitated so that ads targeted for the given user/client are viewed by that user/client, while other users/clients may get different ads (and different scheduling on different QAMs). Hence, the exemplary implementation of the present disclosure advantageously eliminates (or minimizes) this re-tune which would otherwise be necessary under the prior art.

It is further noted that the SCTE-35 cue identification may in various implementations be performed by different entities. For instance, an encoded primary content program stream stored on the MSO storage system 196 or obtained from a third party may be pre-processed (e.g., at the headend) for static placements, or evaluated on-the-fly for dynamic decisions; i.e., decisions made after the primary content stream is encoded but before delivery to the client.

In another paradigm, the client (e.g., CLM-C 221), upon detecting the incipient placement (e.g., via cue, metadata or other data embedded in the decoded stream), notifies the CLM-S 231 (such as via upstream OOB messaging), which then causes the SRM 220 to place the secondary content stream onto the same QAM used for the primary content stream. The SRM then directly (or indirectly, via CLM-S 231) informs the CLM-C 221, or other process of the client 106c of the QAM/tuning assignment to be invoked at the "insertion" point, such as via OOB message containing an SCTE 35 trigger (steps 584 and 586). Alternatively, the cloud guide function 215 may be used to communicate with the client to provide this data.

It will also be appreciated that scheduling and session/QAM allocations may be provided under a "next generation" plant model, such as one utilizing digital domain processing, such as e.g., that described in the exemplary CCAP/DOCSIS 3.1 approach. For example, the methods and apparatus described in U.S. Pat. No. 9,185,341 issued Nov. 10, 2015, and U.S. Pat. No. 9,300,445 issued Mar. 29, 2016, each entitled "Digital domain content processing and distribution apparatus and methods," incorporated herein by reference in their entirety, may be used consistent with the present disclosure for selectively managing the time and frequency resources associated with the OFDM modulation for scheduling in the secondary content such that the network switch latency is mitigated. As described in these patents, one embodiment of the digital domain processing utilized IFFT (frequency to time domain) transformation to schedule time and frequency (carrier) resources for different higher layer processes, and a client that performs the inverse transform; i.e., FFT (for time to frequency domain). Such approaches have the inherent advantage of little if any "switching latency" of the type described above, since the carriers associated with the OFDM delivery model are all decoded and processed simultaneously. Hence, the "SRM" of such a system can receive data or messages from the CLM-S 231, and effectively instantaneously reprogram/insert the secondary content stream into the time/frequency resources available.

FIG. 5-5 is a logical flow diagram representing yet an additional embodiment of a method 588 for reducing switching latency associated with a packetized content transition, utilizing native client functionality accessible via the CLM process.

At step 589 of the method, the CLM-S 231 (or its proxy) receives data relating to a client-initiated request for a primary content element (e.g., television programming).

At step 590, the CLM-S accesses the client database (DB) 203 to determine the configuration or status of the requesting client device. For example, a MAC address of the client device (or more generically a user or subscriber or account ID in cases where only one client device is registered) may be used to access configuration data stored in the DB 203. Configuration data useful to the CLM-S 231 in the present embodiment may include (i) whether the requesting client is "cloud" enabled/configured; i.e., whether it utilizes a cloud-based model such as the HTML 5-based previously described herein; and (ii) whether there are native functions available for use by the CLM-S in reducing latency. Native function availability may be determined directly (e.g., where the DB 203 lists these functions), or indirectly (e.g., via identification of the device type and O/S, from which the CLM-S 231 or a proxy can perform a lookup on native functionality). Moreover, the availability of native functions may be directly reported by the client 106c via inter-process communications with the CLM-C 221 where so installed on the client.

Per step 591, the CLM-S evaluates the accessed or obtained client data, and determines whether the client is constrained. In this context, the term "constrained" refers to determining whether the client has additional available native processing or other assets or functions which are currently inaccessible via the cloud-based EPG model (or conversely which are heavily leveraged by the cloud-based model). As previously noted, with the trade of "one size fits all" homogeneity for native functionality access and performance present in many such cloud-based models (including by virtue of the client having to wait for, "unpack", and render the various EPG elements obtained from the cloud entity), there may be significant potential performance enhancements in terms of switching latency which can be obtained by (i) suspending, modifying or obviating certain cloud EPG functions which contribute heavily to latency; and/or (ii) accessing native functions within the client device which can reduce latency. Accordingly, one embodiment of the method 588 utilizes logic within the CLM-S to evaluate the requesting client 106c for the ability to leverage items (i) and/or (ii).

Depending on configuration of the client 106c (i.e., whether the CLM-C 221 is installed or not), the CLM-S 231 will have different levels of access to native functions. In case where the client is "blind" (i.e., no CLM-C 221 installed), access to native functions can be limited. If the client (e.g., DSTB) 106c includes middleware within its protocol stack with externally accessible APIs or other interfaces, the CLM-S can access those interfaces assuming it has privilege to do so (e.g., by being designated as a "privileged app"). So, for example, where a display element, logging, or other native "housekeeping" function for the DSTB itself can be accessed, the CLM-S 231 can remotely cause the DSTB 106c to e.g., suspend or terminate such processes in anticipation of an incipient content transition, so as to free up DSTB processing resources. See, e.g., the exemplary methods and apparatus described in co-owned U.S. Pat. No. 7,623,933 issued Nov. 24, 2009 and entitled "Methods and apparatus for controlling display in a networked device" incorporated herein by reference in its entirety, which may be used consistent with the present disclosure for such functions.

Alternatively, the present disclosure contemplates use of "passive" means of client device overhead/processing modification, such as via the aforementioned cloud-based EPG function 215 (FIG. 2). For example, the cloud guide function 215 might instruct the EPG-related process running on the client 106c to perform (or not perform certain operations), based on data or commands received from the CLM-S 231. In one such instance, processing-intensive and/or delay-inducing operations such as graphics generation and rendering, external API calls, are suspended temporarily by the guide function 215 based on a command received from the CLM-S 231 which is generated based on detection of an incipient content switch.

As but one example, the EPG code on the client, when running, might call for generation of a map display within a window when the user invokes a certain function (e.g., local MSO "storefronts" where the subscriber can obtain new equipment, etc.). Such map display may be by virtue of an API call to an open API such as Google maps or the like; sending and receiving messages according to the API protocol to obtain the lat./lon. data for the MSO storefronts, and using that data and indigenous algorithms to generate the map display (e.g., for generic "tiles", or even to obtain satellite imagery tiles from the server for the area of rendering), consumes precious processing assets within the DSTB, and hence if suspended, such assets can be devoted to processing the content switch more timely.

If the CLM-C 221 has been installed on the client (whether at time of manufacture, or via later download or other mechanism) and is registered with the CLM-S 231 (step 592), local access to various of the native functions may be utilized. For example, in one variant, the CLM-C 221 is considered a "privileged app" and given access to local DSTB functions, including invoking various operational modes, suspending certain background or housekeeping functions, hardware acceleration (e.g., via co-processor or other dedicated processing), PCIe bus access, or even other functions for portable devices (e.g., camera or accelerometer functions, non-essential wireless communication functions, etc.), under control from the CLM-S 231, or independently. For instance, on the aforementioned cloud based guide function of the Assignee hereof (i.e., Spectrum Guide), when the guide is displayed on-screen for the user, the "shrunken video" in the top right corner (window) of the on-screen rendering is not the same as that of the actual channel that the users would watch natively when tuned to the relevant the QAM. In some implementations, a secondary tuner of the DSTB is used, when the cloud EPG function is invoked, to populate the corner window, such as by using the secondary tuner to tune to another QAM, thereby consuming DSTB processing resources, and potentially introducing latency associated with tuning and acquisition of that QAM by the secondary tuner. Hence, generation of this EPG video display element can be suspended for a period of time overlapping with the transition event (e.g., switch to the LAA), thereby allowing the client device to save the overhead otherwise expended on that generation/tuning. In one variant, the DSTB merely does not utilize the secondary tuner, and the prior or extant image associated with the corner window is maintained. In another variant, the window is merely "blacked out" for a period of time commensurate with the suspension.

Similarly, the CLM-S (or cloud guide function 215) may signal the CLM-C 221 to suspend various EPG functions, as previously described, contemporaneous with accessing APIs or other native functions of the client 106c. In step 593, the CLM-S and/or CLM-C may identify which native functions are "constrained" (i.e., otherwise not invoked or accessible under the cloud EPG model) and utilize only such functions, under the logic that other (utilized or accessible) functions are already being employed and would have little or no positive impact on reducing processing overhead/latency at the client.

A number of other tools are available to the CLM-S/CLM-C of the present disclosure to reduce processing overhead for the client. In one variant, reducing the streaming bit rate of data associated with the primary content data may be selectively utilized as the content switch approaches, such as by the CLM-S instructing the relevant streaming process of the network that is supplying the data to temporarily reduce bitrate. For example, a streaming server apparatus of the MSO network that is delivering the primary content data might utilize an adaptive bitrate (ABR) for streaming the first content data to the client device; the rate dictated by this streaming server may temporarily be reduced, thereby reducing processing at the client. Specifically, the faster the streaming rate, the more processing per unit time is required by the client decoder. Moreover, higher bitrates tend to produce higher FEC (forward error correction) rates, in that ISI or other phenomena are more pronounced the more bits are transmitted on a finite information channel per unit time. FEC (such as turbo codes or Viterbi) processing can be reduced if BER/FER/PER detected by the decoder is reduced, due to lower transmission bitrate for the stream.

In another variant, functions relating to a wireless transmission link delivering the data may be used. These may include for example increasing at least one of a transmit power (Tx) or spatial diversity (e.g., MIMO configuration) of a wireless base station so as to reduce an error rate of wireless transmission of data associated with the primary content data. LTE and Wi-Fi for example each can adjust any number of Tx/Rx parameters to enhance data rate and performance, including for example MCS (modulation and coding scheme), Tx power, ED (energy detection threshold), HARQ parameters, etc. As a simple example, if a WLAN link over which the primary content data is being streamed to a client 106c is weak, significantly higher processing overhead may exist for the client in terms of error correction processing, QoS functions, etc. By increasing the Tx power of the AP 114 (FIG. 1), the channel throughput may be increased, thereby resulting in less FEC, retransmissions, etc. necessary for the link.

In a further variant, reducing a display resolution associated with at least a portion of the rendering of the primary content data may be used as a means for reducing client processing overhead. For example, in one implementation, the entire display can be reduced in resolution such that the user will see only a slight reduction in clarity (and hence not adversely impact user experience). Alternatively, selective reduction of display resolution of only data associated with one or more e.g., peripheral portions of respective ones of a plurality of frames of the first content data, while maintaining a display resolution associated with non-peripheral portions of the plurality of frames unchanged, can be utilized. User attention is typically focused more towards the center of the display screen when watching content, and hence this can be leveraged to selectively degrade the peripheral or outer portions of the display immediately prior to the content switch with little if any perceivable degradation of user experience. See also U.S. Pat. No. 9,264,508 previously incorporated herein, where reduced channel switching delays are achieved by caching background content at reduced quality and/or resolution.

Likewise, motion estimation (ME) functionality within the decoding codec (e.g., H.264) can be suspended for a prescribed number of frames (or larger structures such as GOPs) of the primary content data at the receiving client immediately prior to the content switch, so as to reduce overhead. This may be accomplished in one implementation by simply dropping one or more B or P frames of the video, or otherwise modifying the video before delivery to the client (e.g., at the network-side encoder) so as to reduce processing burden.

Returning again to FIG. 5-5, per step 594, the identified native functions are invoked by the CLM-C 221 (or the CLM-S 231, where no CLM-C 221 is installed and the desired native functions are otherwise accessible to the CLM-S) prior to the content switch (step 595). Notable, the CLM-S/C may invoke these functions in parallel, serially, and/or only within certain temporal windows of the actual content switch so as to minimize impact on operations of the client 106c generally.

As one example of the foregoing method 588, consider an IP-enabled client device (e.g., DSTB) operating a cloud-based HTML 5 EPG function. The client requests a particular video (primary content), such as via streaming via IP over the MSO infrastructure as previously described. The client receives the manifest file from e.g., the relevant JIT packager 197 or a proxy, which includes one or more URLs for the secondary content to be accessed at time t=AB:CD during playback of the primary content. As the client's media player decodes and renders the primary content chunks in sequence, it approaches the content "switch" point, and the CLM-C 221 accesses one or more native function APIs to perform the desired function(s); e.g., suspending processing on the EPG app or other apps running in the background in order to devote more processing resources to the content switch, including accessing the URL of the secondary content, and decoding the secondary content streamed from the URL and rendering on the display.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

What is claimed is:

1. A computerized method for causing delivery of digital content data within a content distribution network, the computerized method comprising:
   causing delivery of first digital content data to a computerized client device;
   processing the first digital content data to identify at least one transition data element therein, the at least one transition data element configured to cause a transition to second digital content data by the computerized client device;
   prior to the transition by the computerized client device, causing the computerized client device to configure one or more functions to increase an availability of processing assets to support the transition;
   receiving data indicative of the transition; and
   based at least on the received data, causing the computerized client device to return the configured one or more functions to a state thereof prior to the configuration;
   wherein the processing of the first digital content data to identify the at least one transition data element therein comprises (i) processing the first digital content data to identify at least one open group of pictures (GOP), and (ii) closing the at least one open GOP, such that the transition occurs only on a closed GOP.

2. The computerized method of claim 1, wherein (i) the processing of the first digital content data, (ii) the causing of the computerized client device to configure the one or more functions, and (iii) the receiving of the data indicative of the transition, are performed at least in part by a software process operative to run on the computerized client device.

3. The computerized method of claim 1, wherein (i) the processing of the first digital content data, (ii) the causing of the computerized client device to configure the one or more functions, and (iii) the receiving of the data indicative of the transition, are performed at least in part by a software process operative to run on a network server apparatus with which the computerized client device is in data communication via the content distribution network.

4. The computerized method of claim 1, further comprising selecting the one or more functions from a plurality of functions available for configuration, the plurality of functions ranked according to at least one of a processing overhead or latency reduction produced by the configuration, the selecting based at least in part on data relating to the ranking.

5. The computerized method of claim 1, further comprising selecting the one or more functions from a plurality of functions available for configuration, the selecting based at least in part on determining which of the plurality of functions available for configuration are currently being used by the computerized client device.

6. The computerized method of claim 1, wherein the transition comprises transcoding at least a portion of the second digital content data into an encoding format able to be rendered by the computerized client device.

7. The computerized method of claim 6, wherein the transcoding comprises transcoding from an Moving Picture Experts Group (MPEG)-2 encoding format to a format requiring a lower bit rate.

8. The computerized method of claim 1, wherein:
the causing of the computerized client device to configure the one or more functions comprises reducing a streaming bit rate of data associated with the first digital content data; and
the reducing the streaming bit rate of the data associated with the first digital content data comprises causing a streaming server apparatus of a content delivery network that is delivering the first digital content data to reduce the streaming bit rate using at least an adaptive bitrate (ABR) process used for streaming the first digital content data to the computerized client device.

9. The computerized method of claim 1, wherein:
the configuration of the one or more functions comprises a reduction of a display resolution associated with at least a portion of the first digital content data; and
the reduction of the display resolution associated with at least the portion of the first digital content data comprises a reduction of a display resolution of only data associated with one or more peripheral portions of respective ones of a plurality of frames of the first digital content data, while maintaining a display resolution associated with non-peripheral portions of the plurality of frames unchanged.

10. The computerized method of claim 1, wherein the causing of the computerized client device to configure the one or more functions comprises suspending at least a portion of motion estimation processing utilized by a motion estimation-capable decoding process used to render the first digital content data.

11. Computer readable apparatus comprising a non-transitory storage medium, the non-transitory storage medium comprising at least one computer program having a plurality of instructions, the plurality of instructions configured to, when executed on a digital processing apparatus, cause a computerized apparatus to:
cause delivery of first content data to a computerized client device;
process the first content data to identify at least one transition data element indicative of an transition to second content data;
cause, prior to the transition to the second content data and based at least on the at least one transition data element, configuration of one or more functions to increase an availability of processing assets at the computerized client device to support the transition, the configuration of the one or more functions comprising:
(i) an evaluation of data associated with the computerized client device to determine one or more native processing functions within the computerized client device which are then-currently inaccessible, and (ii) configuration of the computerized client device to suspend one or more cloud-based electronic program guide (EPG) functions to free processing resources to be used for making the one or more native processing functions accessible;
receive data indicative of the transition; and
based at least one the received data, cause a reconfiguration of the one or more functions to a prior configuration.

12. The computer readable apparatus of claim 11, wherein the configuration of the one or more functions comprises reduction of a streaming bit rate of data associated with the first content data.

13. The computer readable apparatus of claim 12, wherein the reduction of the streaming bit rate of the data associated with the first content data comprises a reduction of an adaptive bitrate (ABR) used for streaming the first content data to the computerized client device.

14. The computer readable apparatus of claim 11, wherein the configuration of the one or more functions comprises an increase of at least one of a transmit power or spatial diversity of a wireless base station so as to reduce an error rate of wireless transmission of data associated with the first content data.

15. Computerized apparatus, comprising:
first data interface apparatus configured to communicate with a network;
digital processor apparatus in data communication with the first data interface apparatus; and
storage apparatus in data communication with the first data interface apparatus and the digital processor apparatus and comprising at least one computer program, the at least one computer program comprising a plurality of instructions which are configured to, when executed by the digital processor apparatus, cause the computerized apparatus to:
cause delivery of first content data to a computerized client device;
process the first content data to identify at least one transition data element indicative of an impending transition to second content data;
pre-position the second content data on a proximate carrier RF frequency to a carrier RF frequency utilized for the delivery of the first content data, thereby reducing latency associated with the transition;
cause, prior to the transition to the second content data, configuration of one or more functions to increase an availability of processing assets at the computerized client device to support the transition;
receive data indicative of the transition; and
based at least one the received data, cause a reconfiguration of the one or more functions to a state thereof prior to the configuration.

16. The computerized apparatus of claim 15, wherein:
the at least one transition data element comprises indicates where the second content data is to begin;
the delivery of the first content data comprises delivery on at least one first radio frequency (RF) physical channel;
the transition to the second content data comprises a switch from the at least one first RF physical channel to at least one second RF physical channel, the at least one second RF physical channel being within a prescribed relationship to the at least one first RF physical channel; and
the configuration of the one or more functions reduces a latency associating with the switch.

17. The computerized apparatus of claim 16, wherein the at least one first RF physical channel and the at least one second RF physical channel each comprises one or more quadrature amplitude modulation (QAM)-modulated carriers having a bandwidth of approximately 6 MHz.

18. The computerized apparatus of claim 15, wherein the configuration of the one or more functions comprises suspension of at least a portion of motion estimation processing utilized by an H.264 decoding process used to render the first content data.

19. The computerized apparatus of claim 15, wherein the plurality of instructions are further configured to, when executed by the digital processor apparatus, cause the computerized apparatus to:

cause caching of at least a portion of the second content data at a storage location which reduces latency of the computerized client device accessing and rendering the second content data over at least one other possible storage location available for storing the second content data.

20. The computerized apparatus of claim 15, wherein the computerized apparatus comprises a just-in-time (JIT) packager apparatus.

21. The computerized method of claim 1, wherein the processing of the first digital content data to identify the at least one open GOP comprises processing the first digital content data to identify one or more GOPs beginning with one or more B-frames.

22. The computerized method of claim 21, wherein the closing the at least one open GOP comprises deleting the one or more B-frames and replacing the one or more B-frames with one or more transitional frames.

23. The computerized method of claim 1, wherein the closing of the at least one open GOP comprises inserting at least one I-frame between a closed GOP that precedes the at least one open GOP and the at least one transition data element, the at least one I-frame comprising at least one I-frame from a subsequent portion of the second digital content data after the at least one transition data element.

24. The computerized method of claim 1, wherein the closing of the at least one open GOP comprises removing one or more non-I-frame frames within the at least one open GOP at a beginning thereof.

\* \* \* \* \*